United States Patent
Hayashi et al.

(10) Patent No.: US 10,567,747 B2
(45) Date of Patent: Feb. 18, 2020

(54) IMAGING DEVICE, IMAGING SYSTEM, AND MOBILE APPARATUS

(71) Applicant: CANON KABUSHIKI KAISHA, Tokyo (JP)

(72) Inventors: Hidetoshi Hayashi, Fujisawa (JP); Atsushi Shimada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 15/968,405

(22) Filed: May 1, 2018

(65) Prior Publication Data
US 2018/0332276 A1 Nov. 15, 2018

(30) Foreign Application Priority Data
May 9, 2017 (JP) .................. 2017-093145

(51) Int. Cl.
*H04N 17/00* (2006.01)
*H04N 5/378* (2011.01)
*H04N 5/3745* (2011.01)
*H04N 5/376* (2011.01)

(52) U.S. Cl.
CPC .......... *H04N 17/002* (2013.01); *H04N 5/376* (2013.01); *H04N 5/378* (2013.01); *H04N 5/3745* (2013.01); *H04N 5/3765* (2013.01); *H04N 5/37457* (2013.01)

(58) Field of Classification Search
None
See application file for complete search history.

(56) References Cited

U.S. PATENT DOCUMENTS

| 8,040,400 | B2 | 10/2011 | Hayashi | |
|---|---|---|---|---|
| 8,670,058 | B2 | 3/2014 | Hayashi et al. | |
| 8,754,978 | B2 | 6/2014 | Hayashi et al. | |
| 8,921,855 | B2 | 12/2014 | Okita et al. | |
| 2011/0128425 | A1* | 6/2011 | Schemmann | H04N 3/1562 348/300 |
| 2014/0192249 | A1* | 7/2014 | Kishi | H04N 5/23212 348/349 |
| 2017/0126993 | A1* | 5/2017 | Madurawe | H04N 5/355 |

FOREIGN PATENT DOCUMENTS

JP 2012-199913 A 10/2012

* cited by examiner

*Primary Examiner* — James M Hannett
(74) *Attorney, Agent, or Firm* — Venable LLP

(57) ABSTRACT

Provided is an imaging device including a pixel array including a plurality of pixels arranged to form a plurality of rows and a plurality of columns, each of the plurality of pixels generates signals in accordance with an incident light; a first output line and a second output line that are arranged corresponding to each of the plurality of columns of the pixel array and transmit signals output from the pixels arranged on a corresponding column; a scanning unit that drives the pixel array so as to output signals from at least two of the pixels arranged on different rows of a single column respectively to the first output line and the second output line; and an output line control unit that provide potentials that are different from each other to the first output line and the second output line, respectively, in a test mode.

21 Claims, 32 Drawing Sheets

(1) ADDRESS SETTING PERIOD
(2) PIXEL DRIVE PERIOD

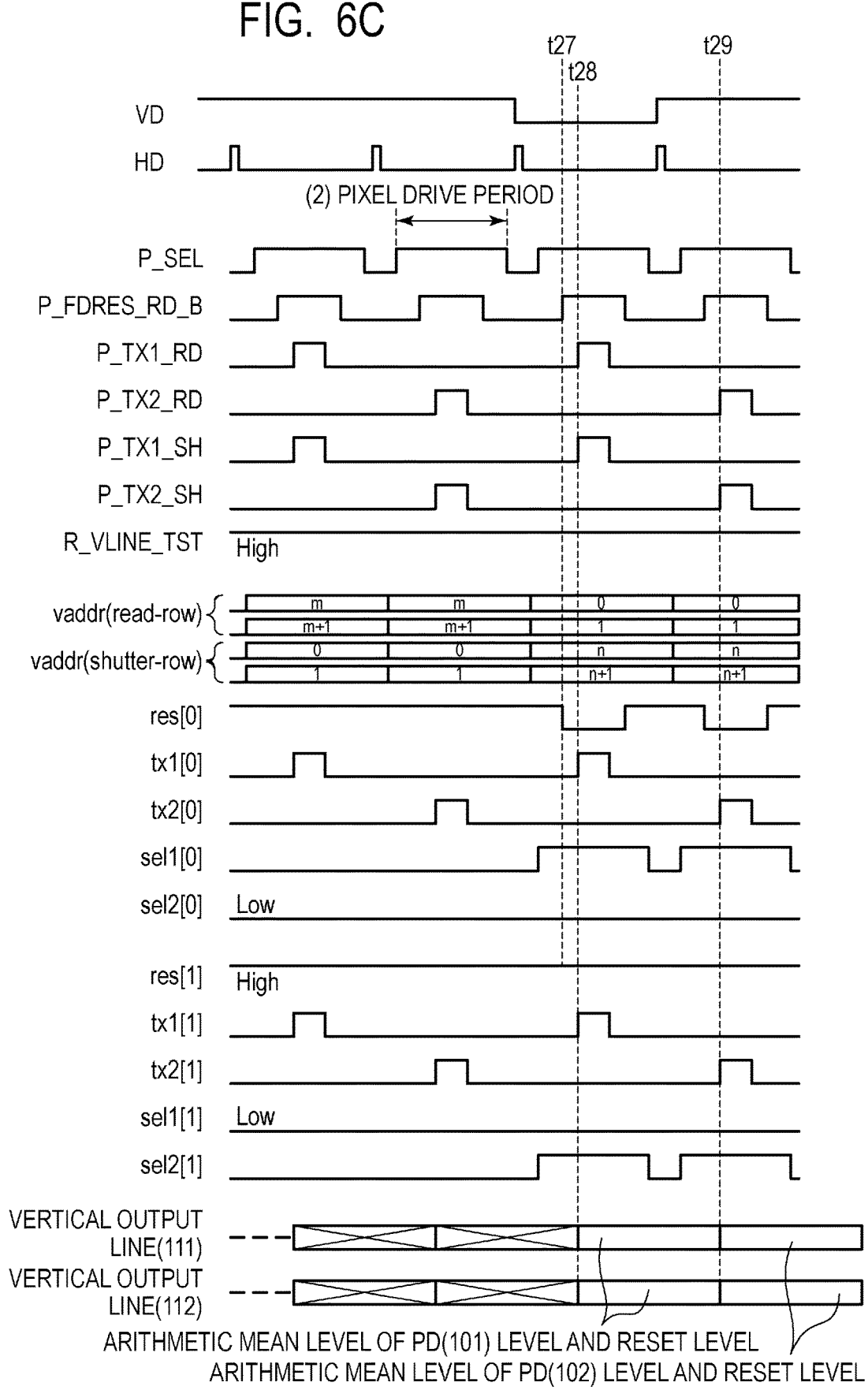

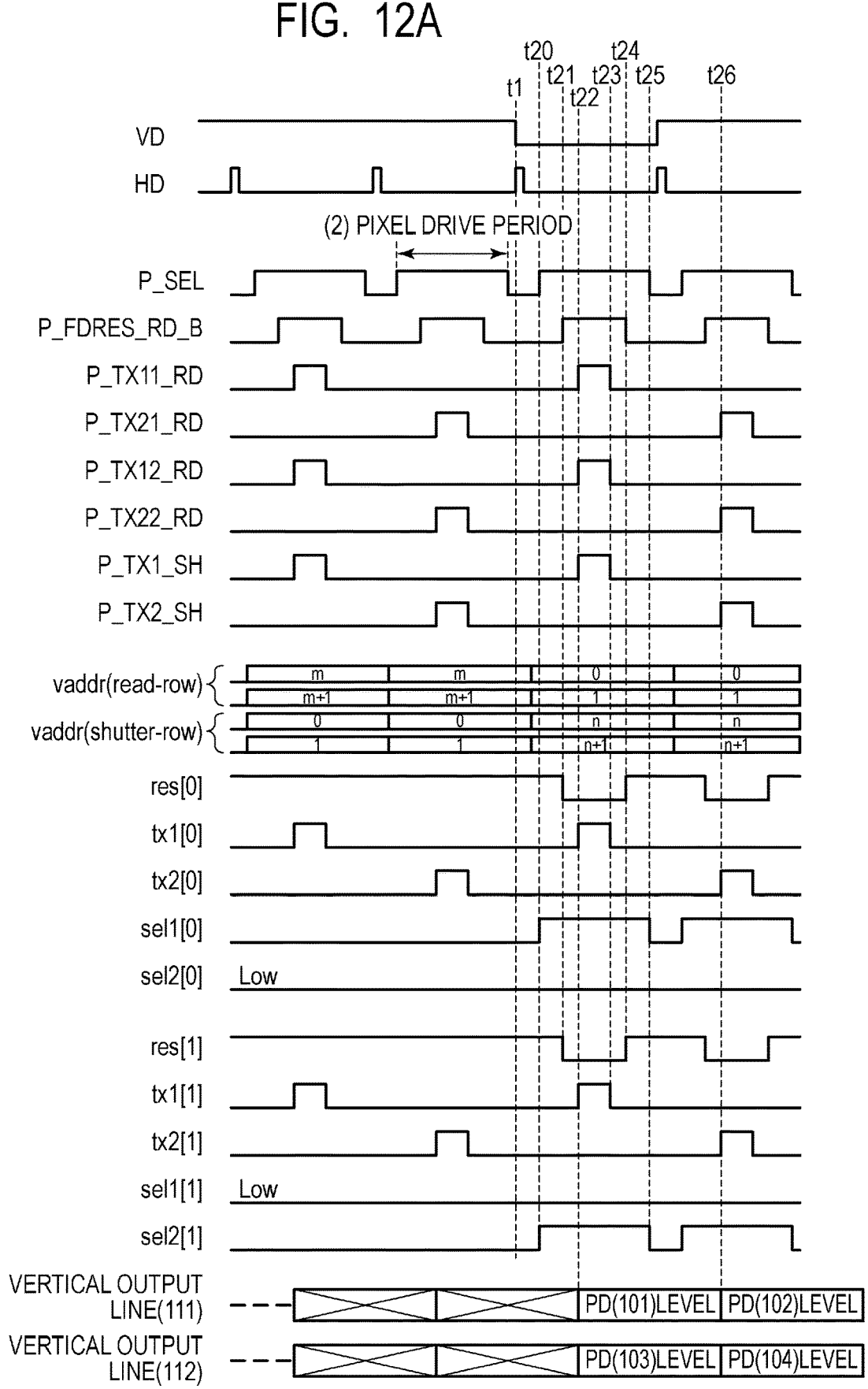

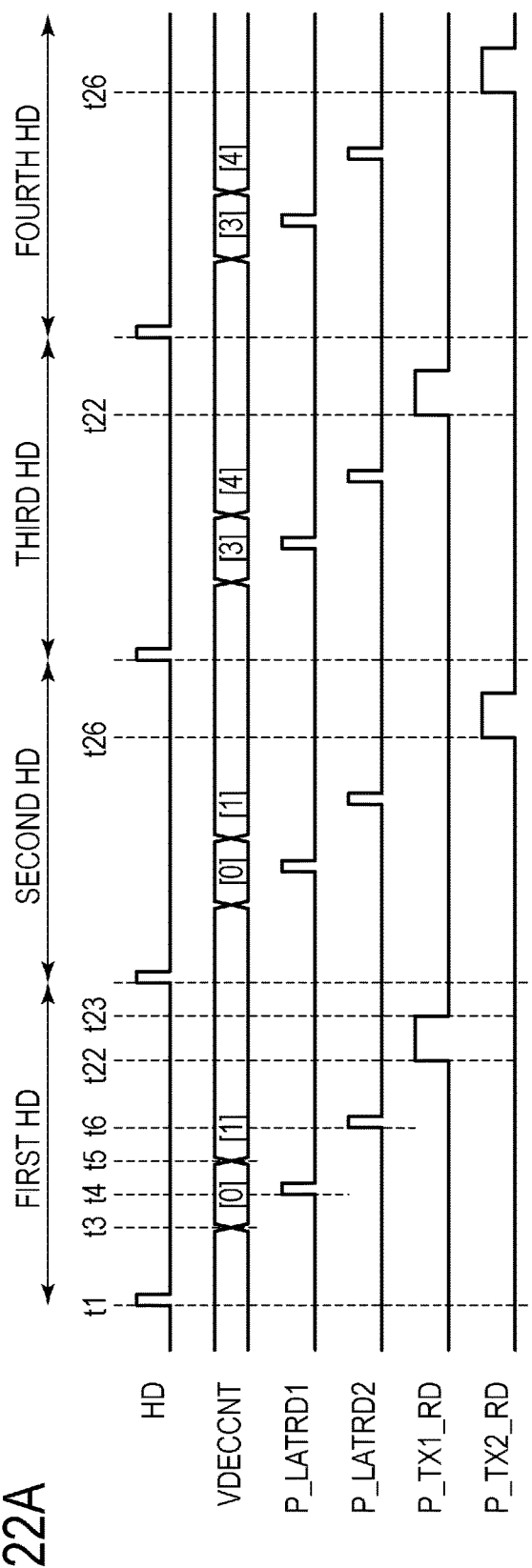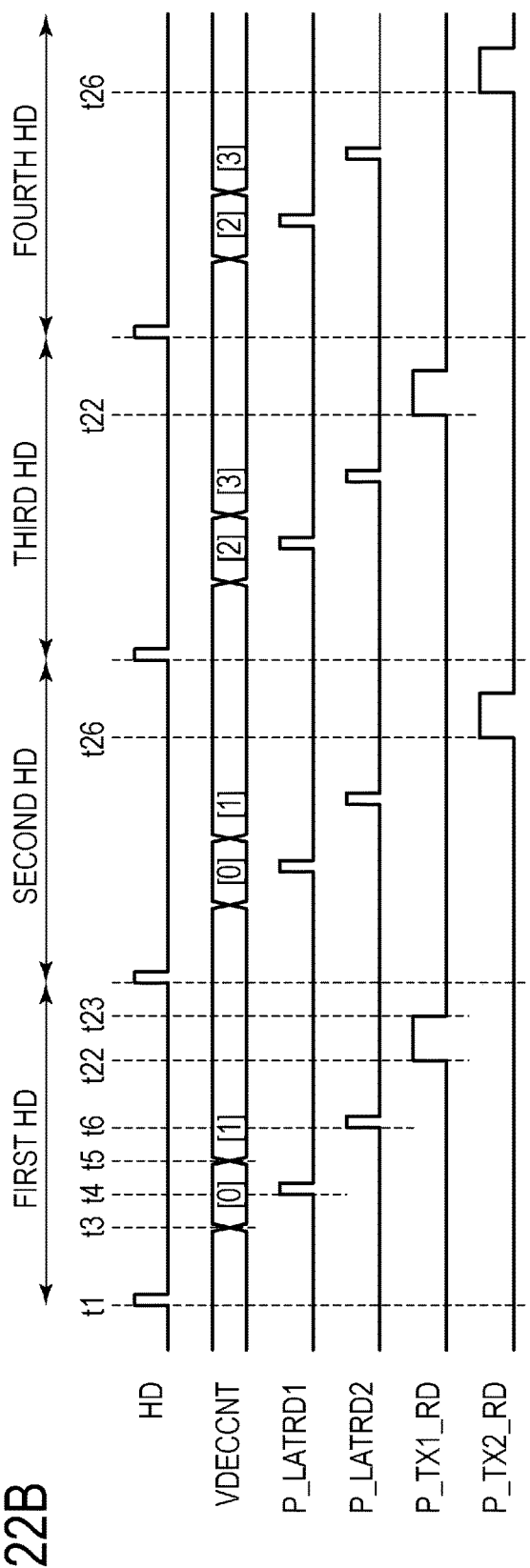

IMAGING DEVICE, IMAGING SYSTEM, AND MOBILE APPARATUS

BACKGROUND OF THE INVENTION

Field of the Invention

The present invention relates to an imaging device, an imaging system, and a mobile apparatus.

Description of the Related Art

Japanese Patent Application Laid-Open No. 2012-199913 discloses an imaging device having signal lines provided in a plurality of columns. A buffer is provided to each signal line, and a circuit can be tested by supplying the same signal to a signal receiving unit from the buffer via each signal line.

In the test scheme disclosed in Japanese Patent Application Laid-Open No. 2012-199913, however, since a plurality of signal lines have the same potential, it may be difficult to detect a failure in a case where signal lines are short-circuited each other.

SUMMARY OF THE INVENTION

According to an aspect of the present invention, provided is an imaging device including a pixel array including a plurality of pixels that are arranged to form a plurality of rows and a plurality of columns, each of the plurality of pixels being configured to generate signals in accordance with an incident light; a first output line and a second output line that are arranged corresponding to each of the plurality of columns of the pixel array and configured to transmit signals output from the pixels arranged on a corresponding column; a scanning unit configured to drive the pixel array so as to output signals from at least two of the pixels arranged on different rows of a single column respectively to the first output line and the second output line; and an output line control unit configured to provide potentials that are different from each other to the first output line and the second output line, respectively, in a test mode.

Further features of the present invention will become apparent from the following description of exemplary embodiments with reference to the attached drawings.

BRIEF DESCRIPTION OF THE DRAWINGS

FIG. 6C is a diagram illustrating the operation and the potential of the vertical output lines when a short-circuit occurs in the imaging device according to the first embodiment.

FIG. 12A is a diagram illustrating the operation and the potential of vertical output lines in a normal drive mode of the imaging device according to the modified example of the second embodiment.

FIG. 22A and FIG. 22B are diagrams illustrating the operation of the imaging device according to the sixth embodiment.

DESCRIPTION OF THE EMBODIMENTS

Preferred embodiments of the present invention will now be described in detail in accordance with the accompanying drawings. Corresponding components throughout a plurality of drawings are labeled with a common reference, and the description thereof may be omitted or simplified.

First Embodiment

Figure 1:
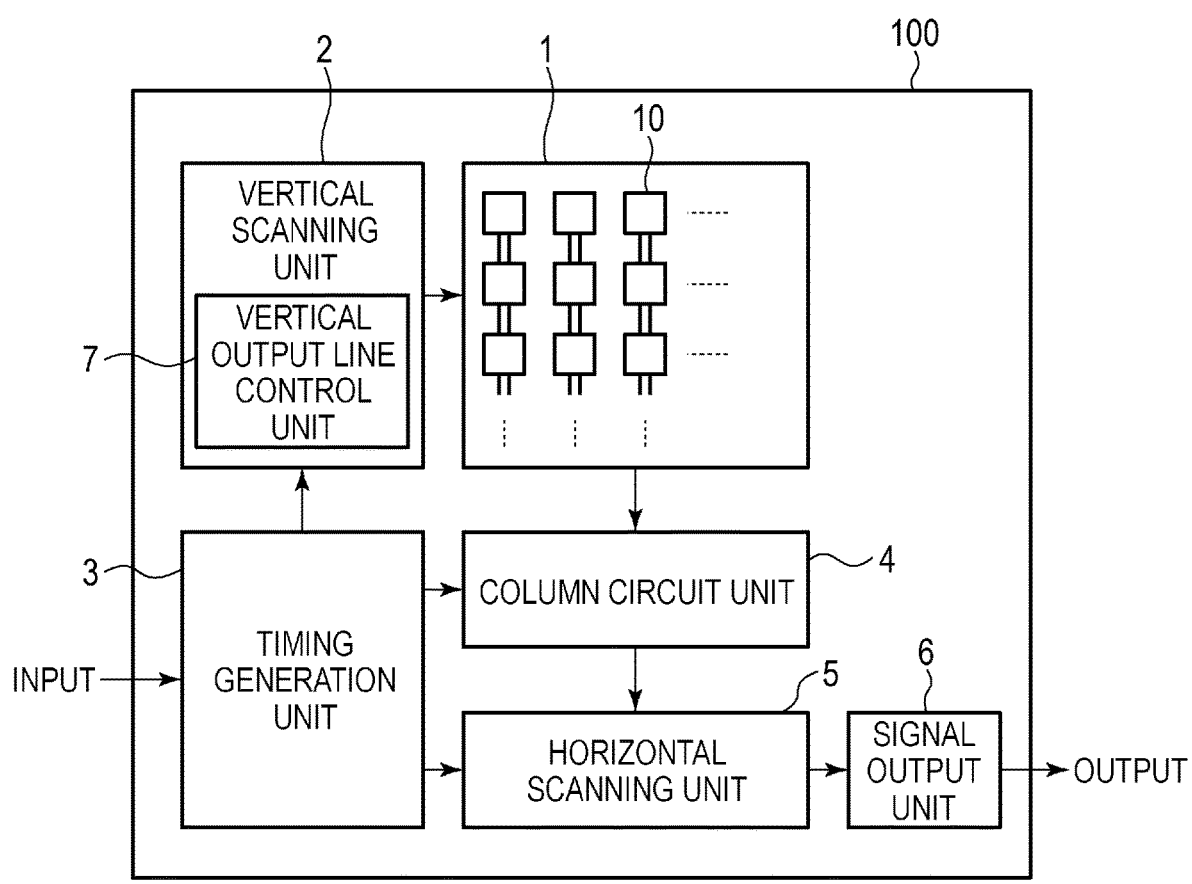
FIG. 1 is a block diagram of an imaging device according to a first embodiment.

FIG. 1 is a block diagram illustrating a configuration example of an imaging device 100 according to a first embodiment. The imaging device 100 has a pixel array 1, a vertical scanning unit 2, a timing generation unit 3, a column circuit unit 4, a horizontal scanning unit 5, and a signal output unit 6. The pixel array 1 includes a plurality of pixels 10 two-dimensionally arranged to form a plurality of rows and a plurality of columns. The pixel 10 generates a signal in accordance with an incident light by photoelectric conversion. The vertical scanning unit 2 supplies control signals to the plurality of pixels 10 aligned in the horizontal direction (lateral direction in FIG. 1) at the same time via control lines (not shown) arranged on a row basis. By the control signals being supplied sequentially for each row, a scan in the vertical direction (up-down direction in FIG. 1) is performed. In response to the control signals from the vertical scanning unit 2, pixel signals output from the pixels 10 are transmitted from vertical output lines, in which two vertical output lines are arranged on each corresponding column of the pixel array 1, and input to the column circuit unit 4.

The column circuit unit 4 performs processing such as amplification on the pixel signals output from the pixels 10 and temporarily holds the processed pixel signals in the memory inside the column circuit unit 4. The pixel signals held in the column circuit unit 4 are sequentially output to the signal output unit 6 via horizontal output lines in the horizontal scanning unit 5 in accordance with column address signals output from the horizontal scanning unit 5. The signal output unit 6 converts pixel signals into signals conforming to an external protocol and outputs the converted pixel signals to the outside of the imaging device 100.

The timing generation unit 3 receives a signal used as a reference of driving of the imaging device 100 and a signal used for setting the imaging device 100 from the outside of the imaging device 100. Based on these signals, the timing generation unit 3 outputs a vertical address signal and a signal related to a control timing to the vertical scanning unit 2. Based on these signals, the vertical scanning unit 2 controls the drive timing of the pixel array 1. Further, the timing generation unit 3 outputs a signal related to the control timing to the column circuit unit 4 and further outputs a horizontal address signal and a signal related to the control timing to the horizontal scanning unit 5.

The vertical scanning unit 2 includes a vertical output line control unit 7. The vertical output line control unit 7 performs control to provide different potentials from each other to the two vertical output lines of the pixel array 1 in accordance with signals from the timing generation unit 3. This is control in a test mode of the imaging device 100, and the specific details thereof will be described later.

Figure 2:
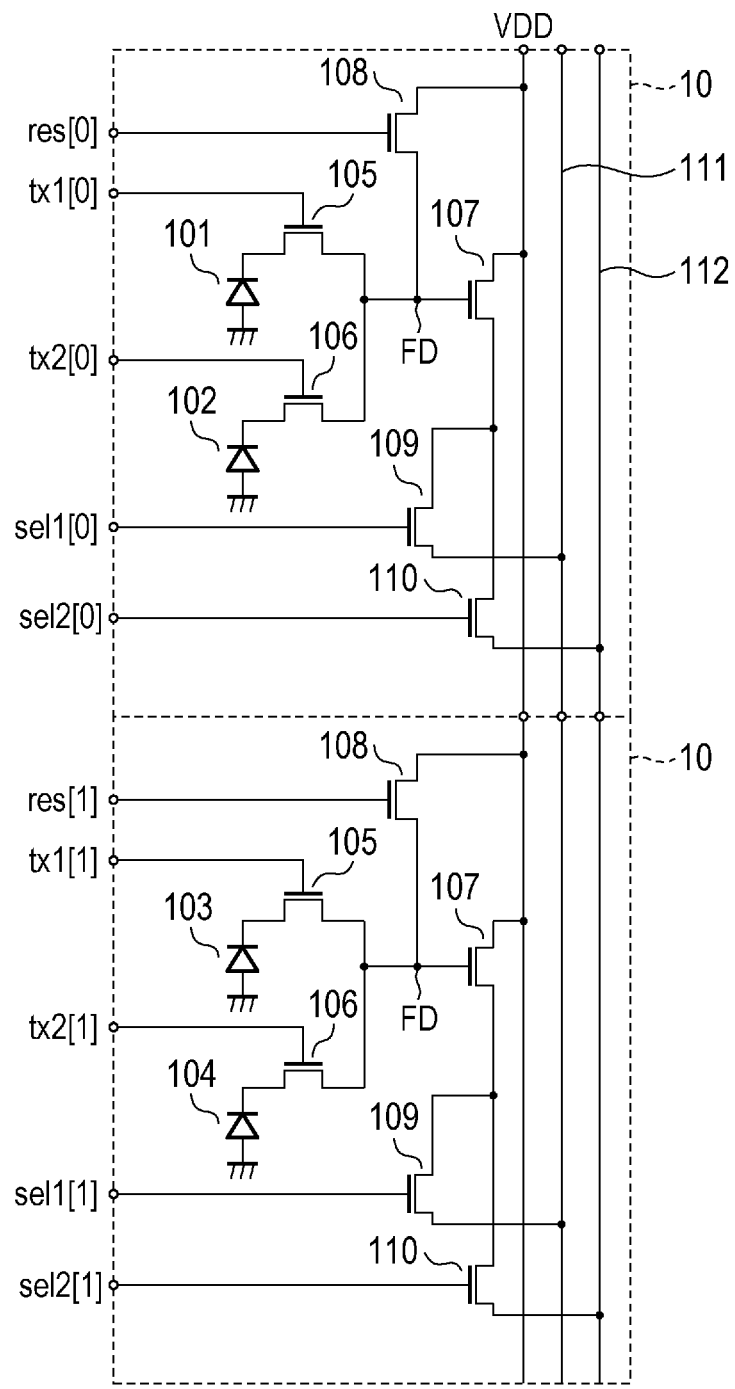
FIG. 2 is a diagram illustrating a circuit configuration of pixels according to the first embodiment.

FIG. 2 is a diagram illustrating a circuit configuration example of the pixels 10. FIG. 2 illustrates two pixels 10 arranged on the same column out of the plurality of pixels 10 forming the pixel array 1. In FIG. 2, the pixel 10 arranged in the upper side is the pixel 10 on the 0-th row, and the pixel 10 arranged in the lower side is the pixel 10 on the first row. Since each of the two pixels 10 has the same configuration, the pixel 10 on the 0-th row will be mainly described below, and a part of the description of the pixel 10 on the first row will be omitted or simplified.

The pixel 10 on the 0-th row has photoelectric conversion elements 101 and 102, transfer transistors 105 and 106, an amplification transistor 107, a reset transistor 108, and select transistors 109 and 110. While the pixel 10 on the first row has the same configuration, the photoelectric conversion elements 103 and 104 thereof are provided with different references from those on the 0-th row for distinction. Each of the photoelectric conversion elements 101, 102, 103, and 104 is a photodiode that generates charges in accordance with an incident light by photoelectric conversion, for example. Each transistor is an n-type metal oxide semiconductor (MOS) transistor, for example.

The anode of the photoelectric conversion element 101 is grounded, and the cathode of the photoelectric conversion element 101 is connected to the source of the transfer transistor 105. Further, the anode of the photoelectric conversion element 102 is grounded, and the cathode of the photoelectric conversion element 102 is connected to the source of the transfer transistor 106. The drain of the transfer transistor 105 and the drain of the transfer transistor 106 are connected to the source of the reset transistor 108 and the gate of the amplification transistor 107. The node of the drain of the transfer transistor 105, the drain of the transfer transistor 106, the source of the reset transistor 108, and the gate of the amplification transistor 107 forms a floating diffusion FD. Accordingly, charges generated by the photoelectric conversion elements 101 and 102 are transferred to the floating diffusion FD that is an input node of the amplification transistor 107.

The drain of the reset transistor 108 and the drain of the amplification transistor 107 are connected to a power source potential line that supplies a power source potential VDD. The source of the amplification transistor 107 is connected to the drain of the select transistor 109 and the drain of the select transistor 110.

Note that the name of the source and drain of a transistor may be different in accordance with a conductivity type of the transistor, a function in interest, or the like, and may be the opposite name to the source and drain described above.

Two vertical output lines 111 and 112 extending in the column direction are arranged on each column of the pixel array 1. The vertical output line 111 (first output line) is connected to the sources of the select transistors 109 of a plurality of pixels 10 aligned in the column direction, and the vertical output line 112 (second output line) is connected to the sources of the select transistors 110 of the plurality of pixels 10 aligned in the column direction. Accordingly, the vertical output lines 111 and 112 form signal lines common to the pixels 10 on the same column. A current source (not shown) is connected to each of the vertical output lines 111 and 112. Thereby, the amplification transistor 107 and the current source form a source follower circuit that causes the vertical output line 111 or the vertical output line 112 to output a potential in accordance with the potential of the floating diffusion FD.

Further, control signals res(0), tx1(0), tx2(0), sel1(0), and sel2(0) are input to the pixel 10 on the 0-th row from the vertical scanning unit 2. Here, the index provided to each control signal indicates the row number. The control signal res(0) is input to the gate of the reset transistor 108 to control the reset transistor 108 to an on-state (conduction state) or an off-state (non-conduction state). When the reset transistor 108 is in an on-state, the potential of the floating diffusion FD is reset.

The control signal tx1(0) and tx2(0) are input to the gates of the transfer transistors 105 and 106, respectively, to control the transfer transistors 105 and 106 to an on-state or an off-state. When the transfer transistor 105 is in an on-state, charges accumulated in the photoelectric conversion element 101 are transferred to the floating diffusion FD. When the transfer transistor 106 is in an on-state, charges accumulated in the photoelectric conversion element 102 are transferred to the floating diffusion FD.

The control signal sel1(0) and sel2(0) are input to the gates of the select transistors 109 and 110, respectively, to control the select transistors 109 and 110 to an on-state or an off-state. When the select transistor 109 is in an on-state, the source of the amplification transistor 107 is connected to the vertical output line 111, and the potential in accordance with the potential of the floating diffusion FD is output to the vertical output line 111. When the select transistor 110 is in an on-state, the source of the amplification transistor 107 is connected to the vertical output line 112, and the potential in accordance with the potential of the floating diffusion FD is output to the vertical output line 112. Note that each transistor is in an on-state when the input control signal is at a high level.

In the present embodiment, two vertical output lines 111 and 112 are provided to each column of the pixel array 1. Thus, for example, by outputting a signal from the pixels 10 on the 0-th row to the vertical output line 111 and outputting a signal from the pixel 10 on the first row to the vertical output line 112, pixel signals from the plurality of pixels 10 provided on different rows on the same column can be output at the same time.

Figure 3:
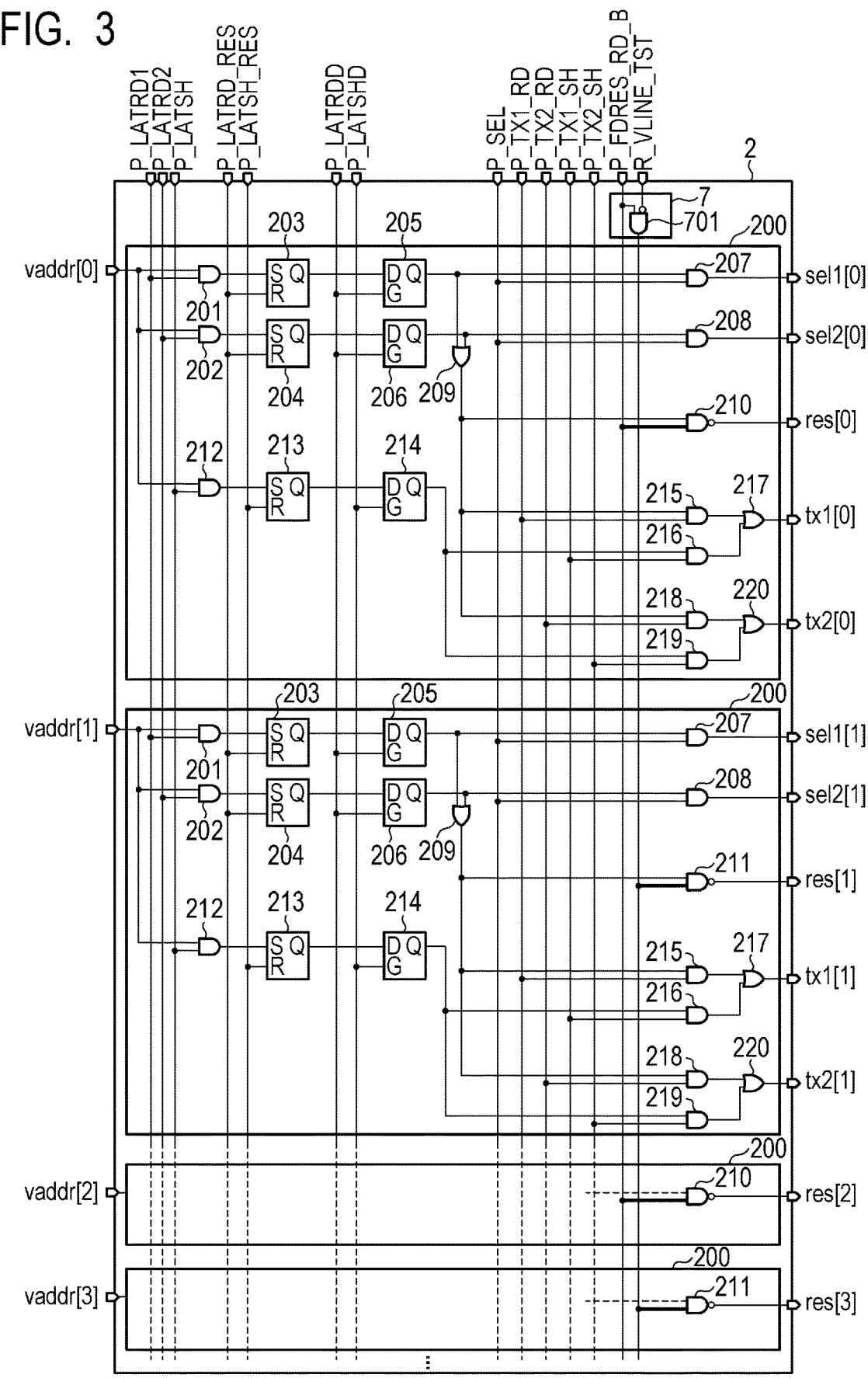
FIG. 3 is a diagram illustrating a circuit configuration of a vertical scanning unit and a vertical output line control unit according to the first embodiment.

FIG. 3 is a diagram illustrating a circuit configuration example of the vertical scanning unit 2 and the vertical output line control unit 7. The vertical scanning unit 2 includes the vertical output line control unit 7 and row drive circuits 200 provided on each row. The vertical scanning unit 2 decodes vertical address signals input from the timing generation unit 3 by a decoder (not shown) and generates and inputs a row address signal vaddr(k) to the row drive circuit 200 on the corresponding row. When being at a high level, the row address signal vaddr(k) indicates that the row is designated. The row drive circuit 200 on a row designated by a row address signal generates a control signal used for driving the pixel 10 on the corresponding row. Specifically, the row drive circuit 200 on the k-th row generates the control signals sel1(k), sel2(k), res(k), tx1(k), and tx2(k) based on the row address signal vaddr(k). The index k denotes the row number on any row of the pixels 10 forming the pixel array 1. In FIG. 3, depiction of the row drive circuits 200 on and after the second row is omitted or simplified. Further, wirings whose connection relationship are different between the even-numbered row and the odd-numbered row are depicted in bold lines.

Further, the vertical scanning unit 2 is input with control signals P_LATRD1, P_LATRD2, P_LATSH, P_LATRD_RES, P_LATSH_RES, P_LATRDD, and P_LATSHD from the timing generation unit 3. These control signals are used for control to temporarily hold the row address signal vaddr(k) indicating a designated row.

Further, the vertical scanning unit 2 is input with control signals P_SEL, P_TX1_RD, P_TX2_RD, P_TX1_SH, P_TX2_SH, P_FDRES_RD_B, and R_VLINE_TST from the timing generation unit 3. These control signals are used for generating signals used for driving the pixels 10.

The row drive circuit 200 on the 0-th row input with the row address signal vaddr(0) will be mainly described below. With respect to the row drive circuit 200 on the first row, only the feature which is different from that of the row drive circuit 200 on the 0-th row will be described. Since the row drive circuits 200 on and after the second row have the same configuration as that of the row drive circuit 200 on the 0-th row or the first row, the description thereof will be omitted.

The row drive circuit 200 on the 0-th row includes AND circuits 201, 202, 207, 208, 212, 215, 216, 218, and 219, SR latches 203, 204, and 213, D latches 205, 206, and 214, OR circuits 209, 217, and 220, and a NAND circuit 210. Further, the row drive circuit 200 on the first row includes a NAND circuit 211 instead of the NAND circuit 210. The vertical output line control unit 7 includes an AND circuit 701.

The row drive circuit 200 on the 0-th row will be described. The row address signal vaddr(0) is input to one input terminal of each of the AND circuits 201, 202, and 212. The control signal P_LATRD1 is input to the other input terminal of the AND circuit 201. The AND circuit 201 outputs an AND of the row address signal vaddr(0) and the control signal P_LATRD1 to the set terminal S of the SR latch 203 and causes the SR latch 203 to hold it. The control signal P_LATRD2 is input to the other input terminal of the AND circuit 202. The AND circuit 202 outputs an AND of the row address signal vaddr(0) and the control signal P_LATRD2 to the set terminal S of the SR latch 204 and causes the SR latch 204 to hold it. The control signal P_LATSH is input to the other input terminal of the AND circuit 212. The AND circuit 212 outputs an AND of the row address signal vaddr(0) and the control signal P_LATSH to the set terminal S of the SR latch 213 and causes the SR latch 213 to hold it.

The control signal P_LATRD_RES is input to the reset terminal R of the SR latch 203 and the reset terminal R of the SR latch 204. The control signal P_LATSH_RES is input to the reset terminal R of the SR latch 213.

The output signals from the output terminals Q of the SR latches 203, 204, and 213 are input to the data input terminals D of the D latch 205, 206, and 214, respectively. The control signal P_LATRDD is input to the gate input terminal G of the D latch 205 and the gate input terminal G of the D latch 206. The D latches 205 and 206 hold signals output from the SR latches 203 and 204, respectively, at a timing based on the control signal P_LATRDD using the control signal P_LATRDD as a clock. The control signal P_LATSHD is input to the gate input terminal G of the D latch 214. The D latch 214 holds a signal output from the SR latch 213 at a timing based on the control signal P_LATSHD using the control signal P_LATSHD as a clock. Since the control signals P_LATRDD and P_LATSHD are input to all the rows, driving such as readout can be performed at the same time for the pixels 10 on a plurality of rows.

Signals held in the D latches 205 and 206 are output from the output terminals Q and input to one input terminals of the AND circuits 207 and 208, respectively. The control signal P_SEL is input to the other input terminals of the AND circuits 207 and 208. The AND circuit 207 outputs an AND of the output of the D latch 205 and the control signal P_SEL to the pixels 10 on the 0-th row as the control signal sel1(0). Further, the AND circuit 208 outputs an AND of the output of the D latch 206 and the control signal P_SEL to the pixels 10 on the 0-th row as the control signal sel2(0).

Further, the output signal of the D latch 205 is input to one input terminal of the OR circuit 209, and the output signal of the D latch 206 is input to the other input terminal of the OR circuit 209. The OR circuit 209 outputs an OR of the output of the D latch 205 and the output of the D latch 206 to one input terminal of the NAND circuit 210, one input terminal of the AND circuit 215, and one input terminal of the AND circuit 218.

The control signal P_FDRES_RD_B is input to the other input terminal of the NAND circuit 210. The NAND circuit 210 outputs an inverse value of an AND of the output of the OR circuit 209 and the control signal P_FDRES_RD_B to the pixels 10 on the 0-th row as the control signal res(0).

The control signal P_TX1_RD is input to the other input terminal of the AND circuit 215. The AND circuit 215 outputs an AND of the output of the OR circuit 209 and the control signal P_TX1_RD to one input terminal of the OR circuit 217. A signal held in the D latch 214 is output from the output terminal Q and input to one input terminals of the AND circuits 216 and 219. The control signal P_TX1_SH is input to the other input terminal of the AND circuit 216. The AND circuit 216 outputs an AND of the output of the D latch 214 and the control signal P_TX1_SH to the other input terminal of the OR circuit 217. The OR circuit 217 outputs an OR of the output of the AND circuit 215 and the output of the AND circuit 216 to the pixels 10 on the 0-th row as the control signal tx1(0).

The control signal P_TX2_RD is input to the other input terminal of the AND circuit 218. The AND circuit 218 outputs an AND of the output of the OR circuit 209 and the control signal P_TX2_RD to one input terminal of the OR circuit 220. The control signal P_TX2_SH is input to the other input terminal of the AND circuit 219. The AND circuit 219 outputs an AND of the output of the D latch 214 and the control signal P_TX2_SH to the other input terminal of the OR circuit 220. The OR circuit 220 outputs an OR of the output the AND circuit 218 and the output of the AND circuit 219 to the pixels 10 on the 0-th row as the control signal tx2(0).

As described above, the SR latch 203 and the D latch 205 latch a signal that designates a row for performing a readout operation for outputting a signal from the pixels 10 on the 0-th row to the vertical output lines 111. The SR latch 204 and the D latch 206 latch a signal that designates a row for performing a readout operation for outputting a signal from the pixels 10 on the 0-th row to the vertical output lines 112. The SR latch 213 and D latch 214 latch a signal that resets charges accumulated in the photoelectric conversion elements 101 and 102 and the floating diffusions FD of the pixels 10 on the 0-th row and then designates a row on which electronic shutter operation by releasing reset is performed.

Next, the row drive circuit 200 and the vertical output line control unit 7 on the first row will be described. The row drive circuit 200 on the first row includes the NAND circuit 211 instead of the NAND circuit 210. The output signal of the OR circuit 209 is input to one input terminal of the NAND circuit 211. The vertical output line control unit 7 includes an AND circuit 701. The control signal P_FDRES_RD_B is input to one input terminal of the AND circuit 701, and an inverse value of the control signal R_VLINE_TST is input to the other input terminal. The AND circuit 701 outputs an AND of the control signal P_FDRES_RD_B and an inverse value of the control signal R_VLINE_TST to the other input terminal of the NAND circuits 211 on the odd-numbered rows (the first row, the third row, . . . ). The NAND circuit 211 outputs an inverse value of an AND of the output of the OR circuit 209 and the output of the AND circuit 701 to the pixels 10 on the first row as the control signal res(1).

The configuration of the row drive circuits 200 on the even-numbered rows such as the second row, the fourth row, and the like is the same as that of the row drive circuit 200 on the 0-th row, and the configuration of the row drive circuits 200 on the odd-numbered rows such as the third row, the fifth row, and the like is the same as that of the row drive circuit 200 on the first row.

The control signal R_VLINE_TST is a signal that switches a normal drive mode for outputting normal pixel signals and a test mode for detecting a failure of the imaging device 100. In the normal drive mode, the control signal R_VLINE_TST is at a low level, and the output of the AND circuit 701 matches the control signal P_FDRES_RD_B. Therefore, the NAND circuit 210 on the even-numbered row and the NAND circuit 211 on the odd-numbered row perform the same operation. In the test mode, the control signal R_VLINE_TST is at a high level, and the output of the AND circuit 701 is at a low level. Therefore, the output of the NAND circuit 211 on the odd-numbered row is at a high level, and the odd-numbered control signals res(1), res(3), . . . , and so on are maintained at a high level.

Figure 4:
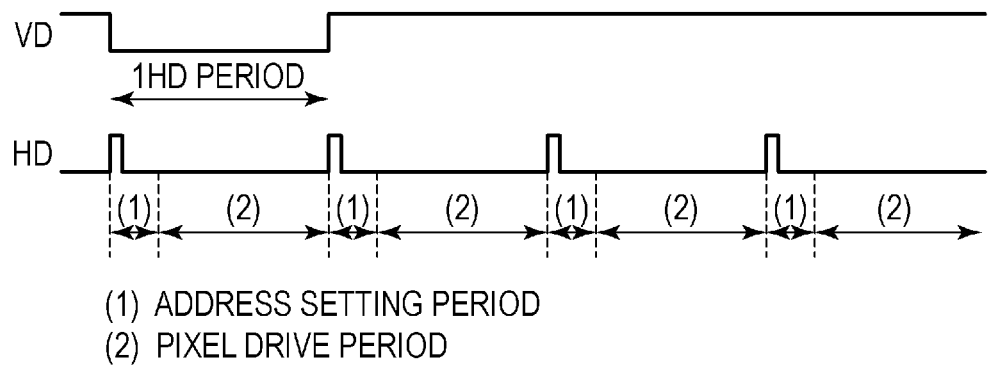
FIG. 4 is a diagram of a general operation of the imaging device according to the first embodiment.
Figure 5:
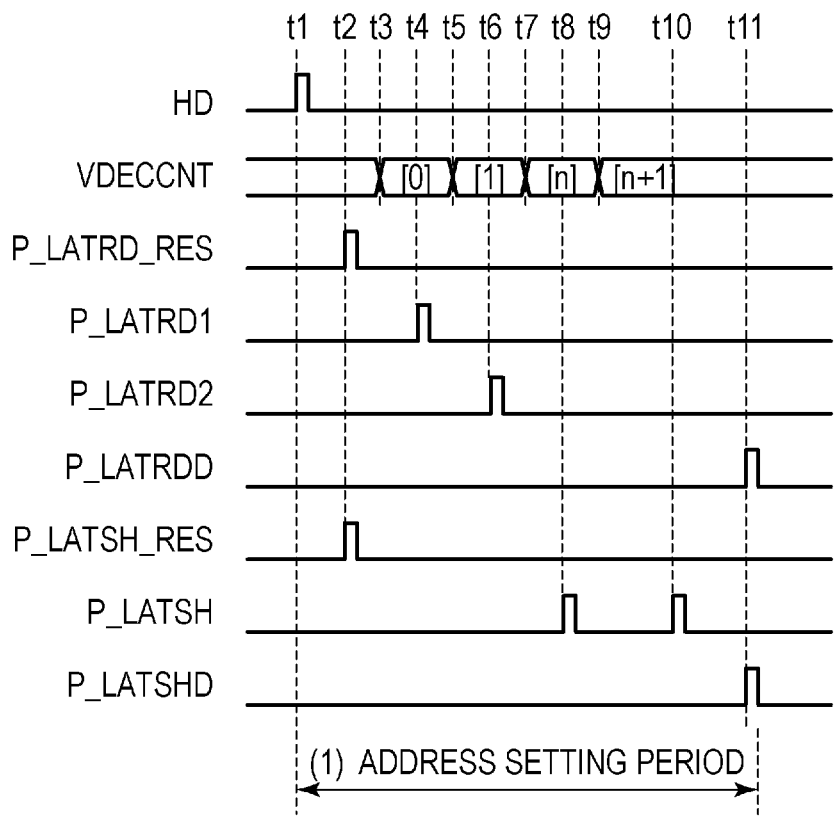
FIG. 5 is a diagram illustrating the operation in an address setting period of the imaging device according to the first embodiment.
Figure 6A:
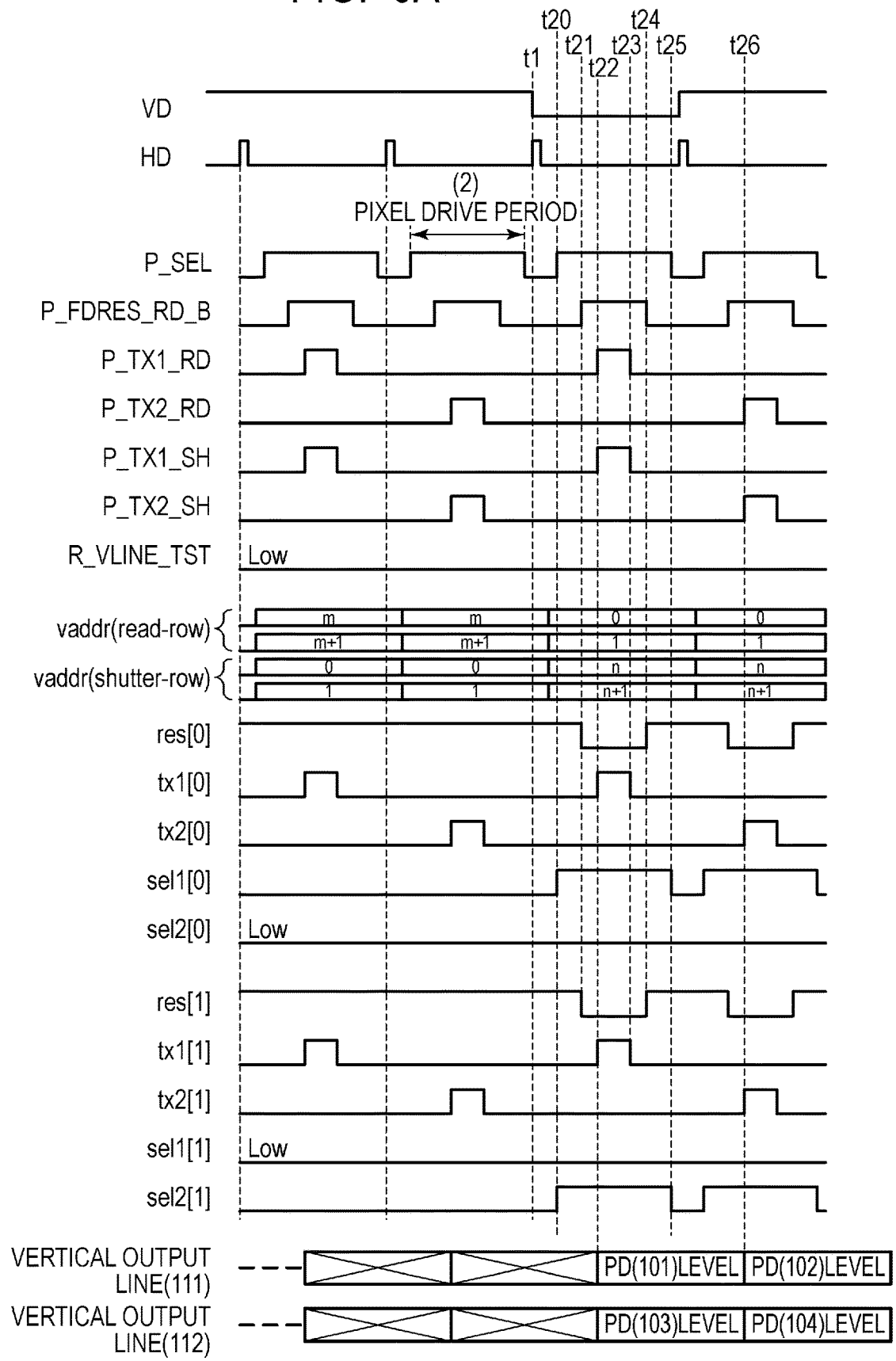
FIG. 6A is a diagram illustrating the operation and the potential of vertical output lines in a normal drive mode of the imaging device according to the first embodiment.
Figure 6B:
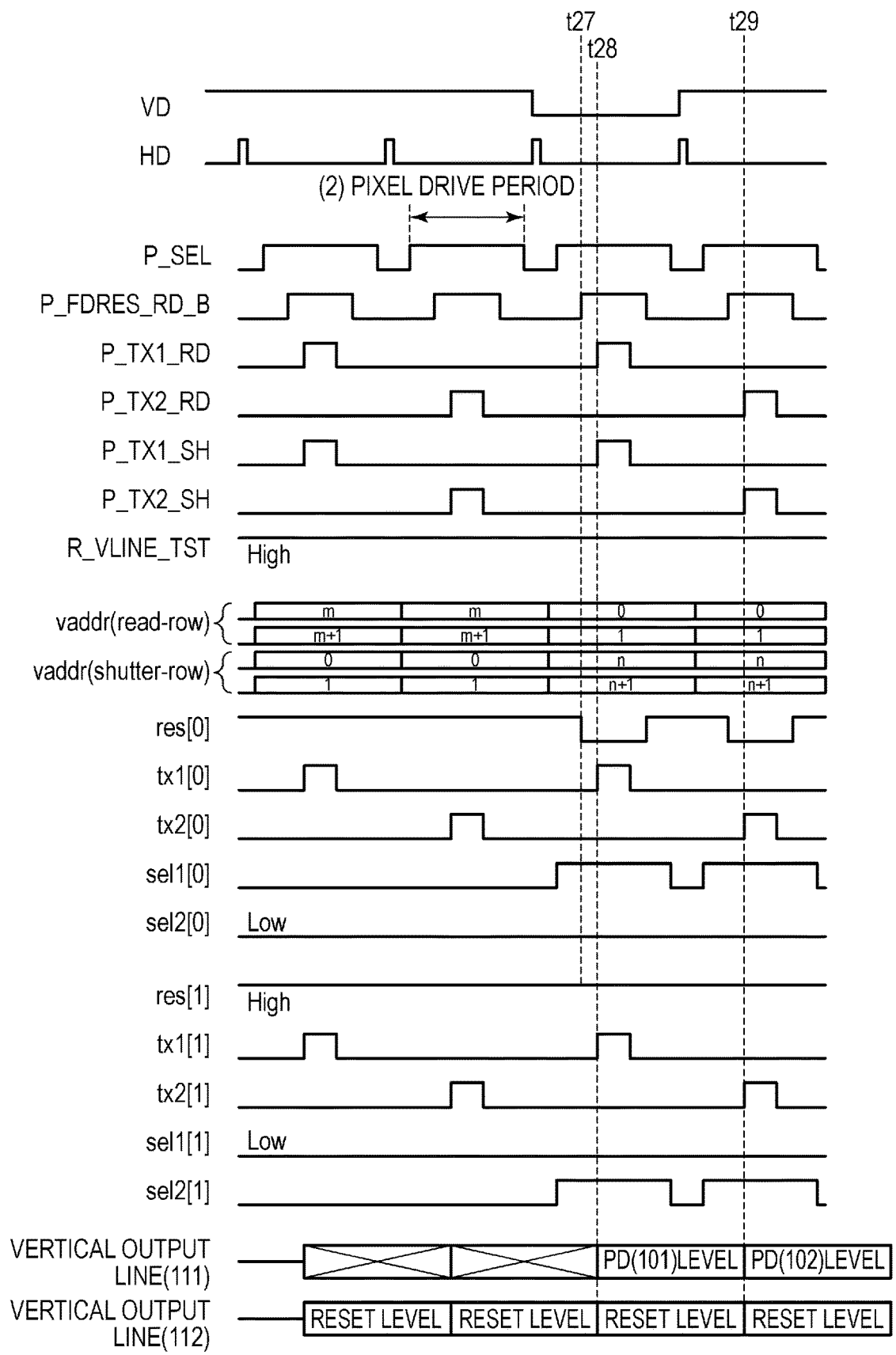
FIG. 6B is a diagram illustrating the operation and the potential of the vertical output lines in a test mode of the imaging device according to the first embodiment.

Next, the operation of the imaging device 100 will be described by using FIG. 4, FIG. 5, FIG. 6A, FIG. 6B, and FIG. 6C. FIG. 4 is a timing chart illustrating a general operation of the imaging device 100. FIG. 5 is a timing chart illustrating the operation in an address setting period of the imaging device 100. FIG. 6A is a diagram illustrating the operation timing and the potential of the vertical output lines 111 and 112 in the normal drive mode of the imaging device 100. FIG. 6B is a diagram illustrating the operation timing and the potential of the vertical output lines 111 and 112 in the test mode of the imaging device 100. FIG. 6C is a diagram illustrating the operation timing and the potential of the vertical output lines 111 and 112 in the test mode when a short-circuit occurs between the vertical output line 111 and the vertical output line 112.

FIG. 4 illustrates the timing of a vertical synchronization signal VD and a horizontal synchronization signal HD. The vertical synchronization signal VD and the horizontal synchronization signal HD are reference timing signals input for driving the imaging device 100. The pulse interval of the horizontal synchronization signal HD is denoted as one HD period. Driving of the pixels 10 for one row is performed within one HD period, and pixel signals for one row is output from the imaging device 100. The pulse interval of the vertical synchronization signal VD is denoted as one VD period (not shown). One VD period corresponds to a period in which pixel signals for one frame are output. One HD period includes an address setting period for setting a row address to be driven ((1) of FIG. 4) and a pixel drive period for driving the pixels 10 ((2) of FIG. 4).

FIG. 5 illustrates the operation in the address setting period ((1) of FIG. 4) in more detail. A signal VDECCNT in FIG. 5 illustrates a vertical address signal output from the timing generation unit 3. By decoding the vertical address signal VDECCENT, a row address signal input to the row drive circuit 200 on each row is generated. A row address signal of a row number whose value is indicated in the vertical address signal VDECCENT of FIG. 5 is at a high level, and row address signals of other row numbers are at a low level.

At the time t1, the horizontal synchronization signal HD is input, one HD period starts, and an address setting period also starts. At the time t2, the control signals P_LATRD_RES and P_LATSH_RES rise to a high level. Thereby, the SR latches 203, 204, and 213 are reset.

Next, address setting for a readout operation is performed. At the time t3, the value of the vertical address signal VDECCNT output from the timing generation unit 3 is set to 0. Thereby, the row address signal vaddr(0) on the 0-th row obtained by decoding the vertical address signal VDECCNT rises to a high level. At the time t4, the control signal P_LATRD1 rises to a high level, the output of the AND circuit 201 on the 0-th row is set to a high level, and this signal is set to the SR latch 203.

At the time t5, the value of the vertical address signal VDECCNT is set to 1. Thereby, the row address signal vaddr(1) on the first row rises to a high level. At the time t6, the control signal P_LATRD2 rises to a high level, the output of the AND circuit 202 on the first row is set to a high level, and this signal is set to the SR larch 204.

Next, address setting for a shutter operation is performed. At the time t7, the value of the vertical address signal VDECCNT is set to n. Thereby, the row address signal vaddr(n) on the n-th row rises to a high level. At the time t8, the control signal P_LATSH rises to a high level, the output of the AND circuit 212 on the n-th row is set to a high level, and this signal is set to the SR larch 213 on the n-th row. Next, at the time t9, the value of the vertical address signal VDECCNT is set to n+1. Thereby, the row address signal vaddr(n+1) on the (n+1)-th row rises to a high level. At the time t10, the control signal P_LATSH rises to a high level, the output of the AND circuit 212 on the (n+1)-th row is set to a high level, and this signal is set to the SR larch 213 on the (n+1)-th row. Note that n is an even number in the following description.

According to the operation described above, the row drive circuits 200 on the 0-th row and the first row are set as rows for performing a readout operation (readout row), and the row drive circuits 200 on the n-th row and the (n+1)-th row are set as rows for performing a shutter operation (shutter row).

At the time t11, the control signals P_LATRDD and P_LATSHD rise to a high level. Thereby, the outputs of the D latch 205 on the 0-th row, the D latch 206 on the first row, and the D latches 214 on the n-th row and the (n+1)-th row are set to a high level.

FIG. 6A illustrates the operation in the pixel drive period in the normal drive mode ((2) of FIG. 4) and the potential of the vertical output lines. In FIG. 6A, a row address signal on the readout row set in the address setting period is denoted as vaddr(read-row), and a row address signal on the shutter row set in the address setting period is denoted as vaddr (shutter-row). Note that, in FIG. 6A, with respect to control signals output from the vertical scanning unit 2 and input to the pixels 10, the control signals only on the 0-th row and the first row, which are readout rows, are illustrated, and control signals on other rows are not illustrated. However, control signals on the shutter rows (the n-th row and the (n+1)-th row) may be described if necessary.

A readout operation and a shutter operation in the normal drive mode will be described below with reference to FIG. 6A. Since the normal drive mode is applied, the control signal R_VLINE_TST is maintained at a low level.

The time t1 is a timing of start of one HD period, as described with reference to FIG. 5. In the address setting period from the time t1 to the time t20, the address setting described in FIG. 5 is performed. Therefore, the vaddr(readrow) is 0 and 1, that is, the readout rows are the 0-th row and the first row, and the vaddr(shutter-row) is n and n+1, that is, the shutter rows are the n-th row and the (n+1)-th row.

At the time t20, the control signal P_SEL rises to a high level. Thereby, the control signal sel1(0) that is an output of the AND circuit 207 on the 0-th row and the control signal sel2(1) that is an output of the AND circuit 208 on the first row rise to a high level. Therefore, the select transistor 109 on the 0-th row and the select transistor 110 on the first row are turned on.

At the time 21, the control signal P_FDRES_RD_B rises to a high level. Further, since the control signal R_VLINE_TST is at a low level, the output of the AND circuit 701 is at a high level. At this time, the control signal res(0) that is the output of the NAND circuit 210 on the 0-th row and the control signal res(1) that is the output of the NAND circuit 211 on the first row fall to a low level. Therefore, the reset transistors 108 on the 0-th row and the first row are turned off. On the other hand, on the shutter row, since the output of the OR circuit 209 is at a low level, the outputs of the NAND circuits 210 and 211 are maintained at a high level, and the control signals res(n) and res(n+1) are maintained at a high level. Therefore, the reset transistors 108 on the n-th row and (n+1)-th row are maintained in an on-state.

At the time t22, the control signals P_TX1_RD and P_TX1_SH rise to a high level. Thereby, the outputs of the OR circuits 217 on the 0-th row and the first row, which are readout rows, and the n-th row and the (n+1)-th row, which are shutter rows, that is, the control signals tx1(0), tx1(1), tx1(n), and tx1(n+1) rise to a high level. Therefore, the transfer transistors 105 on the 0-th row, the first row, the n-th row, and the (n+1)-th row are turned on.

As discussed above, in the pixel 10 on the 0-th row, since the reset transistor 108 is in an off-state, the transfer transistor 105 is in an on-state, and the select transistor 109 is in an on-state, the potential based on charges generated by the photoelectric conversion element 101 is output to the vertical output line 111. Also, at the pixel 10 on the first row, since the reset transistor 108 is in an off-state, the transfer transistor 105 is in an on-state, and the select transistor 110 is in an on-state, the potential based on charges generated by the photoelectric conversion element 103 is output to the vertical output line 112. FIG. 6A depicts the potentials provided to the vertical output lines 111 and 112, and the "PD(101) level" of the vertical output line 111 indicates that the potential of the vertical output line 111 is a level based on charges generated by the photoelectric conversion element 101, for example.

Further, in the pixel 10 on the n-th row, since the reset transistor 108 is in an on-state and the transfer transistor 105 is in an on-state, the photoelectric conversion element 101 is reset. Similarly, in the pixel 10 on the (n+1)-th row, since the reset transistor 108 is in an on-state and the transfer transistor 105 is in an on-state, the photoelectric conversion element 103 is also reset.

At the time t23, the control signals P_TX1_RD and P_TX1_SH fall to a low level, and the control signals tx1(0), tx1(1), tx1(n), and tx1(n+1) fall to a low level. Thereby, the transfer transistors 105 on the 0-th row, the first row, the n-th row, and the (n+1)-th row are turned off.

At the time t24, the control signal P_FDRES_RD_B falls to a low level, and the control signals res(0) and res(1) rise to a high level. Thereby, the reset transistors 108 on the 0-th row and the first row are turned on, and the floating diffusion FD is reset.

At the time t25, the control signal P_SEL falls to a low level, and the control signal sel1(0) and the control signal sel2(1) fall to a low level. The select transistor 109 on the 0-th row and the select transistor 110 on the first row are turned off. The period from the time t20 to the time t25 in which the control signal P_SEL is at a high level is a pixel drive period.

For the subsequent periods, the description of the same operation as above will be omitted. At the time t26, the control signal P_TX2_RD and P_TX2_SH rise to a high level. Thereby, the outputs of the OR circuits 220 on the 0-th row and the first row, which are readout rows, and the n-th row and the (n+1)-th row, which are shutter rows, that is, the control signals tx2(0), tx2(1), tx2(n), and tx2(n+1) rise to a high level. Therefore, the transfer transistors 106 on the 0-th row, the first row, the n-th row, and the (n+1)-th row are turned on.

As discussed above, in the pixel 10 on the 0-th row, since the reset transistor 108 is in an off-state, the transfer transistor 106 is in an on-state, and the select transistor 109 is in an on-state, the potential based on charges generated by the photoelectric conversion element 102 is output to the vertical output line 111. Also, at the pixel 10 on the first row, since the reset transistor 108 is in an off-state, the transfer transistor 106 is in an on-state, and the select transistor 110 is in an on-state, the potential based on charges generated by the photoelectric conversion element 104 is output to the vertical output line 112.

Further, in the pixel 10 on the n-th row, since the reset transistor 108 is in an on-state and the transfer transistor 106 is in an on-state, the photoelectric conversion element 102 is reset. Similarly, in the pixel 10 on the (n+1)-th row, since the reset transistor 108 is in an on-state and the transfer transistor 106 is in an on-state, the photoelectric conversion element 104 is also reset.

As discussed above, a readout operation from the pixels 10 on the 0-th row and the first row and a shutter operation of the pixels 10 on the n-th row and the (n+1)-th row in the normal drive mode are performed.

Next, a readout operation and a shutter operation in the test mode will be described below with reference to FIG. 6B. Since the test mode is applied, the control signal R_VLINE_TST is maintained at a high level. The description of the same operation as that in FIG. 6A will be omitted.

At the time t27, the control signal P_FDRES_RD_B rises to a high level. Further, since the control signal R_VLINE_TST is at a high level, the output of the AND circuit 701 is at a low level regardless of the level of the control signal P_FDRES_RD_B. Thus, while the control signal res(0) that is the output of the NAND circuit 210 on the 0-th row is at a low level, the control signal res(1) that is the output of the NAND circuit 211 on the first row is maintained at a high level. Therefore, the reset transistor 108 on the 0-th row is in an off-state, and the reset transistor 108 on the first row is maintained at an on-state. That is, the floating diffusion FD of the pixel 10 on the first row is maintained in a reset state.

At the time t28, the same operation as that of the normal drive mode is performed, and the transfer transistors 105 on the 0-th row, the first row, the n-th row, and the (n+1)-th row are turned on.

As discussed above, in the pixel 10 on the 0-th row, the same operation as that of the normal drive mode is performed, the potential of a level based on charges generated by the photoelectric conversion element 101 is output to the vertical output line 111. Further, in the pixel 10 on the first row, since the reset transistor 108 is in an on-state, the potential of the reset level is output to the vertical output line 112. In such a way, a normal pixel signal is output to the vertical output line 111, and a pixel signal in a reset state is output to the vertical output line 112. Note that the operation of a shutter row does not affect the potentials on the vertical output lines 111 and 112.

The potentials on the vertical output lines 111 and 112 illustrated in FIG. 6B are provided assuming that there is no short-circuit between the vertical output line 111 and the vertical output line 112 and the imaging device 100 normally operates. Contrarily, the potential on the vertical output lines when there is a short-circuit between the vertical output line 111 and the vertical output line 112 will be described with reference to FIG. 6C.

FIG. 6C illustrates the operation and the potentials of the vertical output lines 111 and 112 when there is a short-circuit between the vertical output line 111 and the vertical output line 112 in the test mode illustrated in FIG. 6B. Since the operation timing of each control signal is the same as that in FIG. 6B, the description thereof will be omitted. When there is a short-circuit between the vertical output line 111 and the vertical output line 112, the potentials of both vertical output lines are the same. Thus, the potential of the vertical output line 111 and the vertical output line 112 is a potential different from the case of no short-circuit. Specifically, the level of the signal output to the vertical output line 111 and the vertical output line 112 becomes an intermediate level such as an arithmetic mean of a signal level based on charges generated by a photoelectric conversion element and a signal level based on a reset state, as illustrated in FIG. 6C. Alternatively, because the amplification transistor 107 of one of the pixels is not in a state of operating in a saturation area, a signal of the other pixel (for example, a signal level based on a reset state) may be output to the vertical output line 111 and the vertical output line 112.

As discussed above, the imaging device 100 of the present embodiment can perform an operation in a test mode by turning the control signal R_VLINE_TST to a high level. In the test mode, the vertical output line 111 and the vertical output line 112 are provided with potentials different from each other. Thereby, the imaging device 100 of the present embodiment can output signals having different levels between a case where there is a short-circuit between the vertical output line 111 and the vertical output line 112 and a case where there is no short-circuit. This enables detection of a short-circuit based on the output signal of the test mode inside or outside the imaging device 100. As discussed above, according to the present embodiment, the imaging device 100 that can detect a short-circuit among a plurality of output lines can be provided.

Modified Example of First Embodiment

Next, a modified example of the first embodiment will be described. In the present modified example, the function of the vertical output line control unit 7 is provided in the timing generation unit 3 instead of in the vertical scanning unit 2. Features that are different from those of the above-described first embodiment will be mainly described below, and the description of common features will be omitted or simplified.

Figure 7:
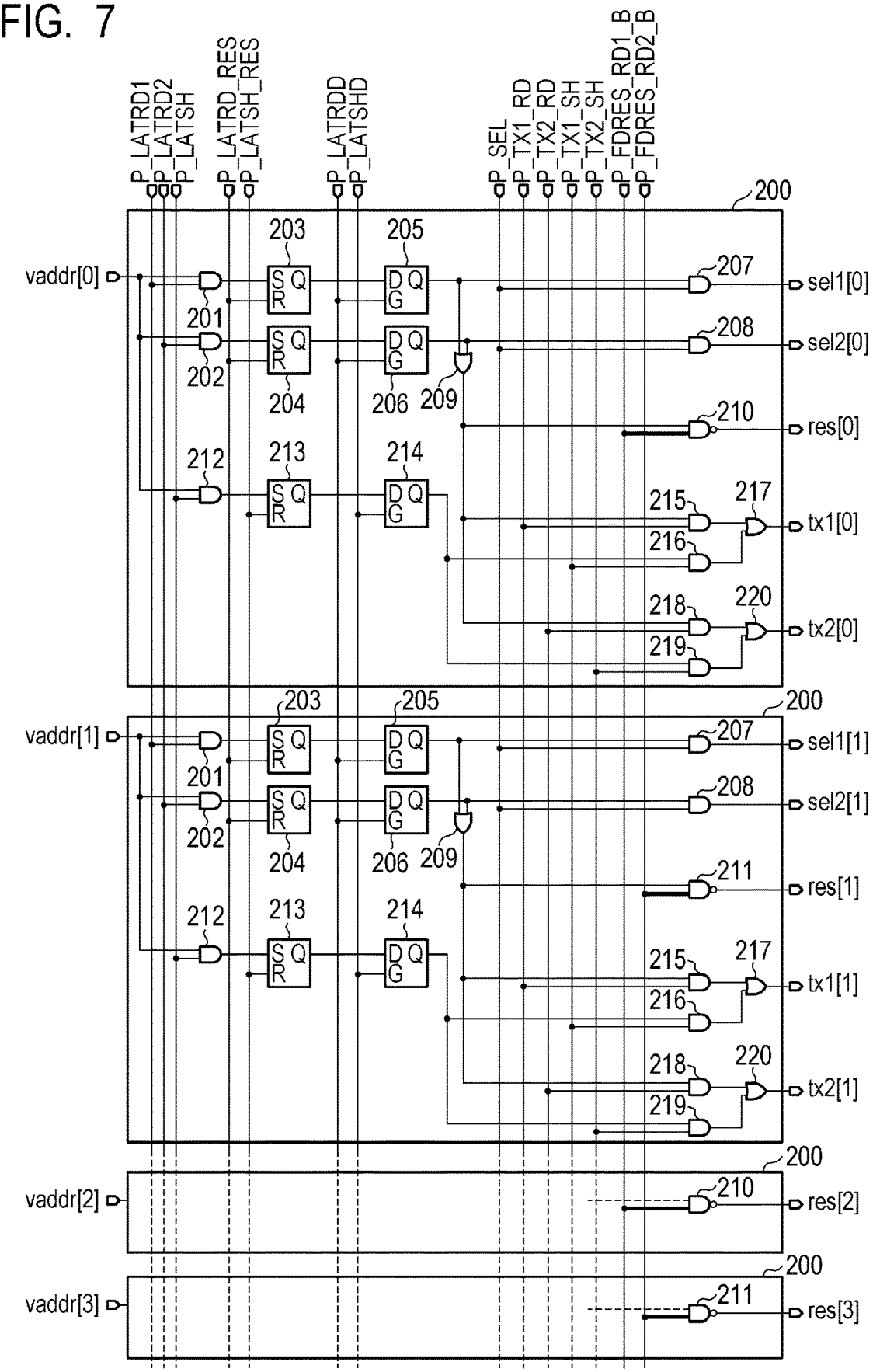
FIG. 7 is a diagram illustrating a circuit configuration of a vertical scanning unit according to a modified example of the first embodiment.

FIG. 7 is a diagram illustrating a circuit configuration example of the vertical scanning unit 2 according to the modified example of the first embodiment. In FIG. 7, the vertical output line control unit 7 is not provided in the vertical scanning unit 2, and the control signals P_FDRES_RD1_B and P_FDRES_RD2_B are input from the timing generation unit 3, which makes a difference from FIG. 3. That is, the function of the vertical output line control unit 7 is provided in the timing generation unit 3 (not shown). The control signal P_FDRES_RD1_B is input to the NAND circuit 210 on even-numbered rows, and the control signal P_FDRES_RD2_B is input to the NAND circuit 211 on odd-numbered rows.

Figure 8A:
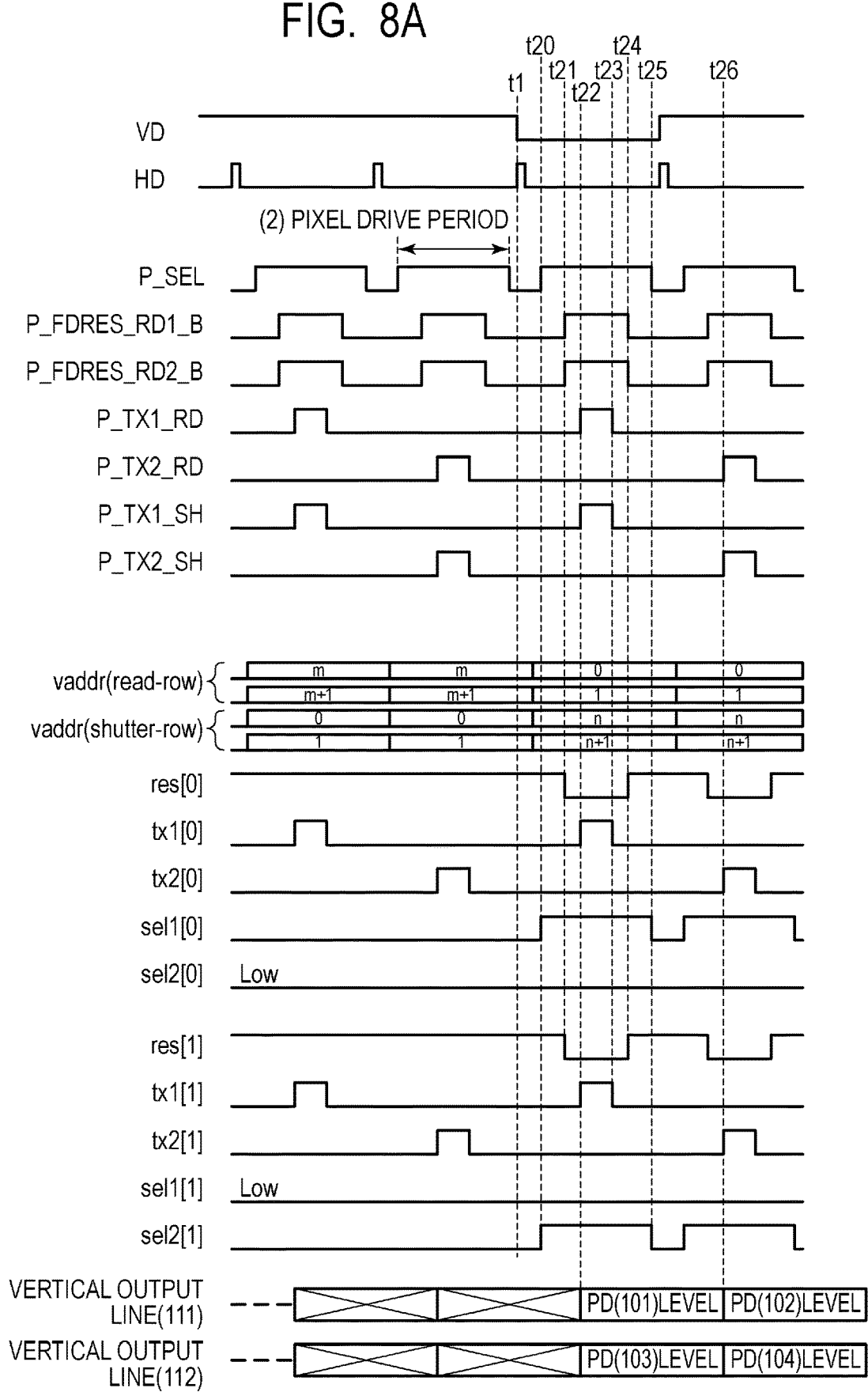
FIG. 8A is a diagram illustrating the operation and the potential of vertical output lines in a normal drive mode of the imaging device according to the modified example of the first embodiment.
Figure 8B:
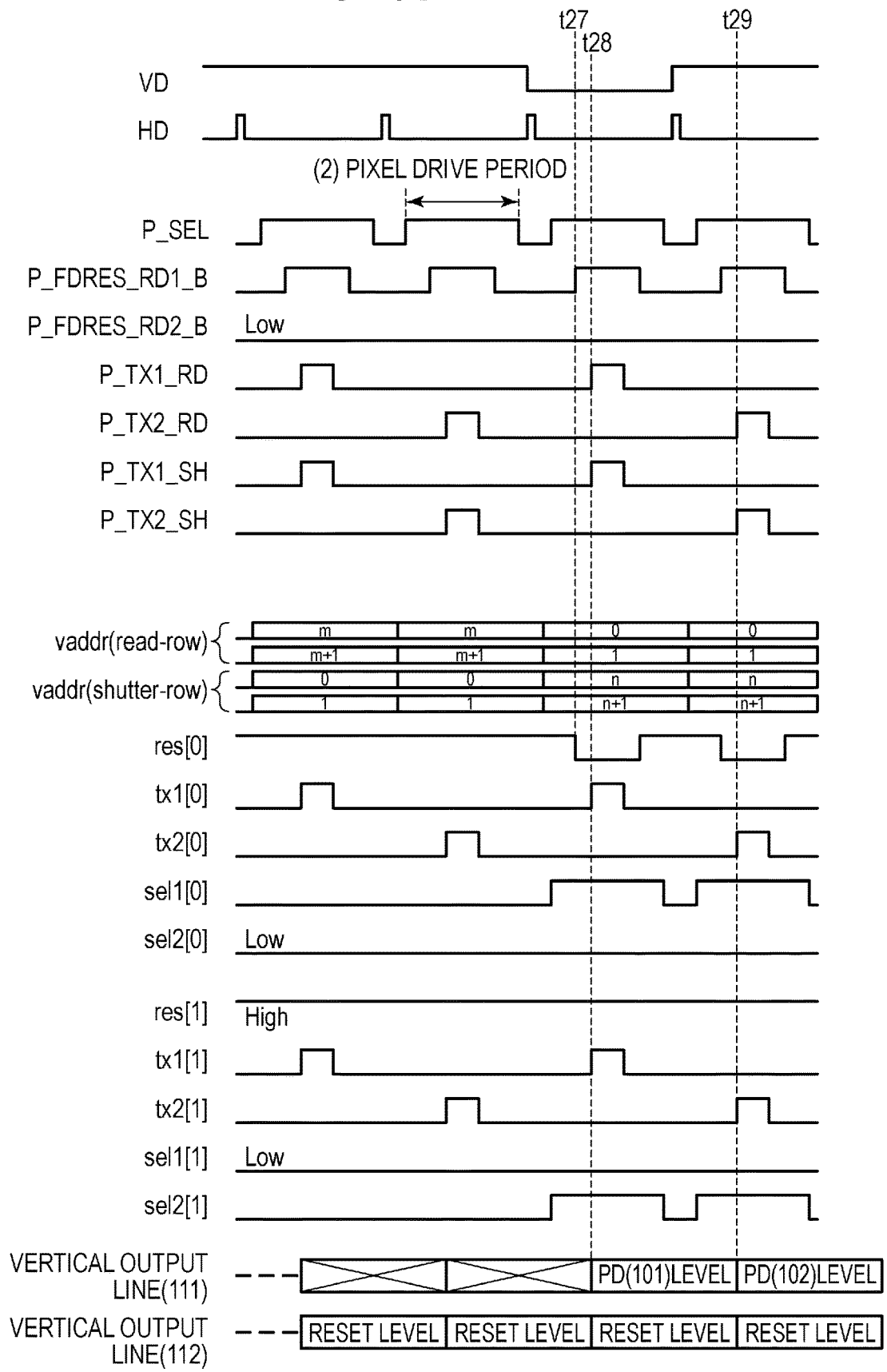
FIG. 8B is a diagram illustrating the operation and the potential of vertical output lines in a test mode of the imaging device according to the modified example of the first embodiment.

FIG. 8A is a diagram illustrating the operation timing and the potentials of the vertical output lines 111 and 112 in the normal drive mode of the imaging device 100. FIG. 8A is different from FIG. 6A in that the control signals P_FDRES_RD1_B and P_FDRES_RD2_B are at a high level in the period from the time t21 to the time t24. FIG. 8B is a diagram illustrating the operation timing and the potentials of the vertical output lines in the test mode of the imaging device 100. FIG. 8B is different from FIG. 6B in that the control signals P_FDRES_RD1_B is at a high level at the time t28 and the time t29, and the control signal P_FDRES_RD2_B is maintained at a low level.

According to the drive method illustrated in FIG. 8A and FIG. 8B, the levels of the signals input to the NAND circuits 210 and 211 are the same as those in the case of the drive method of FIG. 6A and FIG. 6B, respectively. Therefore, the control signals res(0) and res(1) are the same as those of FIG. 6A and FIG. 6B. The same applies to other control signals. Therefore, the levels of the vertical output line 111 and the vertical output line 112 are the same as those of FIG. 6A and FIG. 6B. Thus, the potential of the vertical output line 111 and the vertical output line 112 when short-circuited is the same as that in FIG. 6C (not shown).

As discussed above, the imaging device 100 that can detect a short-circuit among a plurality of output lines can be similarly provided even when the function of the vertical output line control unit 7 is provided in the timing generation unit 3 instead of in the vertical scanning unit 2.

Note that the test mode may be configured such that the control signal P_FDRES_RD2_B rises to a high level at the time t28 and the control signal P_FDRES_RD1_B is maintained at a low level. Also in this case, since the vertical output line 111 and the vertical output line 112 are provided with potentials that are different from each other, it is possible to detect a short-circuit in a similar manner.

Second Embodiment

Next, a second embodiment will be described. In the present embodiment, by differing the operation between the even-numbered row and the odd-numbered row in the control signals tx1(0), tx1(1), . . . , and so on and the control signals tx2(0), tx2(1), . . . , and so on, the vertical output line 111 and the vertical output line 112 are provided with potentials different from each other. Features that are different from those of the above-described first embodiment will be mainly described below, and the description of common features will be omitted or simplified.

Figure 9:
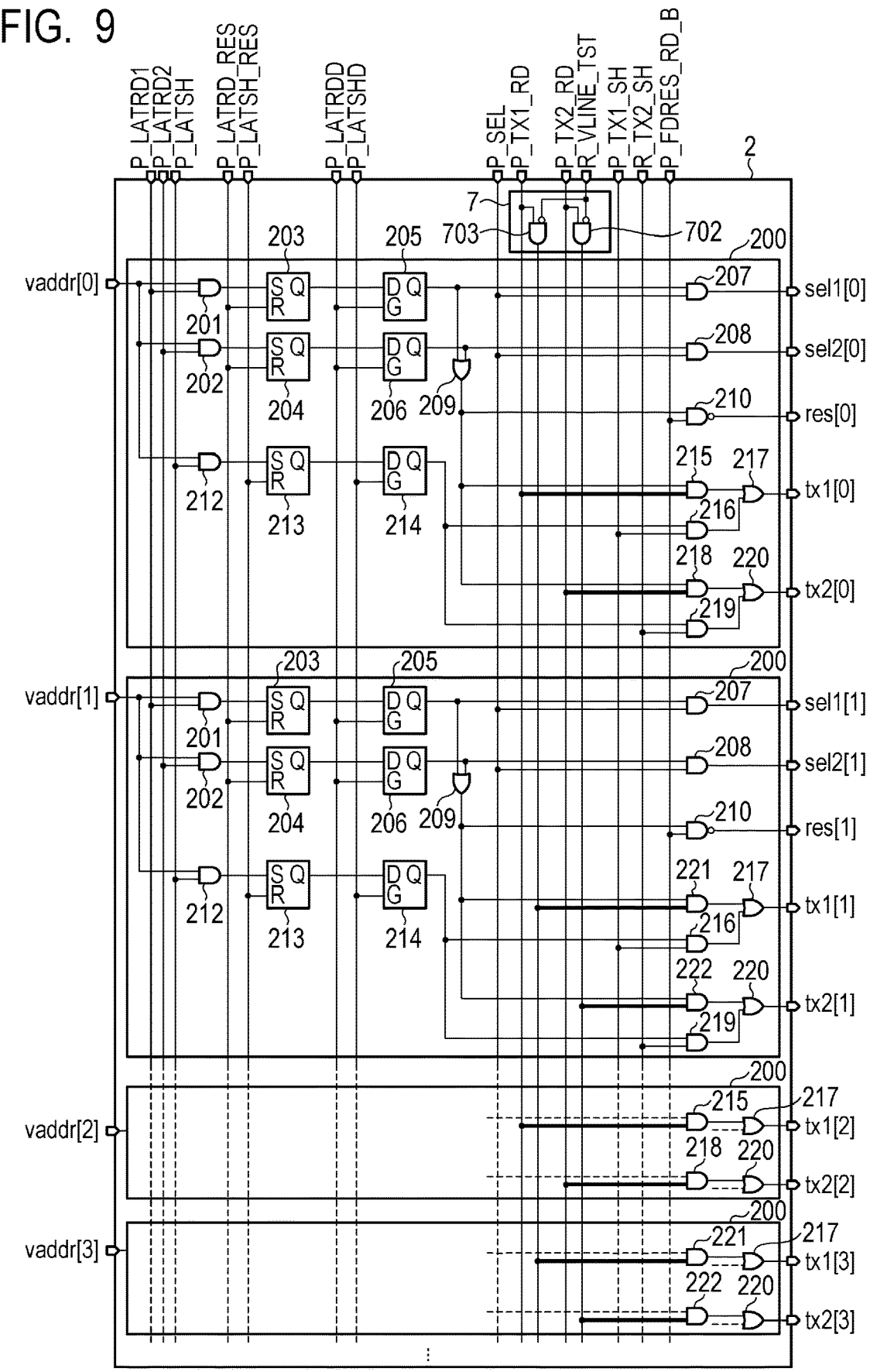
FIG. 9 is a diagram illustrating a circuit configuration of a vertical scanning unit and a vertical output line control unit according to a second embodiment.

FIG. 9 is a diagram illustrating a circuit configuration example of the vertical scanning unit 2 and the vertical output line control unit 7. In the present embodiment, unlike the first embodiment, the NAND circuit 210 is provided in the row drive circuit 200 on each row, and the control signal P_FDRES_RD_B is input to the NAND circuit 210.

The row drive circuit 200 on the 0-th row includes AND circuits 215 and 218. The output signal of the OR circuit 209 is input to one input terminal of the AND circuit 215. The control signal P_TX1_RD is input to the other input terminal of the AND circuit 215. The AND circuit 215 outputs an AND of the output of the OR circuit 209 and the control signal P_TX1_RD to one input terminal of the OR circuit 217. The output signal of the OR circuit 209 is input to one input terminal of the AND circuit 218. The control signal P_TX2_RD is input to the other input terminal of the AND circuit 218. The AND circuit 218 outputs an AND of the output of the OR circuit 209 and the control signal P_TX2_RD to one input terminal of the OR circuit 220. The same applies to the row drive circuits 200 on other even-numbered rows (the second row, the fourth row, . . . ).

The row drive circuit 200 on the first row includes AND circuits 221 and 222 instead of the AND circuits 215 and 218. The output signal of the OR circuit 209 is input to one input terminals of the AND circuits 221 and 222. The vertical output line control unit 7 includes the AND circuits 702 and 703. The control signal P_TX1_RD is input to one input terminal of the AND circuit 703, and an inverse value of the control signal R_VLINE_TST is input to the other input terminal. The AND circuit 703 outputs an AND of the control signal P_TX1_RD and the inverse value of the control signal R_VLINE_TST to the other input terminal of the AND circuit 221 on the odd-numbered rows (the first row, the third row, . . . ). The AND circuit 221 outputs an AND of the output of the OR circuit 209 and the output of the AND circuit 703 to one input terminal of the OR circuit 217. The same applies to the row drive circuits 200 on other odd-numbered rows (the third row, the fifth row, . . . ).

The control signal P_TX2_RD is input to one input terminal of the AND circuit 702, and an inverse value of the control signal R_VLINE_TST is input to the other input terminal. The AND circuit 702 outputs an AND of the control signal P_TX2_RD and the inverse value of the control signal R_VLINE_TST to the other input terminal of the AND circuit 222 on the odd-numbered rows (the first row, the third row, . . . ). The AND circuit 222 outputs an AND of the output of the OR circuit 209 and the output of the AND circuit 702 to one input terminal of the OR circuit 220.

In the normal drive mode, the control signal R_VLINE_TST is at a low level, and the output of the AND circuit 703 matches the control signal P_TX1_RD, and the output of the AND circuit 702 matches the control signal P_TX2_RD. Therefore, the AND circuits 215 and 218 on the even-numbered row and the AND circuits 221 and 222 on the odd-numbered row perform the same operation. In the test mode, the control signal R_VLINE_TST is at a high level, and the outputs of the AND circuits 702 and 703 are at a low level. Therefore, the outputs of the AND circuits 221 and 222 on the odd-numbered row are at a low level, and when the outputs of the AND circuits 216 and 219 are at a low level, the odd-numbered control signals tx1(1), tx1(3), . . . , and so on and tx2(1), tx2(3), . . . , and so on are at a low level.

Figure 10:
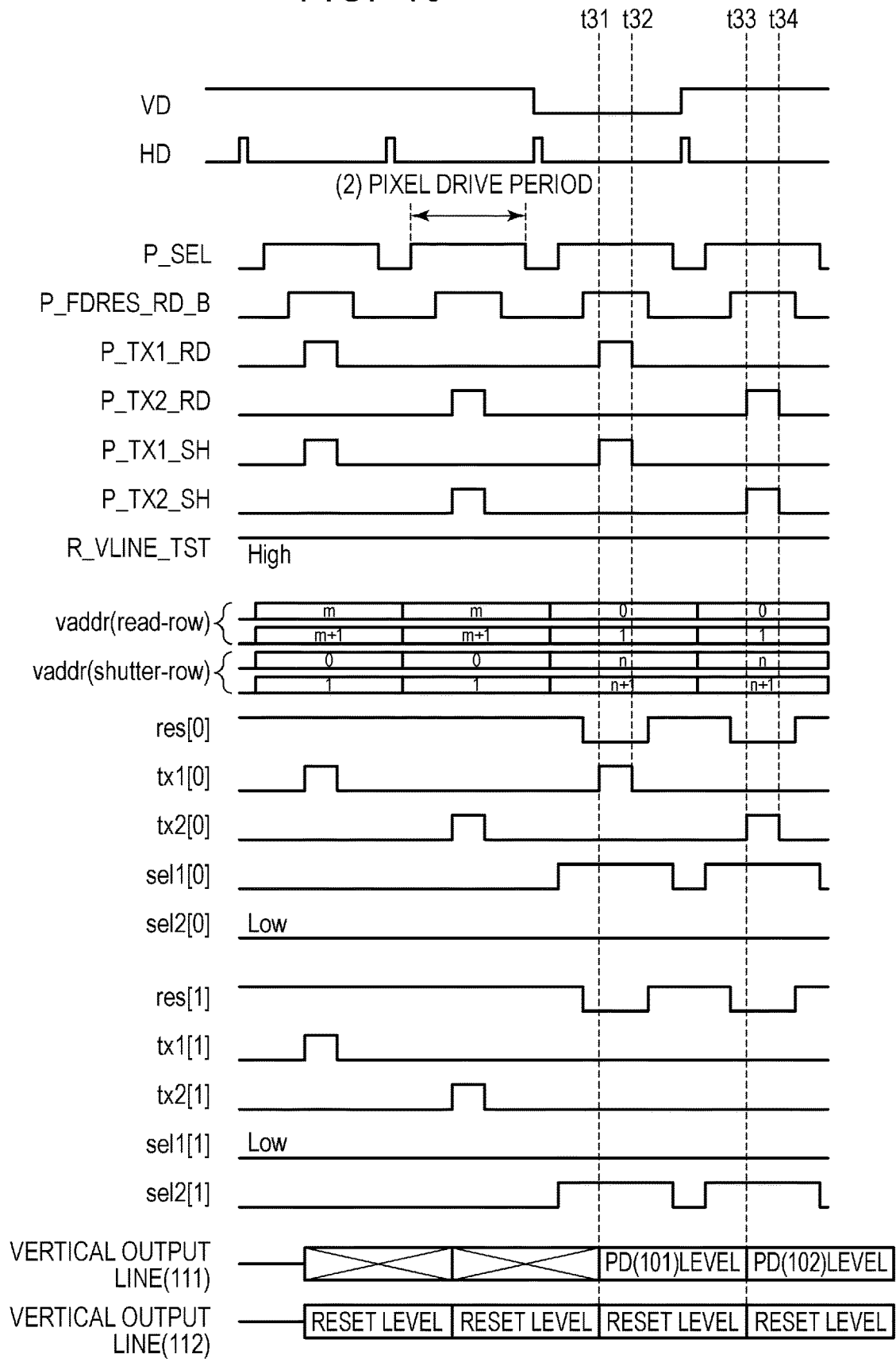
FIG. 10 is a diagram illustrating the operation and the potential of vertical output lines in a test mode of the imaging device according to the second embodiment.

FIG. 10 is a diagram illustrating the operation timing and the potentials of the vertical output lines 111 and 112 in the test mode of the imaging device 100. The operation of the imaging device 100 in the test mode in which the control signal R_VLINE_TST is at a high level will be described by using FIG. 10. Note that the description of the operation or the like of the normal drive mode will be omitted.

In the period from the time t31 to the time t32, the control signal P_TX1_RD and P_TX1_SH are at a high level. On the other hand, since the control signal R_VLINE_TST is at a high level, the outputs of the AND circuits 702 and 703 are at a low level. Thus, while the control signal tx1(0) on the 0-th row is at a high level, the control signal tx1(1) on the first row is maintained at a low level. Therefore, the transfer transistor 105 on the 0-th row is in an on-state, and the transfer transistor 105 on the first row is maintained in an off-state. Therefore, the floating diffusion FD on the first row is maintained at the potential of a reset level set at the shutter operation.

As discussed above, in the pixel 10 on the 0-th row, the same operation as that of the normal drive mode is performed, and the potential of a level based on charges generated by the photoelectric conversion element 101 is output to the vertical output line 111. Further, in the pixel 10 on the first row, since the transfer transistor 105 is maintained in an off-state, the potential of the reset level set at the shutter operation is output to the vertical output line 112.

In the period from the time t33 to the time t34, the control signal P_TX2_RD and P_TX2_SH are at a high level. In a similar manner to the above, while the control signal tx2(0) on the 0-th row is at a high level, the control signal tx2(1) on the first row is maintained at a low level. Therefore, the transfer transistor 106 on the 0-th row is in an on-state, and the transfer transistor 106 on the first row is maintained in an off-state. Therefore, the potential of a level based on charges generated by the photoelectric conversion element 102 is output to the vertical output line 111, and the potential of the reset level set at the shutter operation is output to the vertical output line 112. Accordingly, a normal pixel signal is output to the vertical output line 111, and a pixel signal on a reset state is output to the vertical output line 112.

As discussed above, by differing the operation between the even-numbered row and the odd-numbered row in the control signals tx1(0), tx1(1), . . . , and so on and the control signals tx2(0), tx2(1), . . . , and so on, the vertical output line 111 and the vertical output line 112 are provided with potentials different from each other. Therefore, also in the present embodiment, the imaging device 100 that can detect a short-circuit among a plurality of output lines can be provided in a similar manner to the first embodiment.

Modified Example of Second Embodiment

Next, a modified example of the second embodiment will be described. In the present modified example, the function of the vertical output line control unit 7 is provided in the timing generation unit 3 instead of in the vertical scanning unit 2. Features that are different from those of the above-described second embodiment will be mainly described below, and the description of common features will be omitted or simplified.

Figure 11:
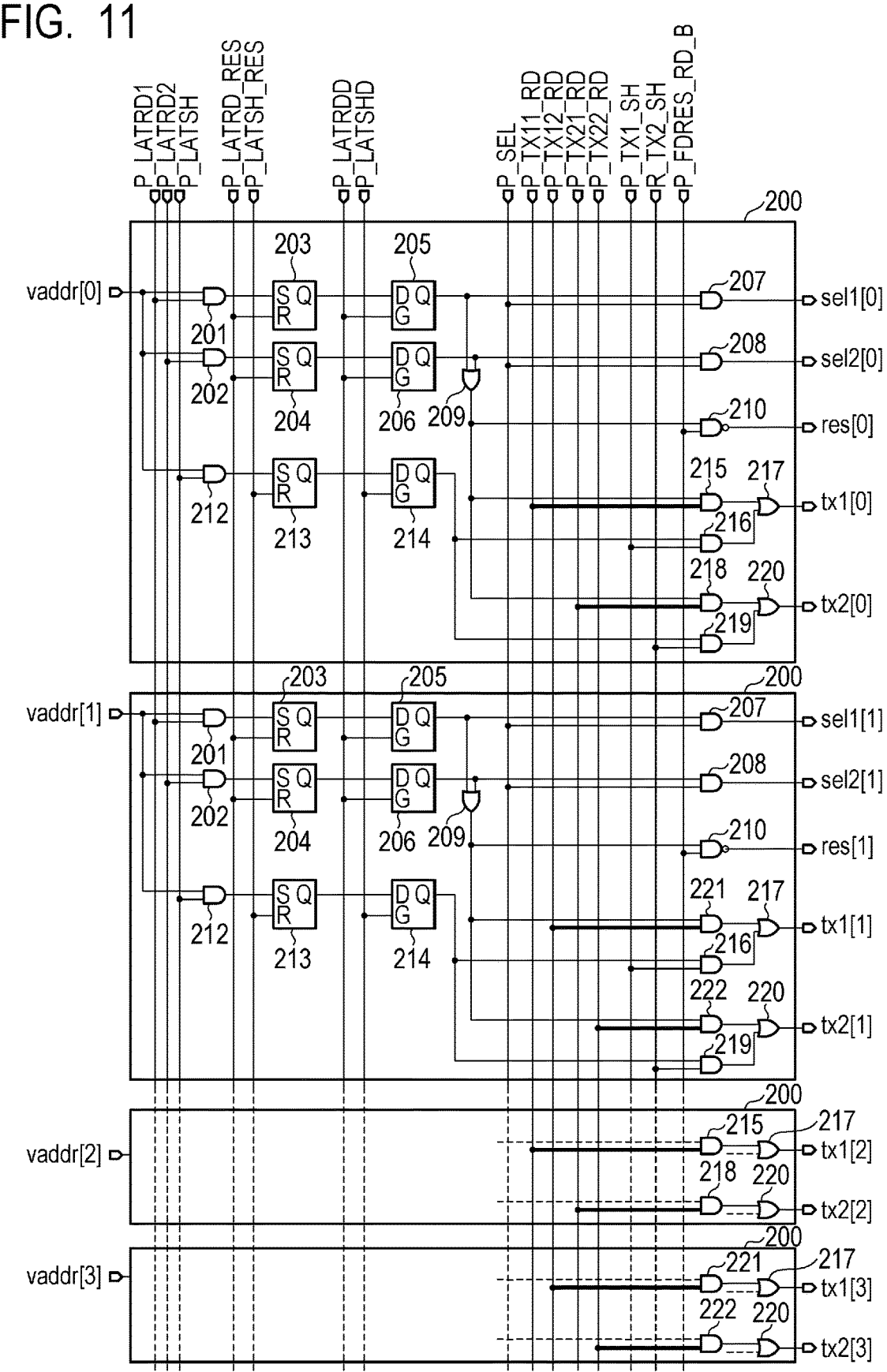
FIG. 11 is a diagram illustrating a circuit configuration of a vertical scanning unit according to a modified example of the second embodiment.

FIG. 11 is a diagram illustrating a circuit configuration example of the vertical scanning unit 2 according to the modified example of the second embodiment. In FIG. 11, the vertical output line control unit 7 is not provided in the vertical scanning unit 2, and the control signals P_TX11_RD, P_TX12_RD, P_TX21_RD, and P_TX22_RD are input from the timing generation unit 3, which makes a difference from FIG. 9. That is, the function of the vertical output line control unit 7 is provided in the timing generation unit 3 (not shown). The control signal P_TX11_RD is input to the AND circuit 215 on even-numbered rows, and the control signal P_TX21_RD is input to the AND circuit 218 on even-numbered rows. The control signal P_TX12_RD is input to the AND circuit 221 on odd-numbered rows, and the control signal P_TX22_RD is input to the AND circuit 222 on odd-numbered rows.

Figure 12B:
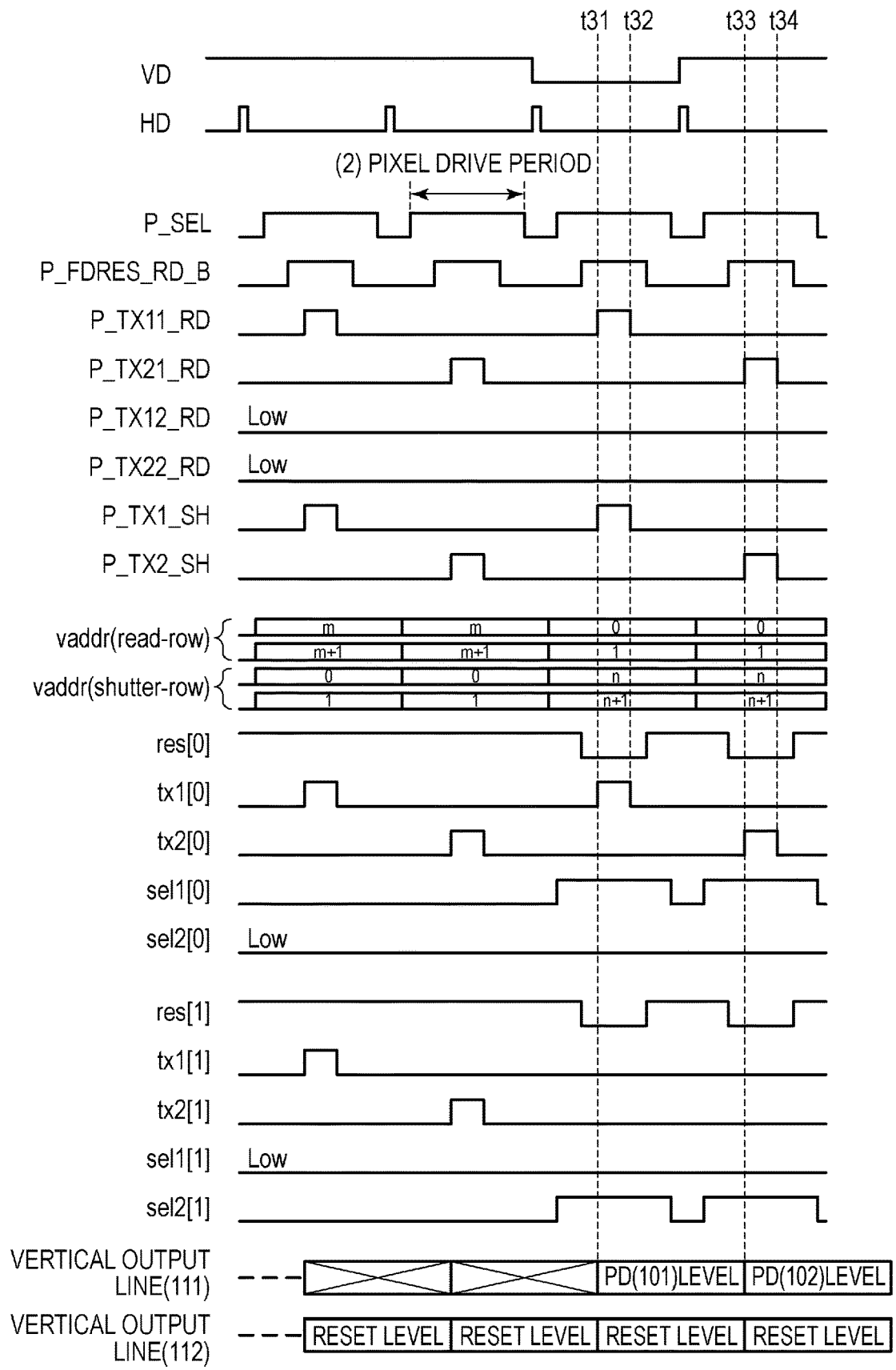
FIG. 12B is a diagram illustrating the operation and the potential of vertical output lines in a test mode of the imaging device according to the modified example of the second embodiment.

FIG. 12A is a diagram illustrating the operation timing and the potentials of the vertical output lines 111 and 112 in the normal drive mode of the imaging device 100. FIG. 12A is different from FIG. 10 in that the control signals P_TX11_RD and P_TX12_RD are at a high level in the period from the time t22 to the time t23. FIG. 12B is a diagram illustrating the operation timing and the potentials of the vertical output lines in the test mode of the imaging device 100. FIG. 12B is different from FIG. 10 in the operation of the control signals P_TX11_RD, P_TX12_RD, P_TX21_RD, and P_TX22_RD. That is, the control signals P_TX11_RD is at a high level from the time t31 to the time t32, and the control signals P_TX21_RD is at a high level from the time t33 to the time t34. In contrast, the control signals P_TX12_RD and P_TX22_RD are maintained at a low level.

According to the drive method in the test mode illustrated in FIG. 12B, the levels of the signals input to the AND circuits 215, 218, 221, and 222 are the same as those in the case of the drive method of FIG. 10, respectively. Therefore, the control signals tx1(0) and tx1(1) and the control signals tx2(0) and tx2(1) are the same as those of FIG. 10, and the levels of the vertical output lines 111 and the vertical output lines 112 are also the same as the case of FIG. 10. Thus, detection of a short-circuit between the vertical output line 111 and the vertical output line 112 can be performed in the same manner.

As discussed above, the imaging device 100 that can detect a short-circuit among a plurality of output lines can be similarly provided even when the function of the vertical output line control unit 7 is provided in the timing generation unit 3 instead of in the vertical scanning unit 2.

Third Embodiment

Next, a third embodiment will be described. In the present embodiment, by differing the operation between the even-numbered row and the odd-numbered row in the control signals sel1(0), sel1(1), . . . , and so on and the control signals sel2(0), sel2(1), . . . , and so on, the vertical output line 111 and the vertical output line 112 are provided with potentials different from each other. Features that are different from those of the above-described first embodiment will be mainly described below, and the description of common features will be omitted or simplified.

Figure 13:
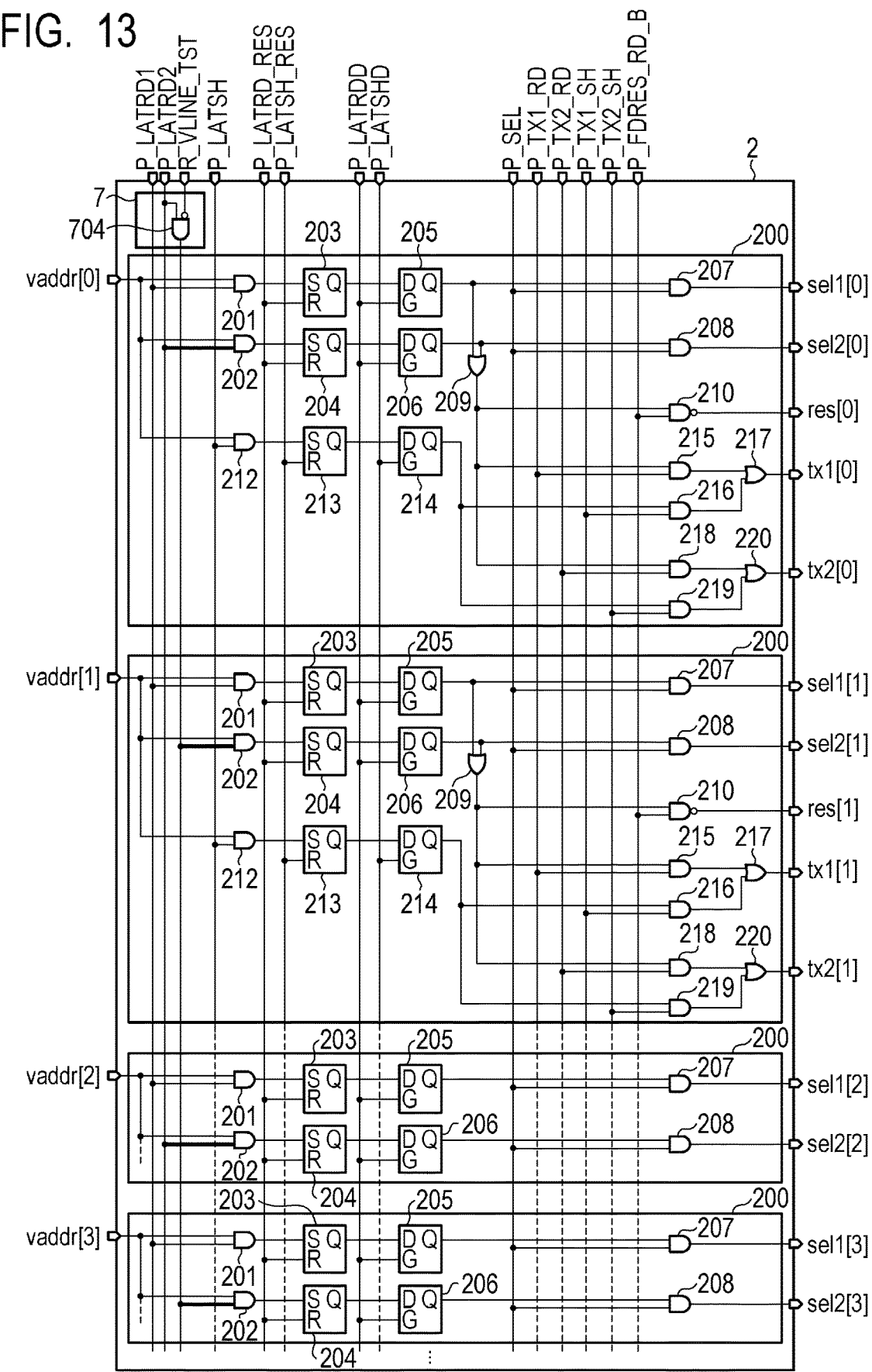
FIG. 13 is a diagram illustrating a circuit configuration of a vertical scanning unit and a vertical output line control unit according to a third embodiment.

FIG. 13 is a diagram illustrating a circuit configuration example of the vertical scanning unit 2 and the vertical output line control unit 7. In the present embodiment, unlike the first embodiment, the NAND circuit 210 is provided in the row drive circuit 200 on each row, and the control signal P_FDRES_RD_B is input to the NAND circuit 210. The vertical output line control unit 7 includes an AND circuit 704.

In the row drive circuit 200 on the 0-th row, the row address signal vaddr(0) is input to one input terminal of the AND circuit 202. The control signal P_LATRD2 is input to the other input terminal of the AND circuit 202. The AND circuit 202 outputs an AND of the row address signal vaddr(0) and the control signal P_LATRD2 to the set terminal S of the SR latch 204 and causes the SR latch 204 to hold it. The same applies to the row drive circuits 200 on other even-numbered rows (the second row, the fourth row, . . . ).

In the row drive circuit 200 on the first row, the row address signal vaddr(1) is input to one input terminal of the AND circuit 202. The control signal P_LATRD2 is input to one input terminal of the AND circuit 704, and an inverse value of the control signal R_VLINE_TST is input to the other input terminal. The AND circuit 704 outputs an AND of the control signal P_LATRD2 and the inverse value of the control signal R_VLINE_TST to the other input terminal of the AND circuit 202 on the odd-numbered row (the first row, the third row, . . . ). The AND circuit 202 outputs an AND of the output of the row address signal vaddr(1) and the output of the AND circuit 202 to the set terminal S of the SR latch 204 and causes the SR latch 204 to hold it. The same applies to the row drive circuits 200 on other odd-numbered rows (the third row, the fifth row, . . . ).

In the normal drive mode, the control signal R_VLINE_TST is at a low level, and the output of the AND circuit 704 matches the control signal P_LATRD2. Therefore, the AND circuit 202 on the even-numbered row and the AND circuit 202 on the odd-numbered row perform the same operation. In the test mode, the control signal R_VLINE_TST is at a high level, and the output of the AND circuit 704 is at a low level. Therefore, the output of the AND circuit 202 on the odd-numbered row is at a low level.

Figure 14:
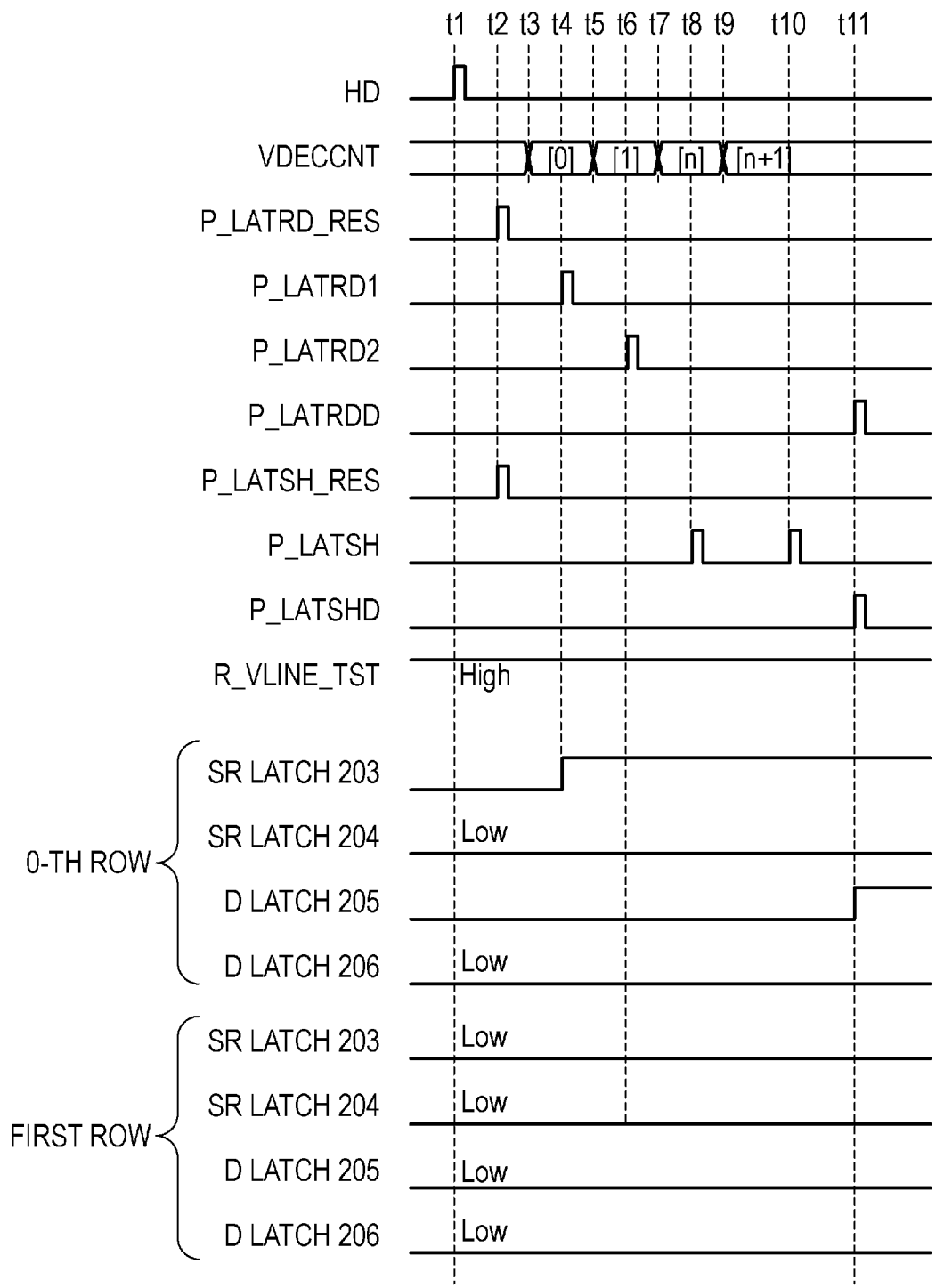
FIG. 14 is a diagram illustrating a general operation of the imaging device according to the third embodiment.

FIG. 14 is a diagram illustrating a general operation of the imaging device 100 in the test mode. The operation of the imaging device 100 in the test mode in which the control signal R_VLINE_TST is at a high level will be described by using FIG. 14. Note that the description of the operation of the normal drive operation will be omitted. Further, the description duplicated with FIG. 5 or the like may be omitted or simplified.

At the time t3, the value of the vertical address signal VDECCNT output from the timing generation unit 3 is set to 0. Thereby, the row address signal vaddr(0) on the 0-th row rises to a high level. At the time t4, the control signal P_LATRD1 rises to a high level, and the output of the AND circuit 201 on the 0-th row is set to a high level, and this signal is set to the SR latch 203.

At the time t5, the value of the vertical address signal VDECCNT is set to 1. Thereby, the row address signal vaddr(1) on the first row rises to a high level. At the time t6, the control signal P_LATRD2 rises to a high level. At this time, since the control line R_VLINE_TST is at a high level, the output of the AND circuit 704 is set to a low level. Thus, at the time t6, the output from the SR latch 204 on the first row is maintained at a low level. In other words, the control signal P_LATRD2 that controls the pixels 10 connected to the vertical output line 112 is substantially disabled. Therefore, while the select transistor 109 (first select transistor) connected to the vertical output line 111 is in an on-state, the select transistor 110 (second select transistor) connected to the vertical output line 112 is maintained in an off-state. The pixel 10 thus outputs a signal to only the vertical output lien 111. Thereby, the potential of the vertical output line 112 can be differed from the potential of the vertical output line 111 from which a pixel signal is output. Therefore, also in the present embodiment, the imaging device 100 that can detect a short-circuit among a plurality of output lines can be provided in a similar manner to the first embodiment.

Note that, since no signal is output to the vertical output line 112 from the pixels 10 on any row, this results in a floating state. Thus, in order to reduce an influence such as noise due to a floating state of the vertical output line 112, a circuit configuration that fixes the potential of the vertical output line 112 to a predetermined potential may be employed.

Further, the relationship of the potentials of the vertical output line 111 and the vertical output line 112 in the test mode may be opposite. That is, the circuit configuration may be changed so that the control signal P_LATRD1 that controls the pixel 10 connected to the vertical output line 111 is substantially disabled, and the pixel 10 may be configured to output a signal to only the vertical output line 112.

Fourth Embodiment

Next, a fourth embodiment will be described. In the present embodiment, the vertical output line control unit 7 is configured to directly clip the potential of at least one of the vertical output line 111 and the vertical output line 112 at a predetermined potential to provide potentials different from each other. Features that are different from those of the above-described first embodiment will be mainly described below, and the description of common features will be omitted or simplified.

Figure 15:
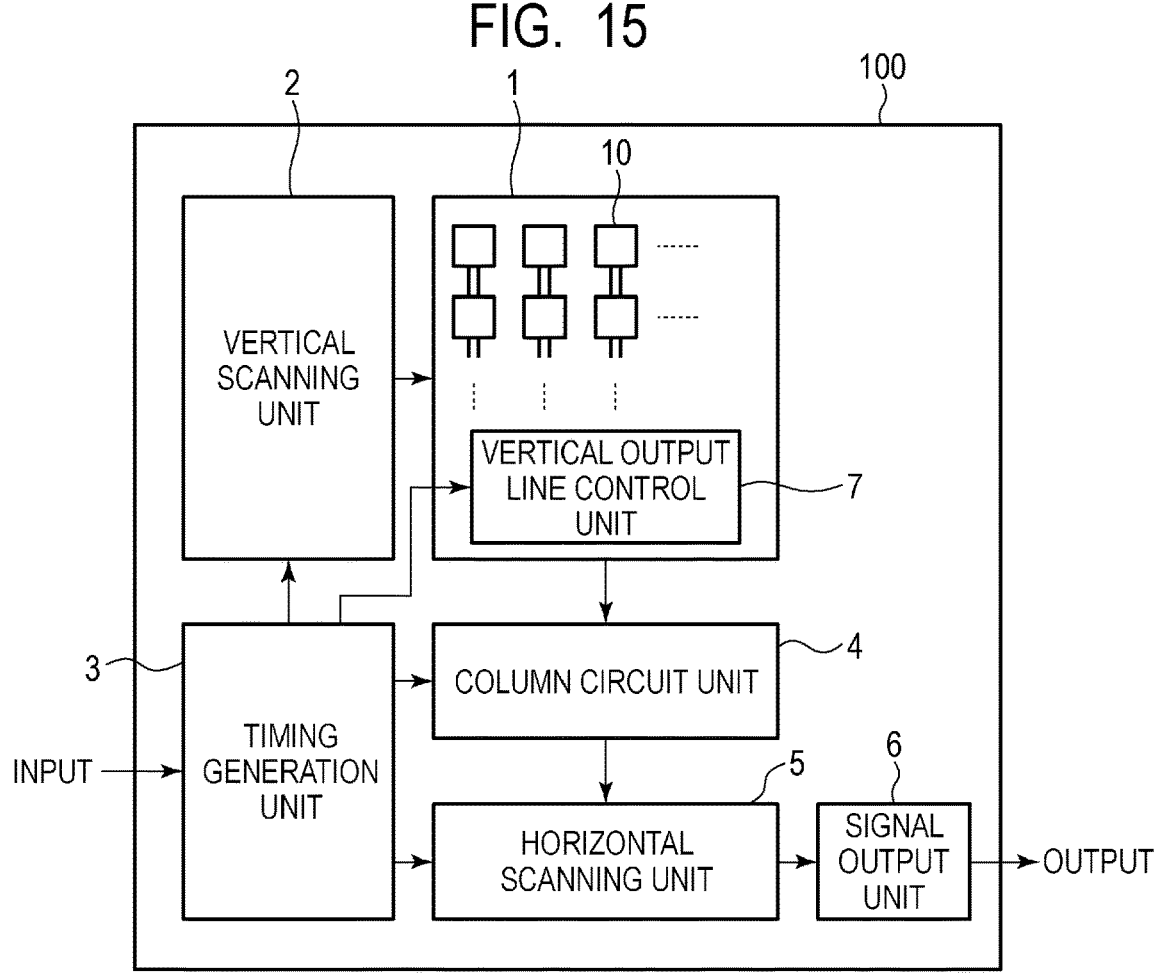
FIG. 15 is a block diagram of an imaging device according to a fourth embodiment.

FIG. 15 is a block diagram illustrating a configuration example of the imaging device 100 according to the fourth embodiment. In the present embodiment, the vertical output line control unit 7 is provided in the pixel array 1. The vertical output line control unit 7 provides potentials that are different from each other to the two vertical output lines 111 and 112 in accordance with the control signal from the timing generation unit 3. Note that the vertical output line control unit 7 may be provided separately from the pixel array 1. For example, when the vertical output lines 111 and 112 extend to the column circuit unit 4 from the pixel array 1, the vertical output line control unit 7 may be provided between the pixel array 1 and the column circuit unit 4.

Figure 16:
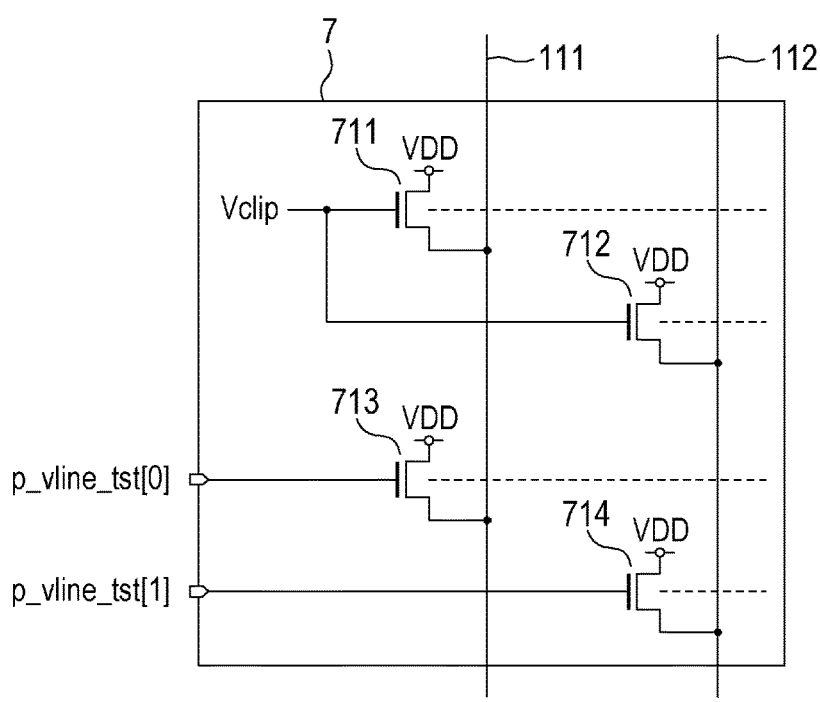
FIG. 16 is a diagram illustrating a circuit configuration of a vertical output line control unit according to the fourth embodiment.

FIG. 16 is a diagram illustrating the circuit configuration of the vertical output line control unit 7 according to the fourth embodiment. The vertical output line control unit 7 includes transistors 711, 712, 713, and 714. Each transistor is an n-type MOS transistor. The gates of the transistors 711 and 712 are connected to a clip potential line that supplies a clip potential Vclip. The drains of the transistors 711 and 712 are connected to the power source potential lines that supply the power source potential VDD. The source of the transistor 711 is connected to the vertical output line 111, and the source of the transistor 712 is connected to the vertical output line 112.

When each potential output to the vertical output lines 111 and 112 from the pixels 10 is sufficiently higher than the clip potential Vclip, since each Vgs of the transistors 711 and 712 is small, the transistors 711 and 712 are not turned on. Therefore, the transistors 711 and 712 do not affect the potentials of the vertical output lines 111 and 112. However, when each potential output to the vertical output lines 111 and 112 from the pixels 10 is sufficiently lower than the clip potential Vclip, each Vgs of the transistors 711 and 712 increases, and the transistors 711 and 712 are turned on. At this time, the potentials of the vertical output lines 111 and 112 become (Vclip−Vgs). Accordingly, the transistors 711 and 712 have a function of clipping the potentials of the vertical output lines 111 and 112 at a predetermined level.

The gate of the transistor 713 is provided with a control signal p_vline_tst(0) output from the timing generation unit 3. The gate of the transistor 714 is provided with a control signal p_vline_tst(1) output from the timing generation unit 3. The drains of the transistors 713 and 714 are connected to the power source potential lines that supplies the power source potential VDD. The source of the transistor 713 is connected to the vertical output line 111, and the source of the transistor 714 is connected to the vertical output line 112.

In the test mode, the control signal p_vline_tst(0) is at a low level, and the control signal p_vline_tst(1) is at a high level. Here, the potential of the high level is set such that the transistor 714 is in an on-state in response to a pixel signal output from the pixel 10. At this time, while a normal pixel signal is output to the potential of the vertical output line 111, the potential of the vertical output line 112 is clipped at (Vclip−Vgs).

As discussed above, by clipping the potential of the vertical output line 112 at (Vclip−Vgs), the vertical output line 111 and the vertical output line 112 are provided with potentials different from each other. Therefore, also in the present embodiment, the imaging device 100 that can detect a short-circuit among a plurality of output lines can be provided in a similar manner to the first embodiment.

Note that, in the test mode, the control signal p_vline_tst(0) may be at a high level, and the control signal p_vline_tst(1) may be at a low level. In this case, the potential of the vertical output line 111 is clipped at (Vclip−Vgs), the vertical output line 111 and the vertical output line 112 are provided with potentials different from each other, and therefore the same advantage can be obtained.

Modified Example of Fourth Embodiment

Next, a modified example of the fourth embodiment will be described. In the present modified example, the transistors 713 and 714 are omitted. Features that are different from those of the above-described fourth embodiment will be mainly described below, and the description of common features will be omitted or simplified.

Figure 17:
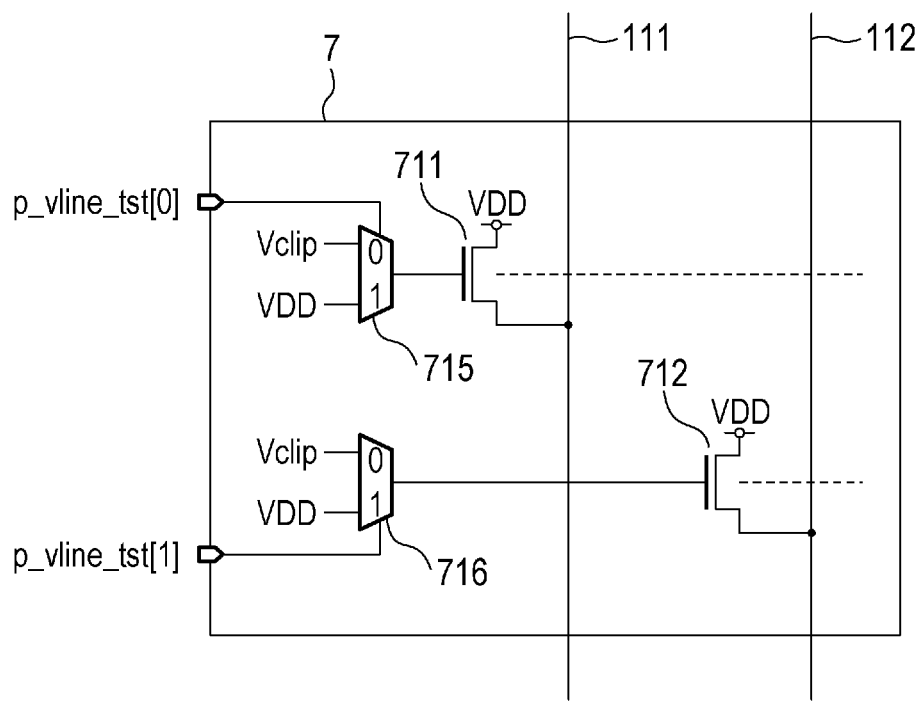
FIG. 17 is a diagram illustrating a circuit configuration of a vertical output line control unit according to a modified example of the fourth embodiment.

FIG. 17 is a diagram illustrating a circuit configuration of the vertical output line control unit 7 according to the modified example of the fourth embodiment. The vertical output line control unit 7 includes the transistors 711 and 712 and select circuits 715 and 716. The control signal p_vline_tst(0) is input to the control terminal of the select circuit 715. The select circuit 715 outputs the power source potential VDD to the gate of the transistor 711 when the control signal p_vline_tst(0) is at a high level and outputs the clip potential Vclip to the gate of the transistor 711 when the control signal p_vline_tst(0) is at a low level. The control signal p_vline_tst(1) is input to the control terminal of the selection circuit 716. The select circuit 716 outputs the power source potential VDD to the gate of the transistor 712 when the control signal p_vline_tst(1) is at a high level and outputs the clip potential Vclip to the gate of the transistor 712 when the control signal p_vline_tst(1) is at a low level. The source of the transistor 711 is connected to the vertical output line 111, and the source of the transistor 712 is connected to the vertical output line 112.

In the test mode, the control signal p_vline_tst(0) is at a low level, and the control signal p_vline_tst(1) is at a high level. At this time, the potential of the vertical output line 111 is fixed to (VDD-Vgs), and the potential of the vertical output line 112 is fixed to (Vclip-Vgs). Therefore, since the vertical output line 111 and the vertical output line 112 are provided with potentials different from each other, the imaging device 100 that can detect a short-circuit among a plurality of output lines can be provided.

Fifth Embodiment

Next, a fifth embodiment will be described. In the present embodiment, the vertical output line 111 and the vertical output line 112 are provided with potentials different from each other based on a difference in the amount of charges generated by the photoelectric conversion elements. Features that are different from those of the above-described first embodiment will be mainly described below, and the description of common features will be omitted or simplified.

Figure 18A:
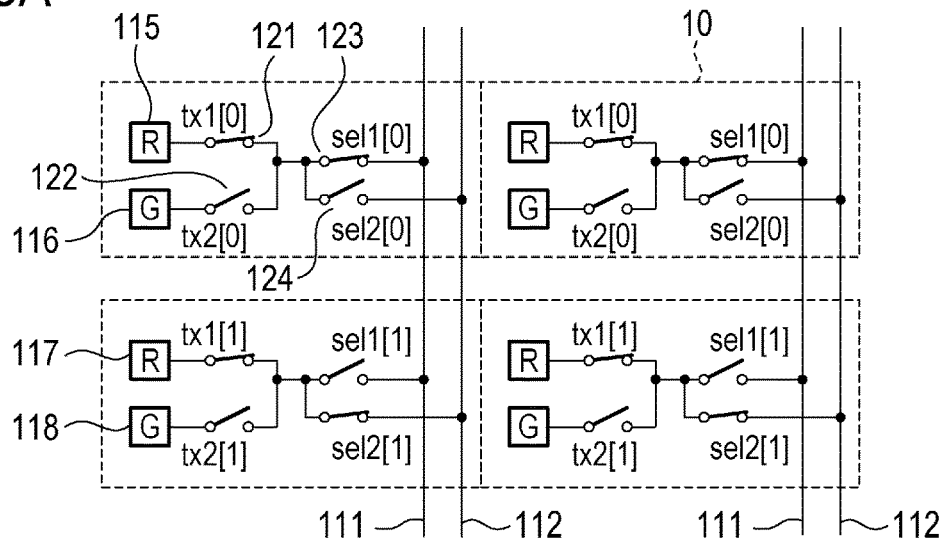
FIG. 18A, FIG. 18B, and FIG. 18C are schematic diagrams of a configuration of pixels and a drive method according to a fifth embodiment.
Figure 18B:
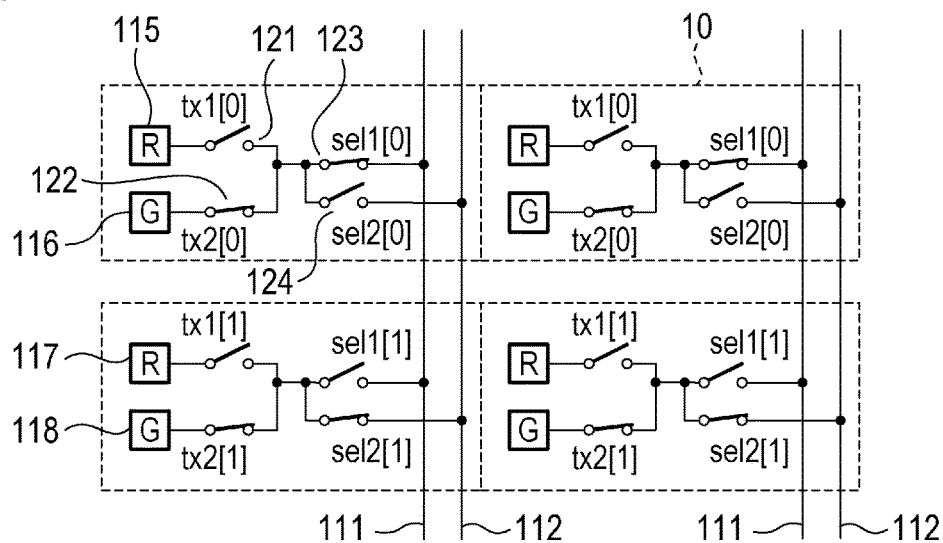
Figure 18C:
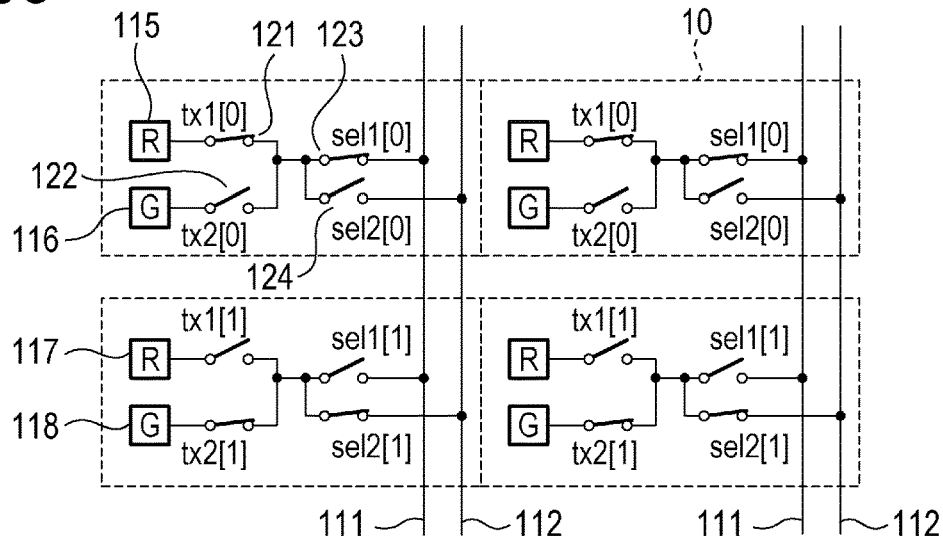

FIG. 18A, FIG. 18B, and FIG. 18C are conceptual diagrams that simplify the configuration of the pixels 10 described with reference to FIG. 2 and illustrate the connection relationship of an on-state and an off-state in each transistor by using a switch. FIG. 18A is a diagram illustrating the connection relationship in a first HD period (first HD) in the normal drive mode. FIG. 18B is a diagram illustrating the connection relationship in a second HD period (second HD) in the normal drive mode. FIG. 18C is a diagram illustrating the connection relationship in the test mode.

The pixel 10 on the 0-th row includes photoelectric conversion elements 115 and 116. Each reference "R" provided in the photoelectric conversion element 115 in FIG. 18A to FIG. 18C indicates that a color filter which transmits a red (first color) light to the photoelectric conversion element 115 is provided. Each reference "G" provided in the photoelectric conversion element 116 in FIG. 18A to FIG. 18C indicates that a color filter which transmits a green (second color) light to the photoelectric conversion element 115 is provided. The photoelectric conversion element 115 corresponds to the photoelectric conversion element 101 in FIG. 2, and the photoelectric conversion element 116 corresponds to the photoelectric conversion element 102 in FIG. 2. The switch 121 corresponds to the transfer transistor 105 in FIG. 2, and the switch 122 corresponds to the transfer transistor 106 in FIG. 2. Further, the switch 123 corresponds to the select transistor 109 in FIG. 2, and the switch 124 corresponds to the select transistor 110 in FIG. 2.

The pixel 10 on the first row includes a photoelectric conversion element 117 provided with a color filter that transmits a red light and a photoelectric conversion element 118 provided with a color filter that transmits a green light. The photoelectric conversion element 117 corresponds to the photoelectric conversion element 103 in FIG. 2, and the photoelectric conversion element 118 corresponds to the photoelectric conversion element 104 in FIG. 2.

First, the operation of the normal drive mode will be described. In the first HD illustrated in FIG. 18A, the control signal tx1(0) is at a high level, the control signal tx2(0) is at a low level, the control signal sel1(0) is at a high level, and the control signal sel2(0) is at a low level. Further, the control signal tx1(1) is at a high level, the control signal tx2(1) is at a low level, the control signal sel1(1) is at a low level, and the control signal sel2(1) is at a high level. This results in the connection relationship illustrated in FIG. 18A. That is, a potential based on charges generated by the photoelectric conversion element 115 is output to the vertical output line 111, and a potential based on charges generated by the photoelectric conversion element 117 is output to the vertical output line 112.

In the second HD illustrated in FIG. 18B, the control signal tx1(0) is at a low level, the control signal tx2(0) is at a high level, the control signal sel1(0) is at a high level, and the control signal sel2(0) is at a low level. Further, the control signal tx1(1) is at a low level, the control signal tx2(1) is at a high level, the control signal sel1(1) is at a low level, and the control signal sel2(1) is at a high level. This results in the connection relationship illustrated in FIG. 18B. That is, a potential based on charges generated by the photoelectric conversion element 116 is output to the vertical output line 111, and a potential based on charges generated by the photoelectric conversion element 118 is output to the vertical output line 112.

As discussed above, in the normal drive mode, in the first HD, signals from the photoelectric conversion elements provided with the red color filter are output to both the vertical output line 111 and the vertical output line 112. In the second HD, signals from the photoelectric conversion elements provided with the green color filter are output to both the vertical output line 111 and the vertical output line 112. Since the amount of charges generated by adjacent photoelectric conversion elements having the same color is often the same level, the vertical output line 111 and the vertical output line 112 often have the same level of potentials. It is therefore difficult to detect a short-circuit between vertical output lines based on the output signal in the normal drive mode.

Next, the operation of the test mode will be described. In FIG. 18C, the control signal tx1(0) is at a high level, and the control signal tx2(0) is at a low level, the control signal sel1(0) is at a high level, and the control signal sel2(0) is at a low level. Further, the control signal tx1(1) is at a low level, the control signal tx2(1) is at a high level, the control signal sel1(1) is at a low level, and the control signal sel2(1) is at a high level. This results in the connection relationship illustrated in FIG. 18C. That is, the potential based on charges generated by the photoelectric conversion element 115 (first photoelectric conversion element) is output to the vertical output line 111, and the potential based on charges generated by the photoelectric conversion element 118 (second photoelectric conversion element) is output to the vertical output line 112.

As discussed above, in the test mode, a signal from the photoelectric conversion element provided with the red color filter is output to the vertical output line 111, and a signal from the photoelectric conversion element provided with the green color filter is output to the vertical output line 112. When the same incident light enters photoelectric conversion elements having color filters with different colors, different amounts of charges are generated in many cases. Since it is therefore expected that the vertical output line 111 and the vertical output line 112 have different potentials, a short-circuit can be detected in the test mode. Therefore, according to the present embodiment, the imaging device 100 that can detect a short-circuit among a plurality of output lines can be provided.

Figure 19:
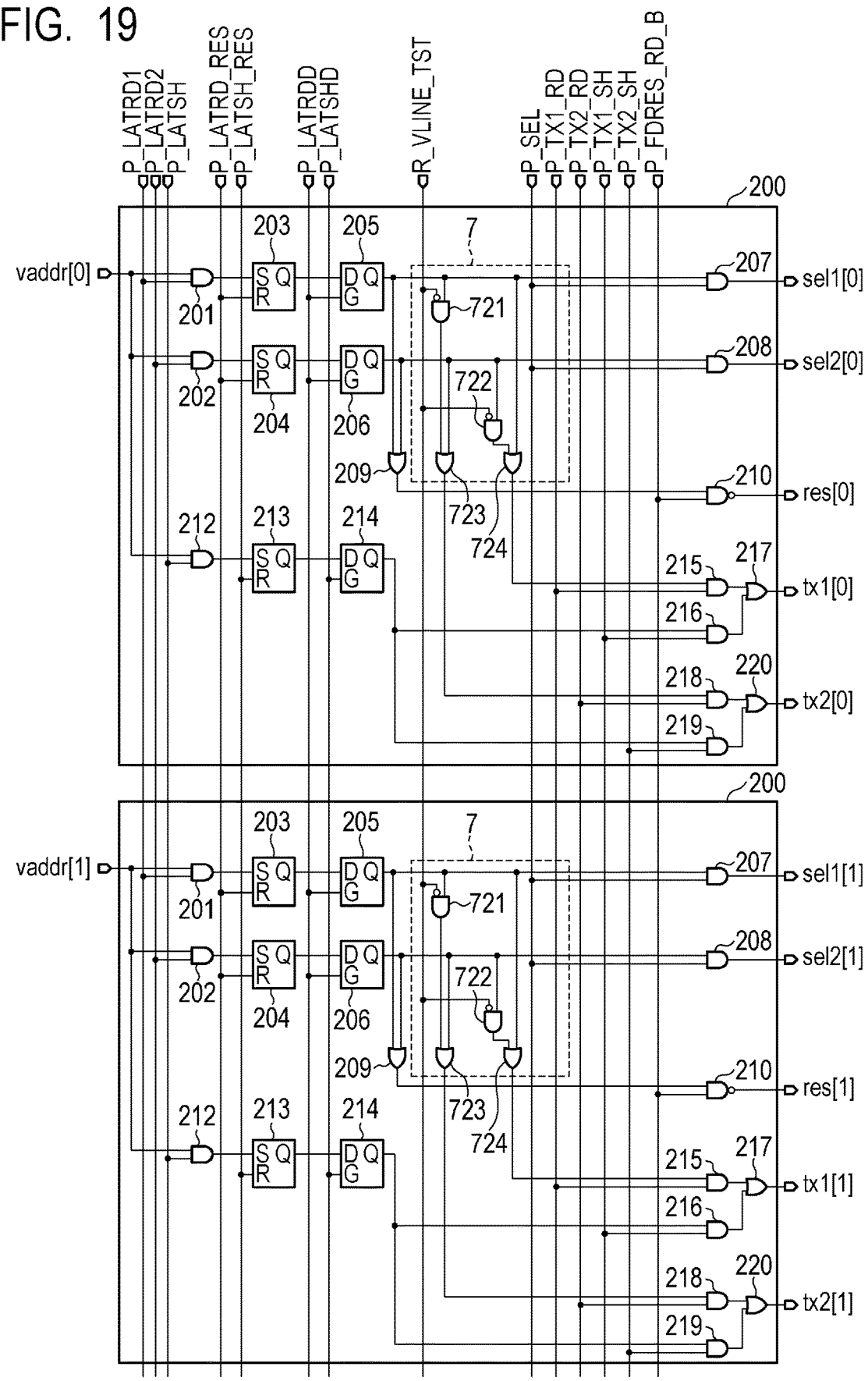
FIG. 19 is a diagram illustrating a circuit configuration of a vertical scanning unit and a vertical output line control unit according to the fifth embodiment.

FIG. 19 is a diagram illustrating a circuit configuration example of the vertical scanning unit 2 and the vertical output line control unit 7. The vertical scanning unit 2 of the present embodiment is able to operate in the normal drive mode and the test mode of FIG. 18A, FIG. 18B, and FIG. 18C.

Since the configuration of the row drive circuit 200 on each row is the same, the row drive circuit 200 on the 0-th row will be described with respect to the feature different from FIG. 3. The vertical output line control unit 7 includes AND circuits 721 and 722 and OR circuits 723 and 724.

The output signal of the D latch 205 is input to one input terminal of the OR circuit 209, and the output signal of the D latch 206 is input to the other input terminal of the OR circuit 209. The OR circuit 209 outputs an OR of the output of the D latch 205 and the output of the D latch 206 to one input terminal of the NAND circuit 210.

An inverse value of the control signal R_VLINE_TST is input to one input terminal of the AND circuit 721, and the output signal of the D latch 205 is input to the other input terminal of the AND circuit 721. The AND circuit 721 outputs an AND of the inverse value of the control signal R_VLINE_TST and the output of the D latch 205 to one input terminal of the OR circuit 723.

The output signal of the D latch 206 is input to the other input terminal of the OR circuit 723. The OR circuit 723 outputs an OR of the output of the AND circuit 721 and the output of the D latch 206 to one input terminal of the AND circuit 218.

An inverse value of the control signal R_VLINE_TST is input to one input terminal of the AND circuit 722, and the output signal of the D latch 206 is input to the other input terminal of the AND circuit 722. The AND circuit 722 outputs an AND of the inverse value of the control signal R_VLINE_TST and the output of the D latch 206 to one input terminal of the OR circuit 724.

The output signal of the D latch 205 is input to the other input terminal of the OR circuit 724. The OR circuit 724 outputs an OR of the output of the AND circuit 722 and the output of the D latch 205 to one input terminal of the AND circuit 215.

In the normal drive mode, the control signal R_VLINE_TST is at a low level, and the output level of the AND circuit 721 matches the output level of the D latch 205. The output level of the AND circuit 722 matches the output level of the D latch 206. Therefore, each of the OR circuits 723 and 724 outputs an OR of the output of the D latch 205 and the output of the D latch 206.

On the other hand, in the test mode, the control signal R_VLINE_TST is at a high level, and each output level of the AND circuits 721 and 722 is a low level. Therefore, the output level of the OR circuit 723 matches the output level of the D latch 206, and the output level of the OR circuit 724 matches the output level of the D latch 205.

Figure 20A:
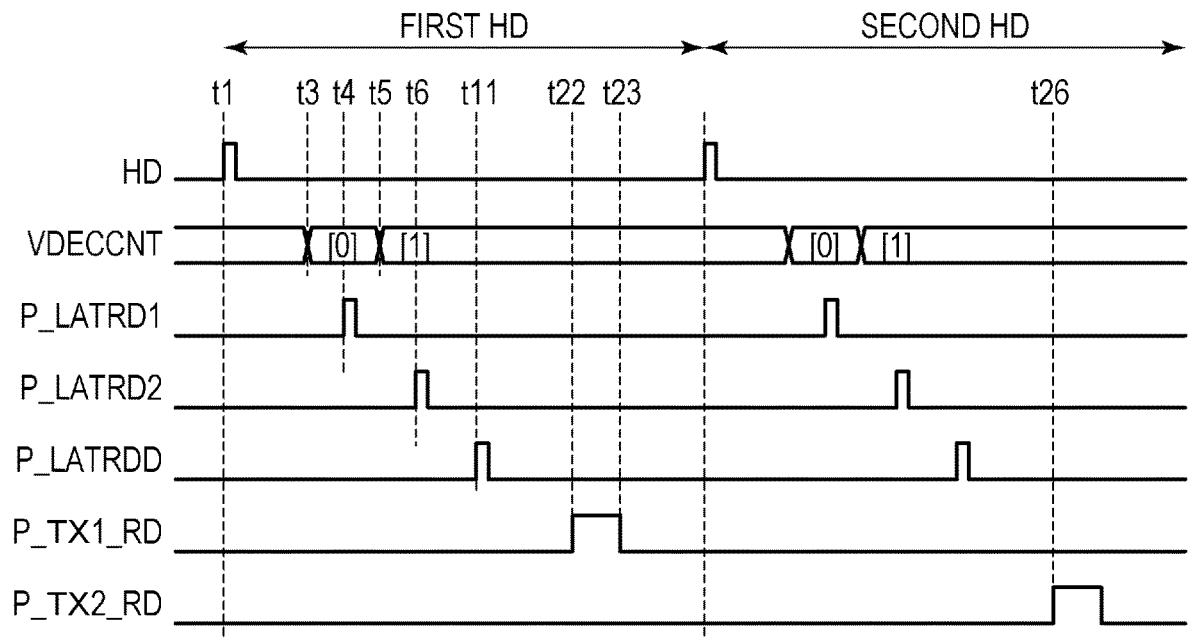
FIG. 20A and FIG. 20B are diagrams illustrating the operation of the imaging device according to the fifth embodiment.
Figure 20B:
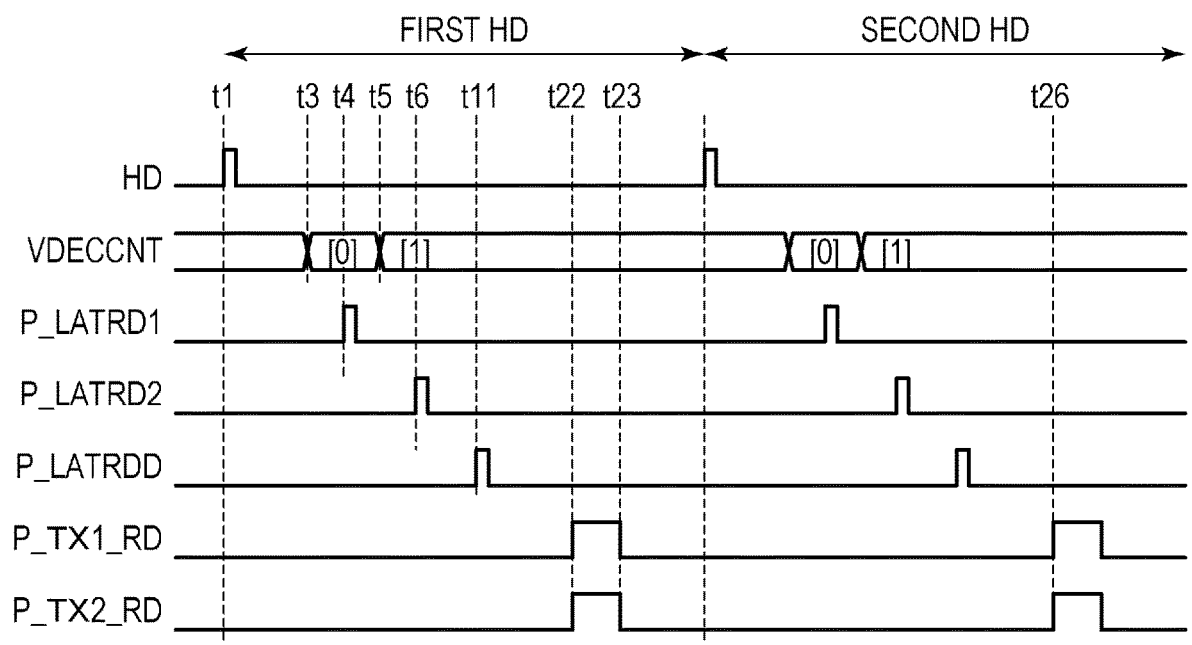

FIG. 20A and FIG. 20B are timing charts illustrating a general operation of the imaging device 100 illustrated in FIG. 18A, FIG. 18B, FIG. 18C, and FIG. 19. FIG. 20A illustrates the operation timing in the normal drive mode in which the control signal R_VLINE_TST is at a low level. Since this is substantially the same as FIG. 5, FIG. 6A, FIG. 6B, and FIG. 6C, the description thereof will be simplified.

In the first HD, the output of the D latch 205 on the 0-th row is set to a high level, and outputs of the OR circuits 723 and 724 are set to a high level. In the second HD, the output of the D latch 206 on the 0-th row is set to a high level, and the outputs of the OR circuits 723 and 724 are also set to a high level in this case. At the time t22 in the first HD, the control signal P_TX1_RD rises to a high level, and the control signal tx1(0) rises to a high level. At the time t26 in the second HD, the control signal P_TX2_RD rises to a high level, and the control signal tx2(0) rises to a high level. Accordingly, the operation as illustrated in FIG. 18A and FIG. 18B is performed.

FIG. 20B illustrates the operation timing in the test mode in which the control signal R_VLINE_TST is at a high level. At the time t22 in the first HD, both the control signals P_TX1_RD and P_TX2_RD rise to a high level. Similarly, also at the time t26 in the second HD, the control signal P_TX1_RD and P_TX2_RD rise to a high level.

In the first HD, the output of the D latch 205 on the 0-th row is set to a high level. Thereby, while the output of the OR circuit 724 on the 0-th row is at a high level, the output of the OR circuit 723 on the 0-th row is maintained at a low level. Further, the output of the D latch 206 on the first row is set to a high level. Thereby, while the output of the OR circuit 723 on the first row is at a high level, the output of the OR circuit 724 on the first row is maintained at a low level. Thus, the control signal tx1(0) is at a high level, the control signal tx2(0) is at a low level, the control signal tx1(1) is at a low level, and the control signal tx2(1) is at a high level, and the operation as illustrated in FIG. 18C is performed.

As discussed above, the present embodiment provides the drive method in which potentials output from the photoelectric conversion elements having color filters of different colors are supplied to the vertical output line 111 and the vertical output line 112 and may have different potentials. This enables detection of a short-circuit in the test mode. Therefore, according to the present embodiment, the imaging device 100 that can detect a short-circuit among a plurality of output lines can be provided.

Note that, in the example described above, while different potentials can be supplied to the vertical output lines 111 and 112 by differing the color of the color filter of the photoelectric conversion elements 115 and 116, the same effect and advantage can be obtained as long as the amounts of charges generated by the photoelectric conversion elements 115 and 116 are different. For example, different amount of generated charges may be provided by differing the areas of light-receiving portions of the photoelectric conversion elements 115 and 116. Further, even with an element configuration that separates colors by forming the photoelectric conversion elements 115 and 116 in different depths in the semiconductor substrate, it is possible to differ the generated charges similarly to the case where color filters are provided.

Sixth Embodiment

Next, a sixth embodiment will be described. The present embodiment is the same as the fifth embodiment in that the vertical output line 111 and the vertical output line 112 are provided with potentials different from each other based on the difference in the amount of charges generated in the photoelectric conversion elements. However, the present embodiment is different from the fifth embodiment in that the difference in the charge amount is caused by providing a light-shielding film to shield the photoelectric conversion elements from light. Features that are different from those of the above-described fifth embodiment will be mainly described below, and the description of common features will be omitted or simplified.

Figure 21:
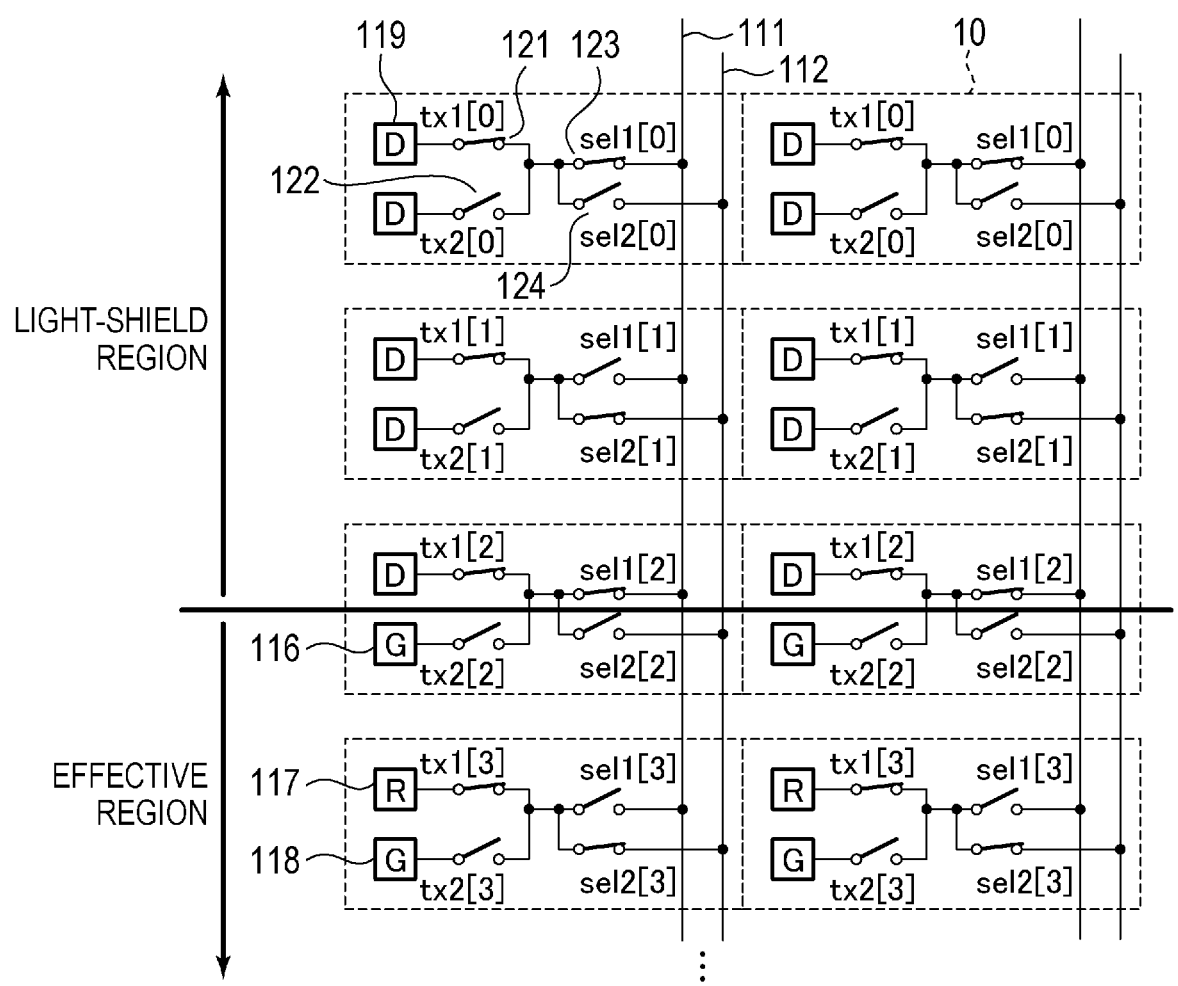
FIG. 21 is a schematic diagram of a configuration of pixels according to a sixth embodiment.

FIG. 21 is a diagram illustrating a configuration of the pixels 10 according to the present embodiment. In the present embodiment, a light-shield film that functions as a light-shielding portion that shields whole the 0-th row and the first row and the upper part of the second row of the pixel array 1 from an incident light is provided so as to cover the photoelectric conversion elements. In FIG. 21, a region shielded from light is denoted as "light-shielded region", and a region not shielded from light is denoted as "effective region". The reference "D" provided to each photoelectric conversion element 119 in FIG. 21 indicates being shielded from light. The potential output to the vertical output line from the light-shielded photoelectric conversion element corresponds to a dark level (black level). The pixel 10 on the second row includes the light-shielded photoelectric conversion elements 119 (first photoelectric conversion element) and the photoelectric conversion elements 116 on which color filters that transmit a green light are provided (second photoelectric conversion element). Therefore, with proper switching of switches, for example, the pixel 10 on the second row can output a potential of the dark level to the vertical output line 111 and output a potential based on a green component of an incident light to the vertical output line 112. In this case, since the vertical output line 111 and the vertical output line 112 have different potentials, detection of a short-circuit can be performed in the test mode.

FIG. 22A and FIG. 22B are timing charts illustrating a general operation of the imaging device 100 illustrated in FIG. 21. FIG. 22A illustrates the operation timing in the normal drive mode in which the control signal R_VLINE_TST is at a low level. Since this is substantially the same as FIG. 5, FIG. 6A, FIG. 6B, and FIG. 6C, the description thereof will be simplified.

The value of the vertical address signal VDECCNT is set to 0 and 1 in the first HD and set to 0 and 1 also in the second HD. Thereby, signals are read out from the pixels 10 on the 0-th row and the first row in the first HD and the second HD. Further, the value of the vertical address signal VDECCNT is set to 3 and 4 in the third HD and set to 3 and 4 also in the fourth HD. Thereby, signals are read out from the pixels 10 on the third row and the fourth row in the third HD and the fourth HD. Accordingly, in the normal drive mode, the imaging device 100 is driven so as not to read out the pixels 10 on the second row in which a part of the pixels 10 is shielded from light.

FIG. 22B illustrates the operation timing in the test mode in which the control signal R_VLINE_TST is at a high level. In the test mode, the value of the vertical address signal VDECCNT is set to 2 and 3 in the third HD and set to 2 and 3 also in the fourth HD. Thereby, signals are read out from the pixels 10 on the second row and the third row in the third HD and the fourth HD. Accordingly, in the test mode, driving that reads out the pixels 10 on the second row in which a part of the pixels 10 is shielded from light is performed. Therefore, in the drive method of FIG. 22B, a potential of the dark level is output to the vertical output line 111 at readout of the second row as described above, and a potential based on the green component of an incident light is output to the vertical output line 112.

As discussed above, also in the present embodiment, the amounts of charges generated by the photoelectric conversion elements 119 and 116 are different and thereby the vertical output line 111 and the vertical output line 112 have different potentials in a similar manner to the fifth embodiment. This enables detection of a short-circuit in the test mode. Therefore, according to the present embodiment, the imaging device 100 that can detect a short-circuit among a plurality of output lines can be provided.

Seventh Embodiment

Next, a seventh embodiment will be described. In the present embodiment, the pixel array 1 is configured to output a potential different from that for the normal pixels to the vertical output lines 111 and 112 and thereby provide the vertical output line 111 and the vertical output lines 112 with potentials different from each other. Features that are different from those of the above-described fifth embodiment will be mainly described below, and the description of common features will be omitted or simplified.

Figure 23:
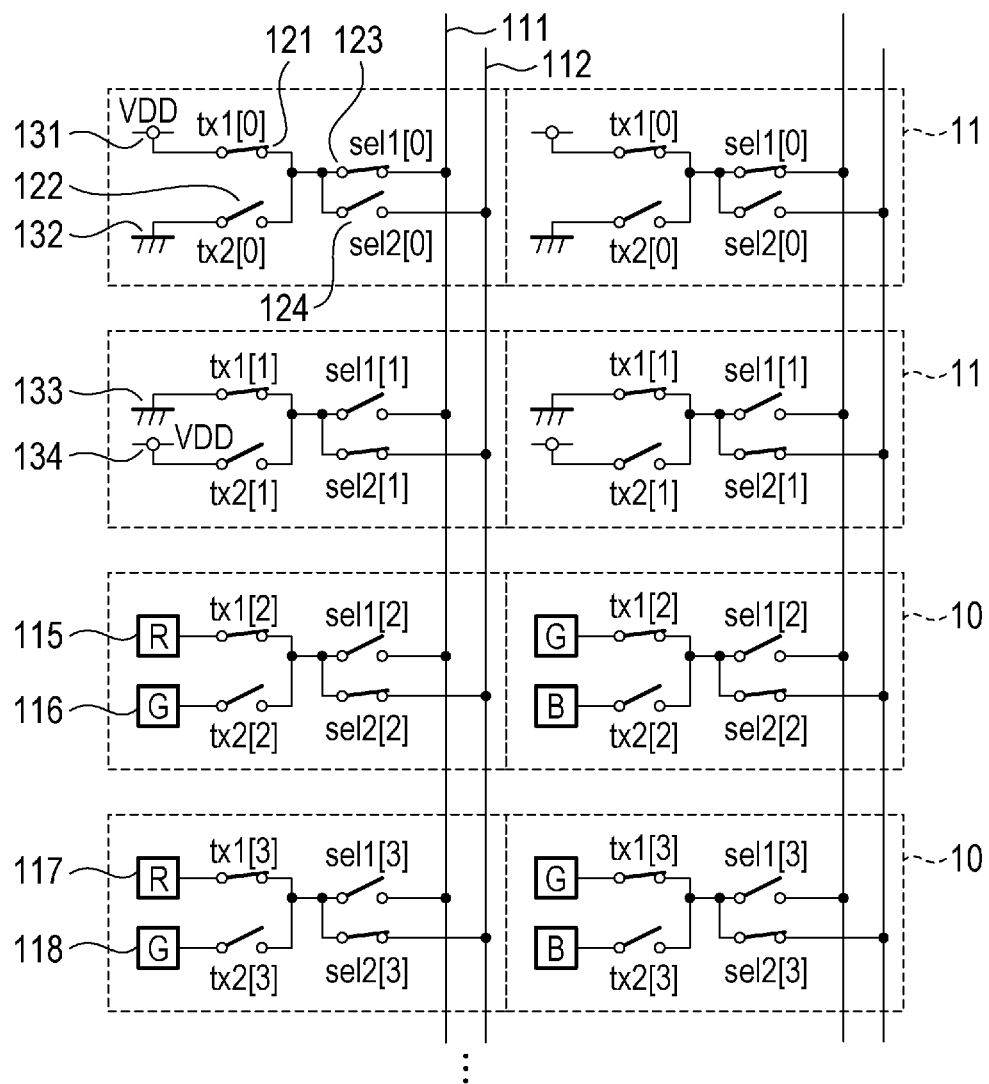
FIG. 23 is a diagram illustrating a general configuration of pixels and dummy pixels according to a seventh embodiment.

FIG. 23 is a diagram illustrating a general configuration of the pixels 10 and dummy pixels 11 according to the seventh embodiment. In the present embodiment, on the 0-th row and the first row, the dummy pixels 11 are provided instead of the pixels 10. The dummy pixel 11 on the 0-th row includes dummy elements 131 and 132 instead of the photoelectric conversion elements 115 and 116. The dummy pixel 11 on the first row includes dummy elements 133 and 134 instead of the photoelectric conversion elements 117 and 118. Each of the dummy elements 131 and 134 is the power source potential line that supplies the power source potential VDD (first fixed potential). Each of the dummy elements 132 and 133 is the ground potential line that supplies the ground potential GND (second fixed potential). Therefore, the dummy pixel 11 is able to output the power source potential VDD or the ground potential GND to the vertical output lines 111 and 112.

Figure 24A:
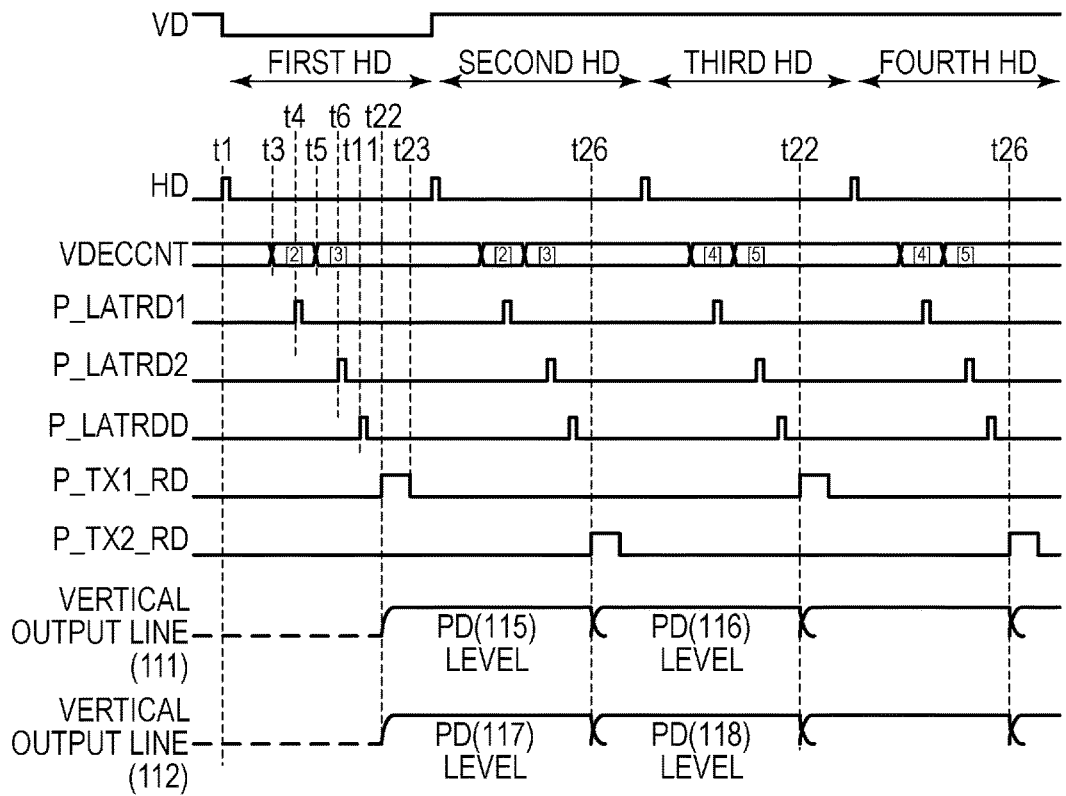
FIG. 24A and FIG. 24B are diagrams illustrating the operation of the imaging device according to the seventh embodiment.
Figure 24B:
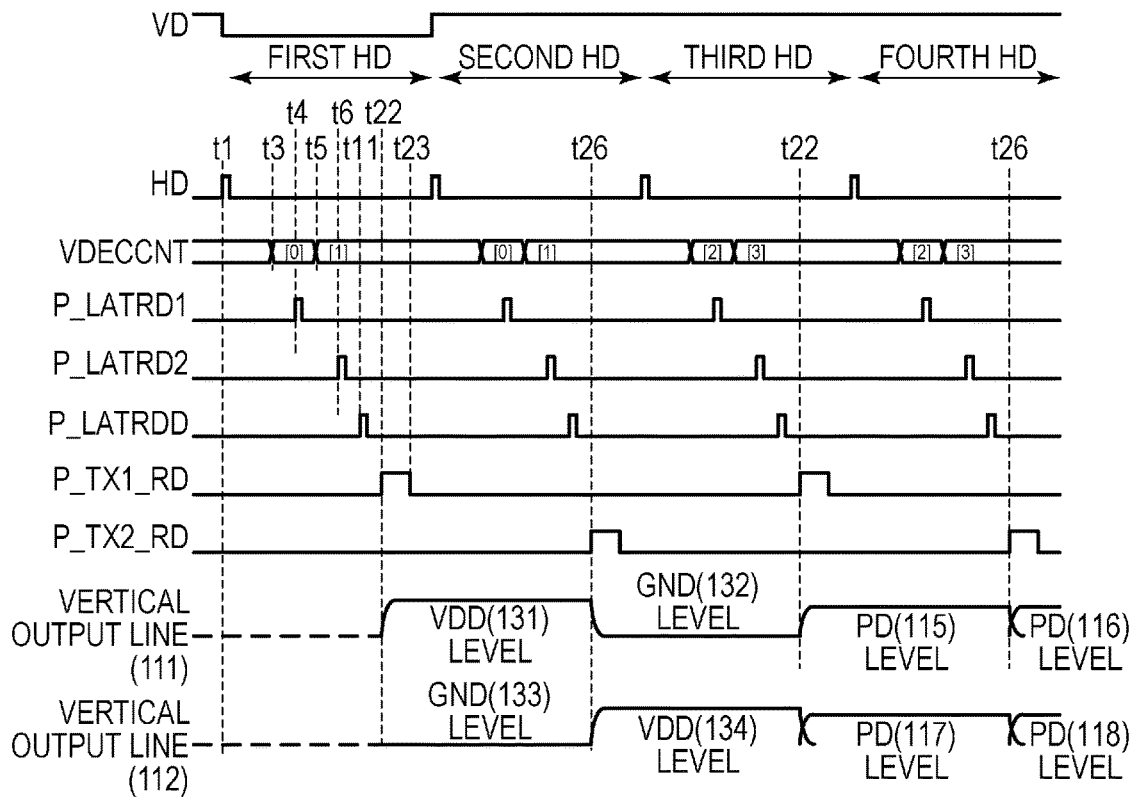

FIG. 24A is a diagram illustrating the operation timing and the potentials of the vertical output lines 111 and 112 in the normal drive mode of the imaging device 100, and FIG. 24B is a diagram illustrating the operation timing and the potentials of the vertical output lines 111 and 112 in the test mode of the imaging device 100. Since this is substantially the same as FIG. 5, FIG. 6A, FIG. 6B, and FIG. 6C, the description thereof will be simplified.

In the normal drive mode illustrated in FIG. 24A, the value of the vertical address signal VDECCNT is set to 2 and 3 in the first HD and set to 2 and 3 also in the second HD. Thereby, signals are read out from the pixels 10 on the second row and the third row in the first HD and the second HD. Therefore, the potential of the vertical output line 111 becomes a level based on charges generated by the photoelectric conversion element 115 in the first HD and becomes a level based on charges generated by the photoelectric conversion element 116 in the second HD. The potential of the vertical output line 112 becomes a level based on charges generated by the photoelectric conversion element 117 in the first HD and becomes a level based on charges generated by the photoelectric conversion element 118 in the second HD. Further, the value of the vertical address signal VDECCNT is set to 4 and 5 in the third HD and set to 4 and 5 also in the fourth HD. Thereby, signals are read out from the pixels 10 on the fourth row and the fifth row in the third HD and the fourth HD. Accordingly, in the normal drive mode, the imaging device 100 is driven so as not to read out the dummy pixels 11 on the 0-th row and the first row.

In the test mode illustrated in FIG. 24B, the value of the vertical address signal VDECCNT is set to 0 and 1 in the first HD and set to 0 and 1 also in the second HD. Thereby, signals are read out from the dummy pixels 11 on the 0-th row and the first row in the first HD and the second HD. The potential of the vertical output line 111 becomes a level based on the power source potential VDD in the first HD and becomes a level based on the ground potential GND in the second HD. The potential of the vertical output line 112 becomes a level based on the ground potential GND in the first HD and becomes a level based on the power source potential VDD in the second HD. Since the operation on and after the third HD is the same as that on and after the first HD in the normal drive mode, the description thereof will be omitted.

As discussed above, in the test mode, one of the vertical output line 111 and the vertical output line 112 has a potential based on the power source potential VDD, and the other has a potential based on the ground potential GND. This enables detection of a short-circuit in the test mode. Therefore, according to the present embodiment, the imaging device 100 that can detect a short-circuit among a plurality of output lines can be provided. Further, in the present embodiment, since an output that does not depend on an incident light can be obtained in the test mode, a test can be performed without reduction in the accuracy even in a capturing environment with a small amount of light.

In the present embodiment, since the dummy pixels 11 are arranged on the 0-th row and the first row, the test mode is configured such that data from the dummy pixels 11 is output immediately after the input of the vertical synchronization signal VD. However, for example, readout of the dummy pixels 11 may be set to a row address read out immediately before the input of the vertical synchronization signal VD11. That is, data from the dummy pixels 11 can be output in a period which is not an image output period, that is, a vertical blanking period between a process of reading out a signal for one frame and a process of reading out a signal for the next one frame.

Eighth Embodiment

Next, an eighth embodiment will be described. In the present embodiment, a short-circuit detection unit 8 is further provided in addition to the configuration of the imaging device 100 of FIG. 1. Features that are different from those of the above-described first embodiment will be mainly described below, and the description of common features will be omitted or simplified.

Figure 25:
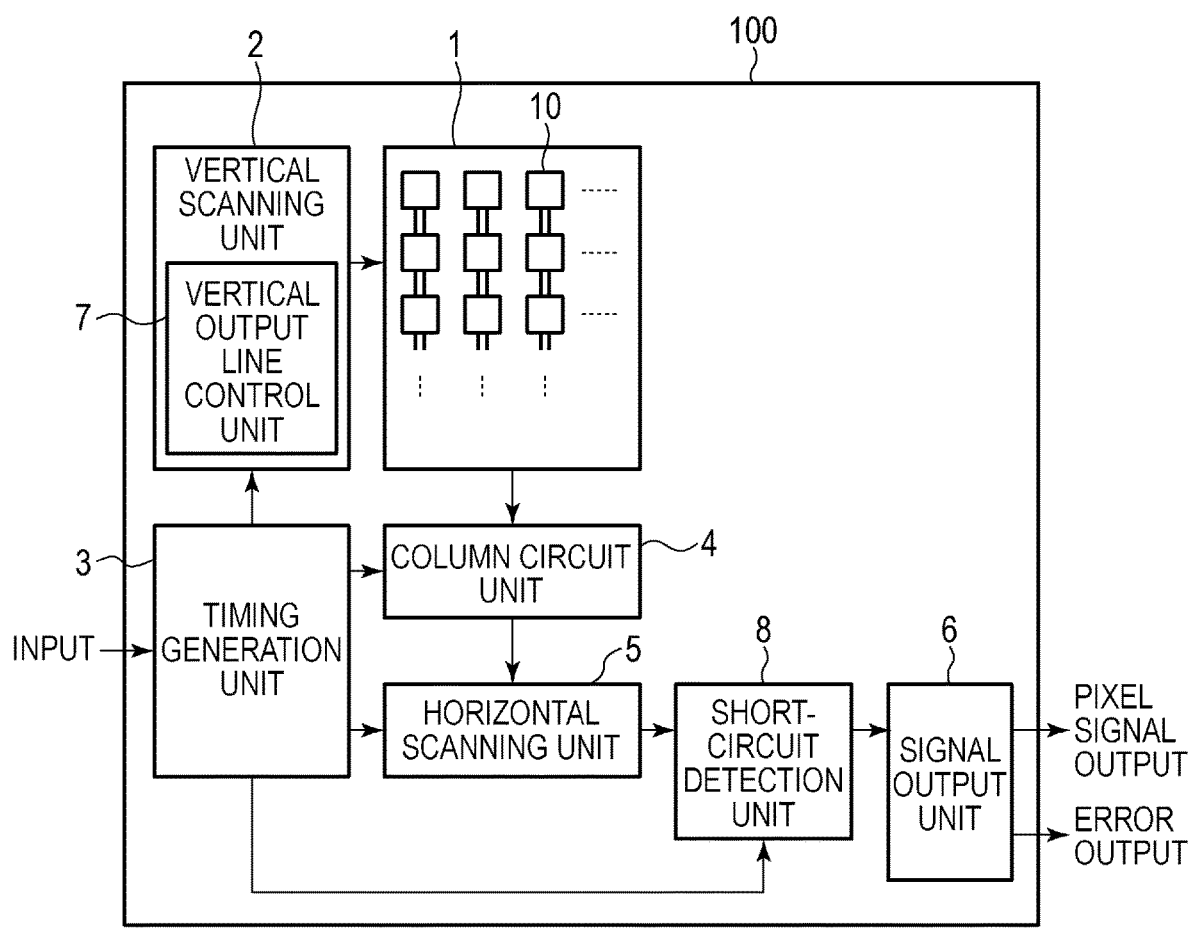
FIG. 25 is a block diagram of an imaging device according to an eighth embodiment.

FIG. 25 is a block diagram illustrating a configuration example of the imaging device 100 according to the eighth embodiment. In addition to the imaging device 100 of FIG. 1, the short-circuit detection unit 8 is further provided to the imaging device 100 in the present embodiment. The short-circuit detection unit 8 performs signal processing on pixel signals output from the horizontal scanning unit 5 and outputs the result to the signal output unit 6. Further, the short-circuit detection unit 8 detects a short-circuit between the vertical output lines in response to a signal from the timing generation unit 3 and externally outputs the result of short-circuit detection as an error output via the signal output unit 6.

Figure 26:
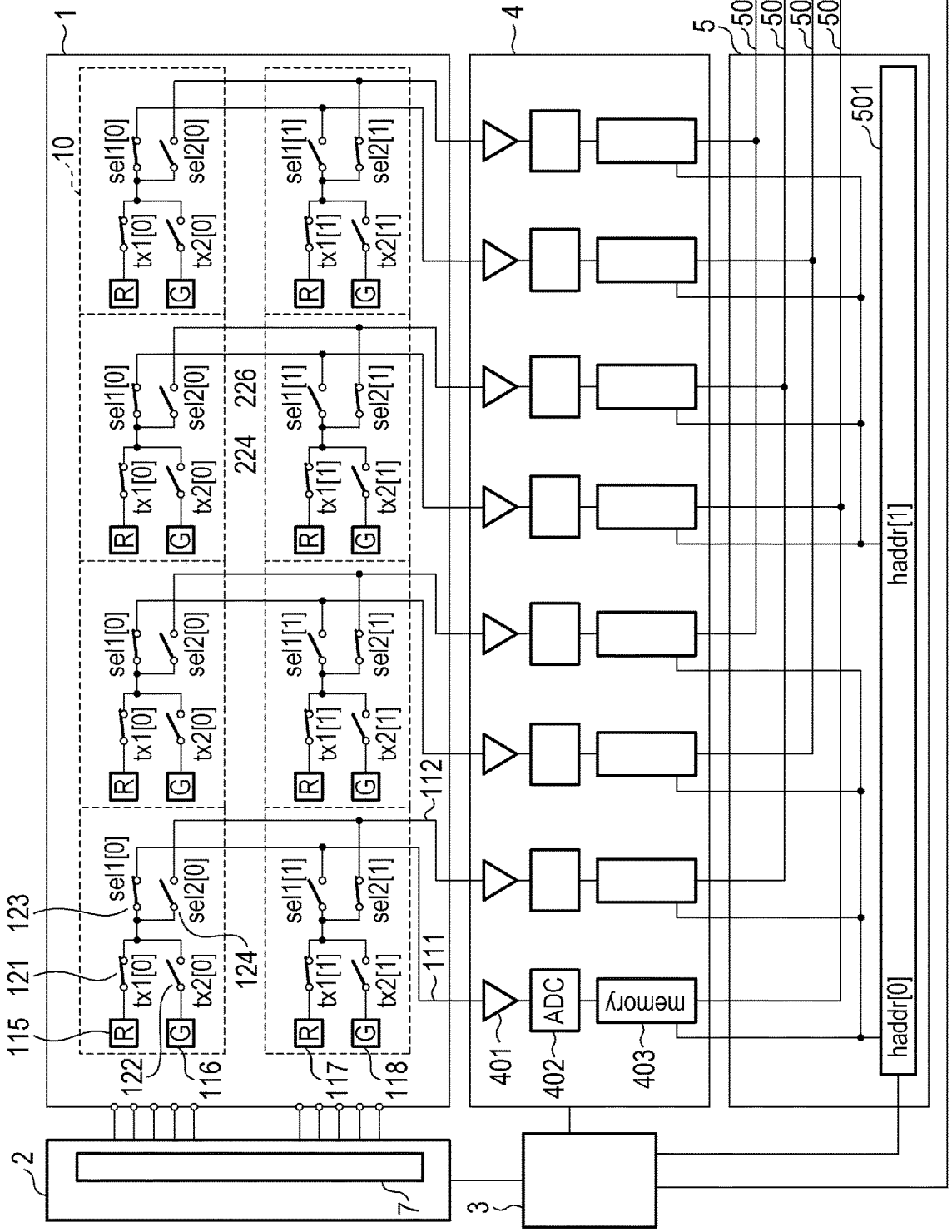
FIG. 26 is a block diagram of the imaging device according to the eighth embodiment.

FIG. 26 is a block diagram illustrating a more detailed configuration of the imaging device 100 illustrated in FIG. 25. Since the configuration of the pixels 10 in the pixel array 1 is the same as that of FIG. 18A, FIG. 18B, and FIG. 18C, the description thereof will be omitted. In the column circuit unit 4, amplifier circuits 401, column analog-to-digital (ADC) circuits 402, and memory devices 403 are arranged corresponding to each vertical output line. The horizontal scanning unit 5 includes a decoder 501 and horizontal output lines 502, 503, 504, and 505. The signal output unit 6 includes a plurality of buffers 601.

Pixel signals input to the column circuit unit 4 via the vertical output lines 111 and 112 are amplified by the amplifier circuits 401. The pixel signals amplified by the amplifier circuits 401 are converted from analog signals to digital signals in the column ADC circuit 402. The digitalized pixel signals are temporarily held in the memories 403.

The decoder 501 generates column address signals haddr(0), haddr(1), . . . , and so on based on a horizontal address signal from the timing generation unit 3. The column address signal haddr(0) is input to four memory devices 403 on the first column to the fourth column. The column address signal haddr(1) is input to four memory devices 403 on the fifth column to the eighth column. Once a column address signal is input, pixel signals held in four memory devices 403 are output to four input terminals ch1, ch2, ch3, and ch4 of the short-circuit detection unit 8 via the horizontal output lines 502, 503, 504, and 505, respectively. The short-circuit detection unit 8 performs short-circuit detection of the vertical output line 111 and the vertical output line 112 based on at least one of the input pixel signals and outputs the pixel signals and an error flag err_flg to the signal output unit 6. The error flag err_flg is a signal indicating the presence or absence of occurrence of a short-circuit. The signal output unit 6 outputs the input pixel signals and the error flag err_flg to the outside of the imaging device 100 via the buffer 601.

As illustrated in FIG. 26, each signal routed via the vertical output line 111 is input to the input terminals ch1 and ch2 of the short-circuit detection unit 8, and each signal routed via the vertical output line 112 is input to the input terminals ch3 and ch4 of the short-circuit detection unit 8. Therefore, based on the input terminal number, the short-circuit detection unit 8 can identify which of the vertical output line 111 or the vertical output line 112 the input signal has been routed from.

Figure 27:
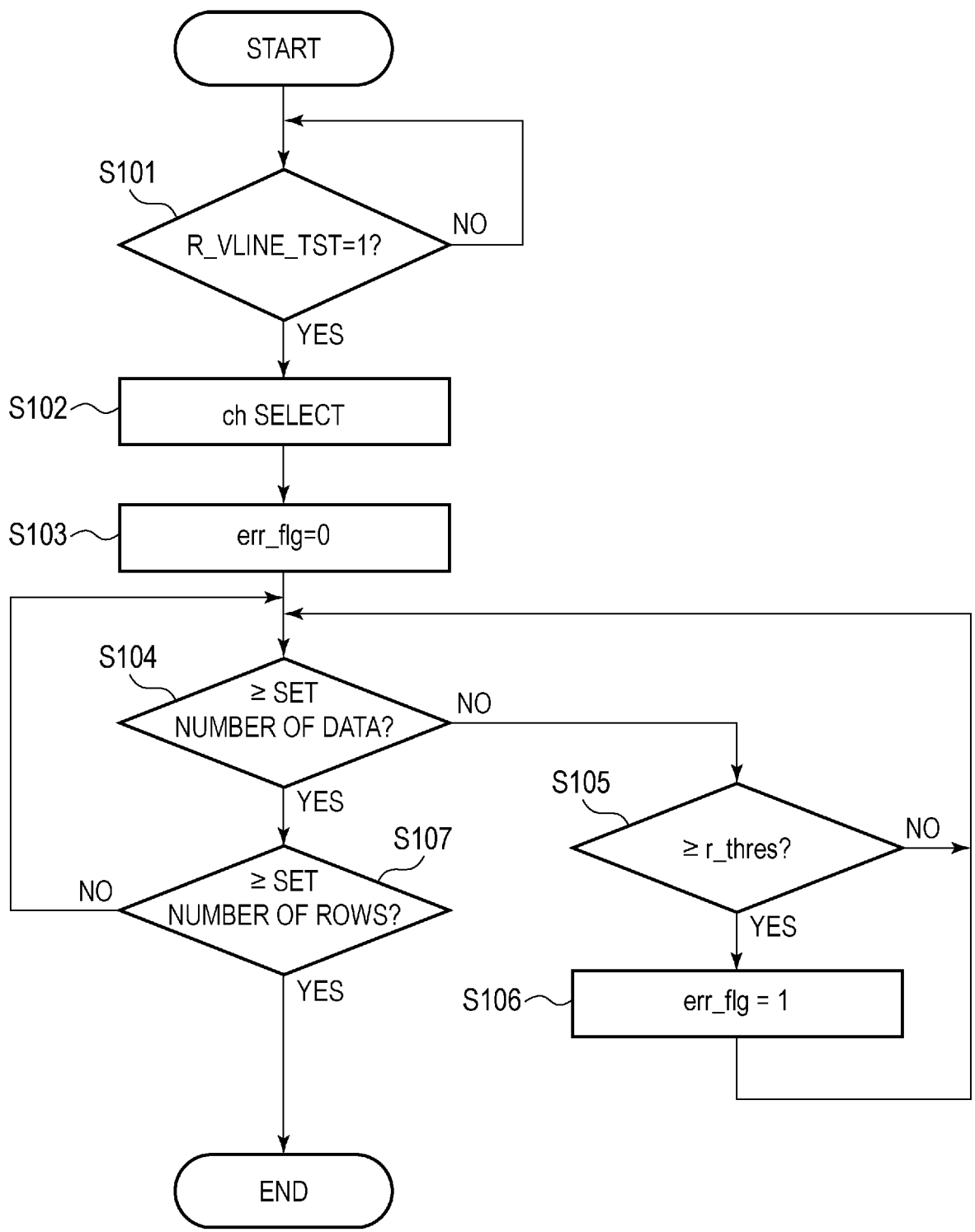
FIG. 27 is a flowchart illustrating a process of short-circuit detection unit according to the eighth embodiment.

FIG. 27 is a flowchart illustrating a short-circuit detection process in the short-circuit detection unit 8. The process flow of the present embodiment is based on the configuration that is able to switch the normal drive mode and the test mode based on the level of the control signal R_VLINE_TST as described in the first embodiment or the like. Further, in the test mode of the present embodiment, a normal pixel signal is output on the vertical output line 111, and a reset level signal is output on the vertical output line 112, as illustrated in FIG. 6B described in the first embodiment.

In step S101, the short-circuit detection unit 8 determines whether or not the value of the control signal R_VLINE_TST is 1 (high level). When the value of the control signal R_VLINE_TST becomes 1 (step S101, YES), the process proceeds to step S102.

In step S102, the short-circuit detection unit 8 selects, as input terminals of a signal to be determined, the input terminals ch3 and ch4 to which a reset level signal routed via the vertical output line 112 is input. In step S103, the value of the error flag err_flg is initialized to 0 (low level).

In step S104, the short-circuit detection unit 8 determines whether or not the number of input data is greater than or equal to the set number of data. This is a process for determining whether or not the tests for the set number of vertical output lines 112 are completed by counting the number of data input to the input terminals ch3 and ch4. If the number of input data is less than the set number of data (step S104, NO), since the test is not completed, the process proceeds to step S105. If the number of input data is greater than or equal to the set number of data (step S104, YES), the process proceeds to step S107. Note that, the setting of the number of data is input in advance from the outside of the imaging device 100 and stored in a register of the short-circuit detection unit 8 via the timing generation unit 3.

In step S105, the short-circuit detection unit 8 determines whether or not the level of the signal input to the input terminals ch3 and ch4 is greater than or equal to a threshold r_thres. The level of the threshold r_thres is set to a value greater than the reset level and less than an arithmetic mean level of the PD level illustrated in FIG. 6C and the reset level. If the input signal level is greater than or equal to the threshold r_thres (step S105, YES), it is determined that there is a short-circuit between vertical output lines, and the value of error flag err_flg is set to 1 in step S106. The process then proceeds to step S104. On the other hand, if the input signal level is less than the threshold r_thres (step S105, NO), it is determined that there is no short-circuit between vertical output lines, and the process returns to step S104. Note that the threshold r_thres is input in advance from the outside of the imaging device 100 and stored in the register of the short-circuit detection unit 8 via the timing generation unit 3.

Note that, when the reset level is greater than the arithmetic mean level of the PD level and the reset level, the same determination can be made by using the opposite magnitude relationship in the determination of step S105.

In step S107, it is determined whether or not the number of rows on which short-circuit detection has been performed is greater than or equal to the set number of rows. Since the short-circuit detection of the present embodiment is performed on the vertical output lines 111 and 112 provided commonly to the pixels 10 on a plurality of rows, it is basically sufficient to test signals input by a single horizontal scan, and this step is not essential. However, in order to suppress false detection due to noise occurring when an input signal passes through a plurality of circuits, step S107 is provided so as to be able to test signals of a plurality of rows. If short-circuit detection has been performed for the set number of rows or more (step S107, YES), the present process ends. If the number of rows on which short-circuit detection has been performed is less than the set number of rows (step S107, NO), the process proceeds to step S104, and the short-circuit detection process is continued.

As discussed above, according to the present embodiment, in the test mode, a short-circuit between the vertical output line 111 and the vertical output line 112 can be detected based on the potential of the vertical output line 111 or the vertical output line 112 in the short-circuit detection unit 8 provided in the imaging device 100. Further, the imaging device 100 can output the short-circuit detection result to the outside of the imaging device 100 as the error flag err_flg.

Ninth Embodiment

Next, a ninth embodiment will be described. The present embodiment is an embodiment in which the short-circuit detection unit 8 is applied to the imaging device 100 having the dummy pixels 11 of the seventh embodiment in a similar manner to the eighth embodiment. In the present embodiment, signals from the dummy pixels 11 are output during a vertical blanking period in the test mode.

Figure 28:
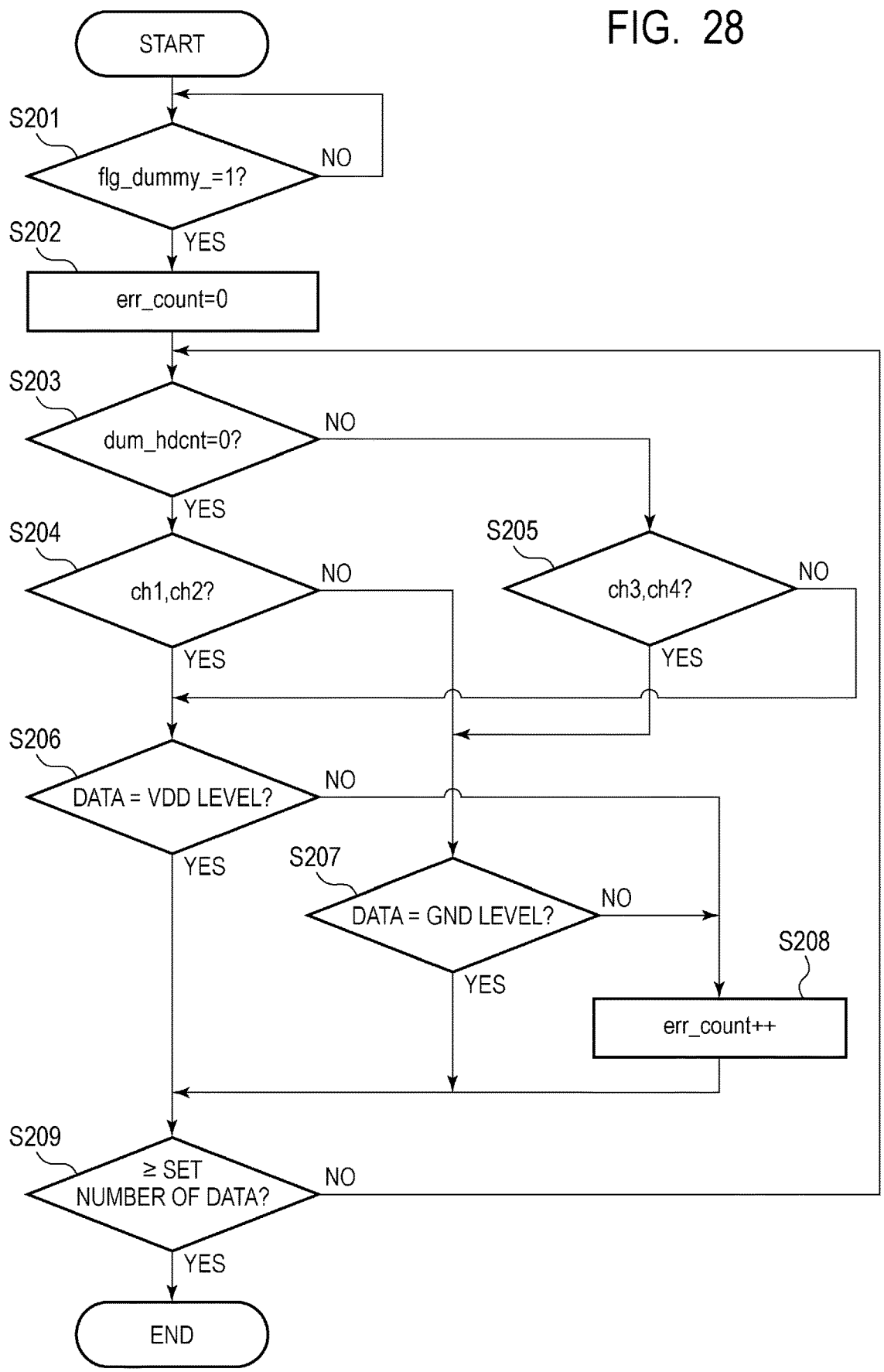
FIG. 28 is a flowchart illustrating a process of short-circuit detection unit according to a ninth embodiment.

FIG. 28 is a flowchart illustrating a short-circuit detection process in the short-circuit detection unit 8. In step S201, the short-circuit detection unit 8 determines whether or not the value of a flag flg_dummy is 1. The flag flg_dummy is a flag whose value becomes 1 when a row address signal by which a signal is output from the dummy pixel 11 during a vertical blanking period is designated. If the value of the flag flg_dummy becomes 1 (step S201, YES), the process proceeds to step S202. In step S202, a count value err_count that counts the number of errors indicating a short-circuit of the vertical output lines 111 and 112 is initialized to 0. Note that the imaging device 100 of the present embodiment can output the count value err_count to the outside of the imaging device 100 as a signal indicating the number of times of occurrence of a short-circuit.

In step S203, the short-circuit detection unit 8 determines whether or not the value of a count value dum_hdcnt is 0. The count value dum_hdcnt is a value indicating whether it is in the first HD or the second HD when the dummy pixels 11 provided on two rows are output for two HD periods. The count value dum_hdcnt is 0 in the case of the first HD, and the count value dum_hdcnt is 1 in the case of the second HD. If the count value dum_hdcnt is 0 (step S203, YES), the process proceeds to step S204, and if the count value dum_hdcnt is 1 (step S203, NO), the process proceeds to step S205.

In the case of the first HD, that is, the count value dum_hdcnt is 0, in step S204, the short-circuit detection unit 8 determines whether or not the input terminal that is input with data to be detected for a short-circuit is ch1 or ch2. If the input terminal that is input with data to be detected is ch1 or ch2 (step S204, YES), the process proceeds to step S206. If the input terminal that is input with data to be detected is neither ch1 nor ch2 (step S204, NO), that is, it is ch3 or ch4, the process proceeds to step S207.

As illustrated in FIG. 24B, the potential of the vertical output line 111 is the VDD level, and the potential of the vertical output line 112 is the GND level. That is, data input to the input terminal ch1 and the input terminal ch2 is the VDD level, and data input to the input terminal ch3 and the input terminal ch4 is the GND level.

Thus, in step S206, the short-circuit detection unit 8 determines whether or not the data input to the input terminal ch1 or the input terminal ch2 is the VDD level. If the data input to the input terminal ch1 or the input terminal ch2 is the VDD level (step S206, YES), the process proceeds to step S209. If the data input to the input terminal ch1 or the input terminal ch2 is not the VDD level (step S206, NO), the process proceeds to step S208. Further, in step S207, the short-circuit detection unit 8 determines whether or not the data input to the input terminal ch3 or the input terminal ch4 is the GND level. If the data input to the input terminal ch3 or the input terminal ch4 is the GND level (step S207, YES), the process proceeds to step S209. If the data input to the input terminal ch1 or the input terminal ch2 is not the GND level (step S207, NO), the process proceeds to step S208.

In the case of the second HD, that is, the count value dum_hdcnt is 1, in step S205, the short-circuit detection unit 8 determines whether or not the input terminal that is input with data to be detected for a short-circuit is ch3 or ch4. If the input terminal to which data to be detected is input is ch3 or ch4 (step S205, YES), the process proceeds to step S207. If the input terminal that is input with data to be detected is neither ch3 nor ch4 (step S205, NO), that is, it is ch1 or ch2, the process proceeds to step S206. The subsequent process is the same as that in the case of the first HD.

Note that the value of a reference for determination of the VDD level or the GND level described above may be input in advance from the outside of the imaging device 100 and stored in the register of the short-circuit detection unit 8 via the timing generation unit 3. Further, such determination may be determination as to whether or not an input potential is within a predetermined range or may be determination based on comparison to a predetermined threshold.

If the process proceeds to step S208, there is an anomaly in the potential of the vertical output line 111 or the vertical output line 112, and it is determined that there is a short-circuit between the vertical output line 111 and the vertical output line 112. Thus, the short-circuit detection unit 8 increments the value of the count value err_count. The process then proceeds to step S209.

In step S209, the short-circuit detection unit 8 determines whether or not the number of times of performed short-circuit detection is greater than the set number. This is to determine whether or not the tests for the set number of the vertical output lines 111 and the vertical output lines 12 are completed. If the number of times of performed short-circuit detection is less than the set number (step S209, NO), since the test is not completed, the process proceeds to step S203. The number of times of performed short-circuit detection is greater than the set number (step S209, YES), the process ends.

As discussed above, according to the present embodiment, a test can be performed within a vertical blanking period in the imaging device 100 having the configuration of the seventh embodiment. Further, in the test mode, a short-circuit between the vertical output line 111 and the vertical output line 112 can be detected to output the number of short-circuits to the outside of the imaging device 100.

Tenth Embodiment

Figure 29:
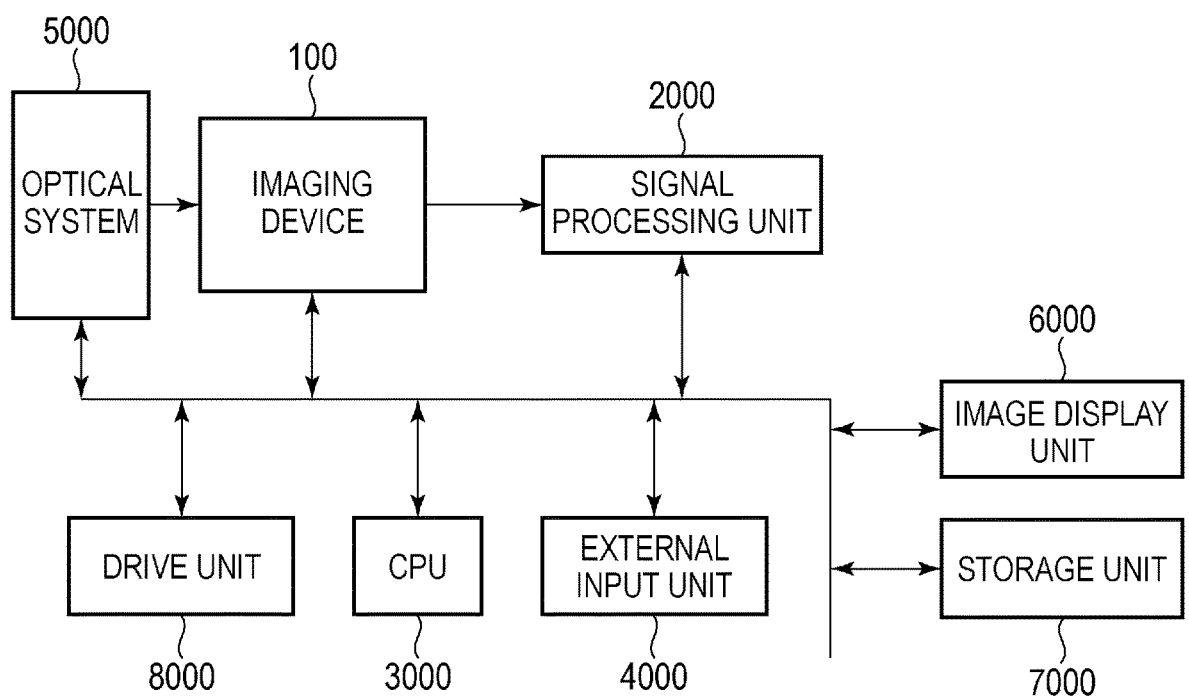
FIG. 29 is a block diagram of an imaging system according to a tenth embodiment.

Next, a tenth embodiment will be described. FIG. 29 is a block diagram illustrating a configuration example of an imaging system to which the imaging device 100 of the first to ninth embodiments can be applied. The imaging system has the imaging device 100, a signal processing unit 2000, a CPU 3000, an external input unit 4000, an optical system 5000, an image display unit 6000, a storage unit 7000, and a drive unit 8000. The imaging device 100 of the first to ninth embodiments is applied to the imaging device 100. Note that a plurality of imaging devices 100 may be provided.

The CPU 3000 integrally controls the operations of respective units of the entire imaging system and performs necessary calculation processes thereon. The image display unit 6000 is a display device that displays a captured image or the like. The storage unit 7000 is a storage medium that stores captured image data or the like.

The optical system 5000 guides an incident light from a subject to the imaging device 100 and may include a lens, an aperture, and the like. The imaging device 100 generates an analog signal in accordance with an incident light, converts the analog signal into a digital signal, and outputs the digital signal to the signal processing unit 2000. The signal processing unit 2000 performs predetermined signal processing such as image correction or the like on the input digital signal for display on the image display unit 6000 or storage to the storage unit 7000. Further, the signal processing unit 2000 has a function of detecting that different potentials are provided to the vertical output lines 111 and 112 in the test mode.

The external input unit 4000 is an interface that accepts an external operation, which is able to accept an operation of switching the normal drive mode and the test mode, for example. Based on the operation of switching of the normal drive mode and the test mode at the external input unit 4000, the CPU 3000 transmits a control signal indicating a state of the normal drive mode or the test mode to the imaging device 100. When the test mode is applied, the imaging device 100 performs a process of detection a short-circuit between vertical output lines. The imaging device 100 outputs the detection result to the image display unit 6000 and stores the detection result in the storage unit 7000. Further, based on the detection result, the CPU 3000 operates the drive unit 8000 to switch the tested imaging device 100 to another imaging device 100. By sequentially performing the above series of operations, it is possible to test a plurality of imaging devices 100.

A control method in which the imaging device 100 of the seventh embodiment is applied and the operation of the test mode is performed in the vertical blanking period in the imaging system of the tenth embodiment will be described. In the present example, the imaging system performs control for reducing an influence of a short-circuit when a short-circuit occurs between vertical output lines. As a specific example, based on the result of short-circuit detection, the CPU 3000 can reduce an influence of a short-circuit by controlling the optical system 5000 so that the pixels 10 connected to vertical output lines between which a short-circuit is detected is not in an irradiation range of an incident light. As another example, the CPU 3000 can reduce an influence of a short-circuit by controlling the imaging device 100 to change the horizontal scan range. At this time, the signal processing unit 2000 may output image data in which correction for reducing a resolution has been performed to the image display unit 6000 and the storage unit 7000 so that a vision range included in an image does not change even when the horizontal scan range is changed.

Eleventh Embodiment

Figure 30A:
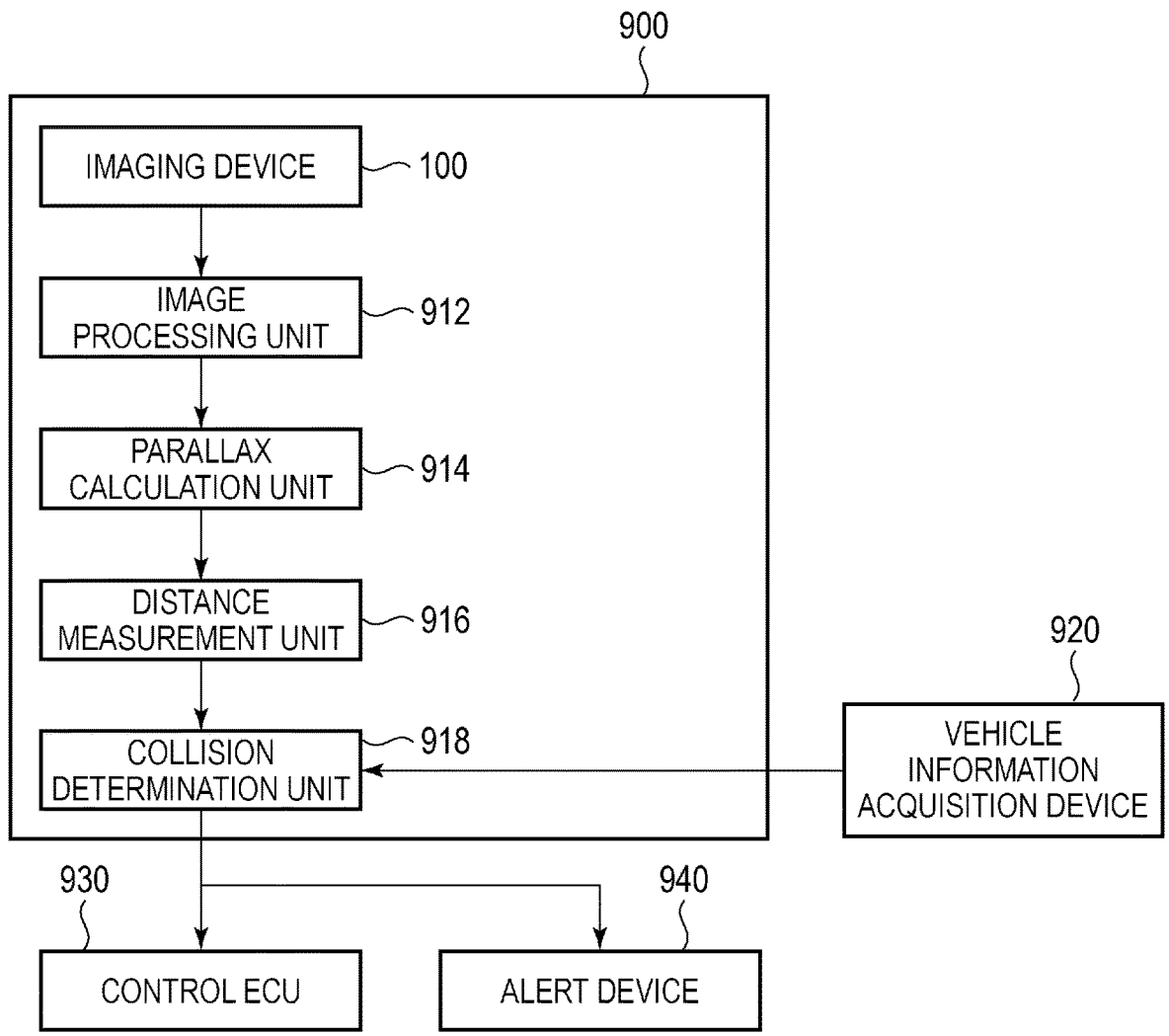
FIG. 30A and FIG. 30B are block diagrams of an imaging system and a mobile apparatus according to an eleventh embodiment.
Figure 30B:
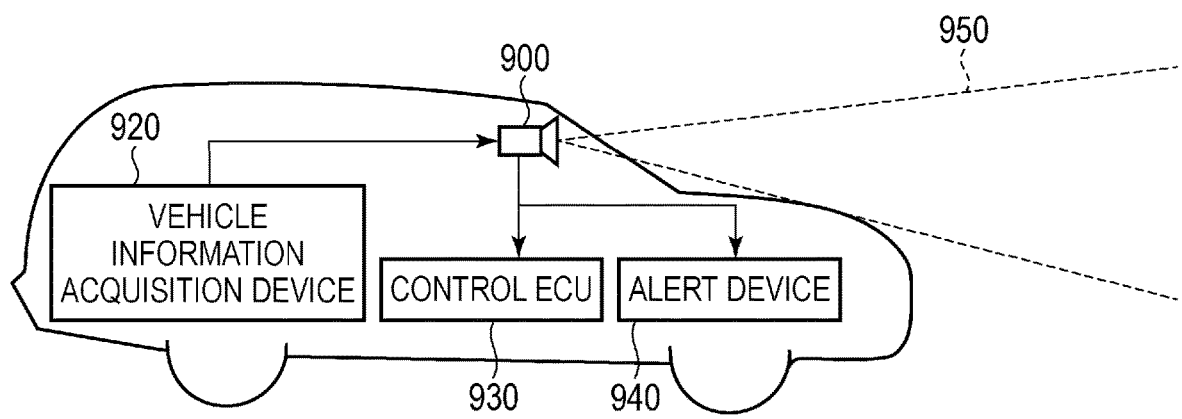

FIG. 30A and FIG. 30B are diagrams illustrating configurations of an imaging system 900 and a mobile apparatus according to the present embodiment. FIG. 30A illustrates an example of an imaging system 900 related to an on-vehicle camera. The imaging system 900 has an imaging device 100 described in any of the above first to ninth embodiments. The imaging system 900 has an image processing unit 912 that performs image processing on a plurality of image data acquired by the imaging device 100 and a parallax calculation unit 914 that calculates a parallax (a phase difference of parallax images) from the plurality of image data acquired by the imaging system 900. Further, the imaging system 900 has a distance measurement unit 916 that calculates a distance to the object based on the calculated parallax and a collision determination unit 918 that determines whether or not there is a collision possibility based on the calculated distance. Here, the parallax calculation unit 914 and the distance measurement unit 916 are an example of a distance information acquisition unit that acquires distance information on the distance to the object. That is, the distance information is information on a parallax, a defocus amount, a distance to an object, or the like. The collision determination unit 918 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 900 is connected to the vehicle information acquisition device 920 and can acquire vehicle information such as a vehicle speed, a yaw rate, a steering angle, or the like. Further, the imaging system 900 is connected with a control ECU 930, which is a control device that outputs a control signal for causing a vehicle to generate braking force based on a determination result by the collision determination unit 918. That is, the control ECU 930 is an example of mobile apparatus control unit that controls a mobile apparatus based on the distance information. Further, the imaging system 900 is connected with an alert device 940 that issues an alert to the driver based on a determination result by the collision determination unit 918. For example, when the collision probability is high as the determination result of the collision determination unit 918, the control ECU 930 performs vehicle control to avoid a collision or reduce damage by applying a brake, pushing back an accelerator, suppressing engine power, or the like. The alert device 940 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 900. FIG. 30B illustrates the imaging system 900 in a case of capturing a front area of a vehicle (a capturing area 950). The vehicle information acquisition device 920 transmits instructions to operate the imaging system 900 to perform image capturing. The imaging system 900 of the present embodiment including the imaging device 100 according to the first to ninth embodiments can detect a failure due to a short-circuit between vertical output lines.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, an example in which a part of the configuration of any of the embodiments is added to another embodiment or an example in which a part of the configuration of any of the embodiments is replaced with a part of the configuration of another embodiment is to be considered to be an embodiment to which the present invention can be applied.

This application claims the benefit of Japanese Patent Application No. 2017-093145, filed May 9, 2017, which is hereby incorporated by reference herein in its entirety.

What is claimed is:
1. An imaging device comprising:
 a pixel array including a plurality of pixels that are arranged to form a plurality of rows and a plurality of columns, each of the plurality of pixels being configured to generate signals in accordance with an incident light;
 a first output line and a second output line that are arranged corresponding to each of the plurality of columns of the pixel array and configured to transmit signals output from the pixels arranged on a corresponding column;

a scanning unit configured to drive the pixel array so as to output signals from at least two of the pixels arranged on different rows of a single column respectively to the first output line and the second output line; and an output line control unit configured to provide potentials that are different from each other to the first output line and the second output line, respectively, in a test mode, wherein, in the test mode, the output line control unit controls the scanning unit to output signals based on charges generated in accordance with the incident light in the pixels to the first output line and output signals based on a reset state of the pixels to the second output line.

2. The imaging device according to claim 1, wherein each of the plurality of pixels included in the pixel array includes:

a photoelectric conversion element configured to generate charges in accordance with the incident light by photoelectric conversion;

a transfer transistor configured to transfer charges generated by the photoelectric conversion element;

an amplification transistor having an input node to which charges are transferred from the photoelectric conversion element by the transfer transistor and configured to output a signal in accordance with a potential of the input node; and a reset transistor configured to reset the potential of the input node, wherein, in the test mode, the output line control unit controls the scanning unit to turn off the reset transistor of a pixel which outputs a signal to the first output line, maintain the reset transistor of a pixel to be turned on which outputs a signal to the second output line, and output a signal from the pixels with the input node being reset.

3. The imaging device according to claim 1, wherein each of the plurality of pixels included in the pixel array includes:

a photoelectric conversion element configured to generate charges in accordance with the incident light by photoelectric conversion;

a transfer transistor configured to transfer charges generated by the photoelectric conversion element;

an amplification transistor having an input node to which charges are transferred from the photoelectric conversion element by the transfer transistor and configured to output a signal in accordance with a potential of the input node; and a reset transistor configured to reset the potential of the input node, wherein, in the test mode, the output line control unit controls the scanning unit to turn on the transfer transistor of a pixel which outputs a signal to the first output line and transfer charges, maintain the transfer transistor of a pixel to be turned off which outputs a signal to the second output line, and output a signal from the pixels with the input node being maintained in a reset state.

4. The imaging device according to claim 1, wherein, in the test mode, the output line control unit controls the scanning unit to output signals from the pixels to only one of the first output line and the second output line.

5. The imaging device according to claim 1, wherein, each of the plurality of pixels included in the pixel array includes:

a first select transistor connected to the first output line; and a second select transistor connected to the second output line, wherein, in the test mode, the output line control unit controls the scanning unit to output a signal from a pixel with the first select transistor being in an on-state and the second select transistor being in an off-state.

6. An imaging device comprising:

a pixel array including a plurality of pixels that are arranged to form a plurality of rows and a plurality of columns, each of the plurality of pixels being configured to generate signals in accordance with an incident light;

a first output line and a second output line that are arranged corresponding to each of the plurality of columns of the pixel array and configured to transmit signals output from the pixels arranged on a corresponding column;

a scanning unit configured to drive the pixel array so as to output signals from at least two of the pixels arranged on different rows of a single column respectively to the first output line and the second output line; and an output line control unit configured to provide potentials that are different from each other to the first output line and the second output line, respectively in a test mode, wherein, in the test mode, the output line control unit controls a potential of at least one of the first output line and the second output line to be clipped at a predetermined potential.

7. The imaging device according to claim 1, wherein each of the plurality of pixels included in the pixel array includes a first photoelectric conversion element and a second photoelectric conversion element each configured to generate charges in accordance with the incident light by photoelectric conversion, wherein, in the test mode, the output line control unit controls the scanning unit to output a signal based on charges generated by the first photoelectric conversion element to the first output line and output a signal based on charges generated by the second photoelectric conversion element to the second output line, and wherein an amount of charges generated by the first photoelectric conversion element and an amount of charges generated by the second photoelectric conversion element are different from each other.

8. The imaging device according to claim 7 further comprising:

a color filter of a first color configured to transmit a light entering the first photoelectric conversion element; and a color filter of a second color configured to transmit a light entering the second photoelectric conversion element, the second color being different from the first color.

9. The imaging device according to claim 7, wherein the first photoelectric conversion element and the second photoelectric conversion element are different in an area for receiving the incident light.

10. The imaging device according to claim 7, wherein any one of the first photoelectric conversion element and the second photoelectric conversion element further has a light-shielding portion configured to block the incident light.

11. The imaging device according to claim 1, wherein the pixel array further includes dummy pixels that can output a first fixed potential and a second fixed potential, and wherein, in the test mode, the output line control unit controls the scanning unit to supply the first fixed potential to the first output line from the dummy pixel and supply the second fixed potential to the second output line from the dummy pixel.

12. An imaging device comprising:
a pixel array including a plurality of pixels that are arranged to form a plurality of rows and a plurality of columns, each of the plurality of pixels being configured to generate signals in accordance with an incident light;
a first output line and a second output line that are arranged corresponding to each of the plurality of columns of the pixel array and configured to transmit signals output from the pixels arranged on a corresponding column;
a scanning unit configured to drive the pixel array so as to output signals from at least two of the pixels arranged on different rows of a single column respectively to the first output line and the second output line;
an output line control unit configured to provide potentials that are different from each other to the first output line and the second output line, respectively in a test mode; and
a short-circuit detection unit configured to detect a short-circuit between the first output line and the second output line based on at least one of a potential of the first output line and a potential of the second output line.

13. The imaging device according to claim 12, wherein the short-circuit detection unit detects the short-circuit by comparing the potential of the first output line or the potential of the second output line with a predetermined threshold.

14. The imaging device according to claim 12 further comprising a signal output unit configured to output a signal indicating presence or absence of occurrence of the short-circuit based on a result of a short-circuit detection performed by the short-circuit detection unit.

15. The imaging device according to claim 12 further comprising a signal output unit configured to output a signal indicating the number of times of occurrence of a short-circuit based on a result of a short-circuit detection performed by the short-circuit detection unit.

16. The imaging device according to claim 12, wherein the short-circuit detection unit performs detection of a short-circuit in a vertical blanking period between a process of reading out signals for one frame and a process of reading out signals for next one frame.

17. An imaging system comprising:
the imaging device according to claim 1; and
a signal processing unit configured to process a signal output from the imaging device.

18. The imaging system according to claim 17, wherein, in the test mode, the signal processing unit detects that potentials different from each other are provided to the first output line and the second output line.

19. A mobile apparatus comprising:
the imaging device according to claim 1;
a distance information acquisition unit configured to acquire distance information of a distance to an object, from parallax images based on signals from the imaging device; and
a mobile apparatus control unit configured to control the mobile apparatus based on the distance information.

20. An imaging device comprising:
a pixel array including a plurality of pixels that are arranged to form a plurality of rows and a plurality of columns, each of the plurality of pixels being configured to generate signals in accordance with an incident light;
a first output line and a second output line that are arranged corresponding to each of the plurality of columns of the pixel array and configured to transmit signals output from the pixels arranged on a corresponding column;
a scanning unit configured to drive the pixel array so as to output signals from at least two of the pixels arranged on different rows of a single column respectively to the first output line and the second output line; and
an output line control unit configured to provide potentials that are different from each other to the first output line and the second output line, respectively, in a test mode,
wherein each of the plurality of pixels included in the pixel array includes:
a photoelectric conversion element configured to generate charges in accordance with the incident light by photoelectric conversion;
a transfer transistor configured to transfer charges generated by the photoelectric conversion element;
an amplification transistor having an input node to which charges are transferred from the photoelectric conversion element by the transfer transistor and configured to output a signal in accordance with a potential of the input node; and
a reset transistor configured to reset the potential of the input node,
wherein, in the test mode, the output line control unit controls the scanning unit to turn off the reset transistor of a pixel which outputs a signal to the first output line, maintain the reset transistor of a pixel to be turned on which outputs a signal to the second output line, and output a signal from the pixels with the input node being reset.

21. An imaging device comprising:
a pixel array including a plurality of pixels that are arranged to form a plurality of rows and a plurality of columns, each of the plurality of pixels being configured to generate signals in accordance with an incident light;
a first output line and a second output line that are arranged corresponding to each of the plurality of columns of the pixel array and configured to transmit signals output from the pixels arranged on a corresponding column;
a scanning unit configured to drive the pixel array so as to output signals from at least two of the pixels arranged on different rows of a single column respectively to the first output line and the second output line; and
an output line control unit configured to provide potentials that are different from each other to the first output line and the second output line, respectively, in a test mode,
wherein each of the plurality of pixels included in the pixel array includes:
a photoelectric conversion element configured to generate charges in accordance with the incident light by photoelectric conversion;
a transfer transistor configured to transfer charges generated by the photoelectric conversion element;
an amplification transistor having an input node to which charges are transferred from the photoelectric conversion element by the transfer transistor and configured to output a signal in accordance with a potential of the input node; and a reset transistor configured to reset the potential of the input node, wherein, in the test mode, the output line control unit controls the scanning unit to turn on the transfer transistor of a pixel which outputs a signal to the first output line and transfer charges, maintain the transfer transistor of a pixel to be turned off which outputs a signal to the second output line, and output a signal from the pixels with the input node being maintained in a reset state.

* * * * *